US010027510B2

(12) United States Patent
Beshai

(10) Patent No.: US 10,027,510 B2
(45) Date of Patent: Jul. 17, 2018

(54) LARGE-SCALE DATA CENTER BASED ON A CONTIGUOUS NETWORK

(71) Applicant: Maged E. Beshai, Maberly (CA)

(72) Inventor: Maged E. Beshai, Maberly (CA)

( * ) Notice: Subject to any disclaimer, the term of this patent is extended or adjusted under 35 U.S.C. 154(b) by 126 days.

(21) Appl. No.: 15/068,668

(22) Filed: Mar. 14, 2016

(65) Prior Publication Data

US 2016/0269197 A1 Sep. 15, 2016

Related U.S. Application Data

(60) Provisional application No. 62/131,996, filed on Mar. 12, 2015, provisional application No. 62/240,523, filed on Oct. 12, 2015.

(51) Int. Cl.

| | |
|---|---|
| ***H04L 12/933*** | (2013.01) |
| ***H04L 12/931*** | (2013.01) |
| ***H04L 12/50*** | (2006.01) |
| ***H04L 12/715*** | (2013.01) |
| ***H04L 12/46*** | (2006.01) |
| ***H04L 12/751*** | (2013.01) |

(52) U.S. Cl.
CPC .............. *H04L 12/46* (2013.01); *H04L 45/02* (2013.01); *H04L 49/15* (2013.01)

(58) Field of Classification Search
CPC .......... H04L 49/12; H04L 49/15; H04L 12/46
See application file for complete search history.

(56) References Cited

U.S. PATENT DOCUMENTS

2004/0071134 A1* 4/2004 Vadivelu .................. H04Q 3/66 370/373
2014/0314099 A1* 10/2014 Dress ...................... H04L 45/62 370/422

* cited by examiner

*Primary Examiner* — Parth Patel
*Assistant Examiner* — Jason Harley

(57) ABSTRACT

A large-scale data center is based on orthogonal connectivity of a distributed single-stage connector, having a large number of disjoint primary switches, to a large number of access nodes and a large number of secondary switches. The secondary switches are coupled to a large number of servers forming a server farm. The orthogonal-connectivity scheme yields a contiguous network providing single-hop paths from each access node to each other access node, from each secondary switch to each other secondary switch, from each access node to each secondary switch, and from each secondary switch to each access node.

21 Claims, 69 Drawing Sheets

*Second Connectivity Pattern* j: index of an ingress node

| 0 | 1 | **2** | 3 | 4 | 5 | 6 | 7 | 8 | 9 | 10 | 11 |
|---|---|---|---|---|---|---|---|---|---|---|---|

p: index of a primary switch

| 0 | 0 | **0** | 0 | 4 | 4 | 4 | 4 | 8 | 8 | 8 | 8 |
|---|---|---|---|---|---|---|---|---|---|---|---|
| 3 | 3 | **3** | 3 | 7 | 7 | 7 | 7 | 2 | 2 | 2 | 2 |
| 6 | 6 | **6** | 6 | 1 | 1 | 1 | 1 | 5 | 5 | 5 | 5 |

$$\{p\}_{\mu} = \{\lfloor j/m \rfloor \times (\mu+1) + \alpha \times \mu\} | \text{modulo } \mu^2$$

$0 \le \alpha < \mu$ $\mu=3$ $m=n=4$

*Configuration "A"*

$\mu=3$, $m=n=4$

P: index of a primary switch

| 0 | 1 | 2 | **3** | **4** | **5** | 6 | 7 | 8 |
|---|---|---|---|---|---|---|---|---|

k: Index of an Egress node

| 0 | 0 | 0 | 4 | 4 | 4 | 8 | 8 | 8 |
|---|---|---|---|---|---|---|---|---|
| 1 | 1 | 1 | **5** | **5** | **5** | 9 | 9 | 9 |
| 2 | 2 | 2 | 6 | 6 | 6 | 10 | 10 | 10 |
| 3 | 3 | 3 | 7 | 7 | 7 | 11 | 11 | 11 |

$$\{k\}_m = \{\lfloor p/\mu \rfloor \times m + \lambda\}$$

$0 \le \lambda < m$

*FIG. 33*

*Configuration "A"*

$\mu=3, m=n=4$

P: index of a primary switch

| **0** | 1 | 2 | **3** | 4 | 5 | **6** | 7 | 8 |
|---|---|---|---|---|---|---|---|---|

S: index of a secondary switch

| **0** | 0 | 0 | **4** | 4 | 4 | **8** | 8 | 8 |
|---|---|---|---|---|---|---|---|---|
| **1** | 1 | 1 | **5** | 5 | 5 | **9** | 9 | 9 |
| **2** | 2 | 2 | **6** | 6 | 6 | **10** | 10 | 10 |
| **3** | 3 | 3 | **7** | 7 | 7 | **11** | 11 | 11 |

$$\{s\}_n = \{\lfloor p/\mu \rfloor \times n + \lambda\}$$

$$0 \le \lambda < n$$

$$\mu=3 \quad m=n=4$$

S: index of a secondary switch

| 0 | 1 | 2 | 3 | 4 | 5 | 6 | 7 | 8 | 9 | 10 | 11 |
|---|---|---|---|---|---|---|---|---|---|---|---|

P: index of a primary switch

| 0 | 0 | 0 | 0 | **4** | **4** | **4** | **4** | 8 | 8 | 8 | 8 |
|---|---|---|---|---|---|---|---|---|---|---|---|
| **3** | **3** | **3** | **3** | 7 | 7 | 7 | 7 | 2 | 2 | 2 | 2 |
| 6 | 6 | 6 | 6 | 1 | 1 | 1 | 1 | **5** | **5** | **5** | **5** |

$$\{p'\}_\mu = \{\lfloor s/n \rfloor \times (\mu+1) + \alpha \times \mu\} | \text{modulo } \mu^2$$

$$0 \le \alpha < \mu$$

*FIG. 34*

*Configuration "A"*

μ=3, m=n=4

| Indices of ingress nodes ↑ / Indices of egress nodes → | 0 | 1 | 2 | 3 | 4 | 5 | 6 | 7 | 8 | 9 | 10 | 11 |
|---|---|---|---|---|---|---|---|---|---|---|---|---|
| 11 | 2 | 2 | 2 | 2 | 5 | 5 | 5 | 5 | 8 | 8 | 8 | 8 |
| 10 | 2 | 2 | 2 | 2 | 5 | 5 | 5 | 5 | 8 | 8 | 8 | 8 |
| 9 | 2 | 2 | 2 | 2 | 5 | 5 | 5 | 5 | 8 | 8 | 8 | 8 |
| 8 | 2 | 2 | 2 | 2 | 5 | 5 | 5 | 5 | 8 | 8 | 8 | 8 |
| 7 | 1 | 1 | 1 | 1 | 4 | 4 | 4 | 4 | 7 | 7 | 7 | 7 |
| 6 | 1 | 1 | 1 | 1 | 4 | 4 | 4 | 4 | 7 | 7 | 7 | 7 |
| 5 | 1 | 1 | 1 | 1 | 4 | 4 | 4 | 4 | 7 | 7 | 7 | 7 |
| 4 | 1 | 1 | 1 | 1 | 4 | 4 | 4 | 4 | 7 | 7 | 7 | 7 |
| 3 | 0 | 0 | 0 | 0 | 3 | 3 | 3 | 3 | 6 | 6 | 6 | 6 |
| 2 | 0 | 0 | 0 | 0 | 3 | 3 | 3 | 3 | 6 | 6 | 6 | 6 |
| 1 | 0 | 0 | 0 | 0 | 3 | 3 | 3 | 3 | 6 | 6 | 6 | 6 |
| 0 | 0 | 0 | 0 | 0 | 3 | 3 | 3 | 3 | 6 | 6 | 6 | 6 |

Index of a primary switch

Indices of ingress nodes

Indices of egress nodes

*FIG. 35* j: index of an ingress node; p index of a primary switch

| j | 0 | 1 | 2 | 3 | 4 | 5 | 6 | 7 | **8** | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| p | 0 | 0 | 0 | 0 | 0 | 5 | 5 | 5 | **5** | 5 | 10 | 10 | 10 | 10 | 10 | 15 | 15 | 15 | 15 | 15 |
| p | 4 | 4 | 4 | 4 | 4 | 9 | 9 | 9 | **9** | 9 | 14 | 14 | 14 | 14 | 14 | 3 | 3 | 3 | 3 | 3 |
| p | 8 | 8 | 8 | 8 | 8 | 13 | 13 | 13 | **13** | 13 | 2 | 2 | 2 | 2 | 2 | 7 | 7 | 7 | 7 | 7 |
| p | 12 | 12 | 12 | 12 | 12 | 1 | 1 | 1 | **1** | 1 | 6 | 6 | 6 | 6 | 6 | 11 | 11 | 11 | 11 | 11 |

$$\{p\}_\mu = \{\lfloor j/m \rfloor \times (\mu+1) + \alpha\times\mu\}|\text{modulo } \mu^2$$
$$0 \le \alpha < \mu$$

Configuration "A"
$\mu$=4 m=n=5 p index of a primary switch; k: index of an egress node

| p | 0 | 1 | 2 | 3 | 4 | 5 | 6 | 7 | **8** | **9** | **10** | **11** | 12 | 13 | 14 | 15 |
|---|---|---|---|---|---|---|---|---|---|---|---|---|---|---|---|---|
| k | 0 | 0 | 0 | 0 | 5 | 5 | 5 | 5 | 10 | 10 | 10 | 10 | 15 | 15 | 15 | 15 |
| k | 1 | 1 | 1 | 1 | 6 | 6 | 6 | 6 | 11 | 11 | 11 | 11 | 16 | 16 | 16 | 16 |
| k | 2 | 2 | 2 | 2 | 7 | 7 | 7 | 7 | **12** | **12** | **12** | **12** | 17 | 17 | 17 | 17 |
| k | 3 | 3 | 3 | 3 | 8 | 8 | 8 | 8 | 13 | 13 | 13 | 13 | 18 | 18 | 18 | 18 |
| k | 4 | 4 | 4 | 4 | 9 | 9 | 9 | 9 | 14 | 14 | 14 | 14 | 19 | 19 | 19 | 19 |

$$\{k\}_m = \{\lfloor p/\mu \rfloor \times m + \lambda\}$$
$$0 \le \lambda < m$$

*FIG. 40*

| p: index of a primary switch | 0 | **1** | 2 | 3 | 4 | **5** | 6 | 7 | 8 | **9** | 10 | 11 | 12 | **13** | 14 | 15 |
|---|---|---|---|---|---|---|---|---|---|---|---|---|---|---|---|---|
| s: index of a secondary switch | 0 | **0** | 0 | 0 | 5 | **5** | 5 | 5 | 10 | **10** | 10 | 10 | 15 | **15** | 15 | 15 |
| | 1 | **1** | 1 | 1 | 6 | **6** | 6 | 6 | 11 | **11** | 11 | 11 | 16 | **16** | 16 | 16 |
| | 2 | **2** | 2 | 2 | 7 | **7** | 7 | 7 | 12 | **12** | 12 | 12 | 17 | **17** | 17 | 17 |
| | 3 | **3** | 3 | 3 | 8 | **8** | 8 | 8 | 13 | **13** | 13 | 13 | 18 | **18** | 18 | 18 |
| | 4 | **4** | 4 | 4 | 9 | **9** | 9 | 9 | 14 | **14** | 14 | 14 | 19 | **19** | 19 | 19 |

$$\{s\}_n = \{\lfloor p/\mu \rfloor \times n + \lambda\}$$
$$0 \leq \lambda < n$$

Configuration "A"
$\mu=4$ $m=n=5$

| s: index of a secondary switch | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| p': index of a primary switch | 0 | 0 | 0 | 0 | 0 | 5 | 5 | 5 | 5 | 5 | **10** | **10** | **10** | **10** | **10** | 15 | 15 | 15 | 15 | 15 |
| | 4 | 4 | 4 | 4 | 4 | **9** | **9** | **9** | **9** | **9** | 14 | 14 | 14 | 14 | 14 | 3 | 3 | 3 | 3 | 3 |
| | **8** | **8** | **8** | **8** | **8** | 13 | 13 | 13 | 13 | 13 | 2 | 2 | 2 | 2 | 2 | 7 | 7 | 7 | 7 | 7 |
| | 12 | 12 | 12 | 12 | 12 | 1 | 1 | 1 | 1 | 1 | 6 | 6 | 6 | 6 | 6 | **11** | **11** | **11** | **11** | **11** |

$$\{p'\}_\mu = \{\lfloor s/n \rfloor \times (\mu+1) + \alpha \times \mu\} |\text{modulo } \mu^2$$
$$0 \leq \alpha < \mu$$

*FIG. 41*

*Configuration "A"*

$\mu$=4, m=n=3 j: index of an ingress node

| 0 | 1 | 2 | 3 | 4 | 5 | 6 | 7 | 8 | 9 | 10 | 11 |
|---|---|---|---|---|---|---|---|---|---|---|---|

P: index of a primary switch

| | | | | | | | | | | | |
|---|---|---|---|---|---|---|---|---|---|---|---|
| 0 | 0 | 0 | 5 | 5 | 5 | 10 | 10 | 10 | 15 | 15 | 15 |
| 4 | 4 | 4 | 9 | 9 | 9 | 14 | 14 | 14 | 3 | 3 | 3 |
| 8 | 8 | 8 | 13 | 13 | 13 | 2 | 2 | 2 | 7 | 7 | 7 |
| 12 | 12 | 12 | 1 | 1 | 1 | 6 | 6 | 6 | 11 | 11 | 11 |

$$\{p\}_\mu = \{\lfloor j/m \rfloor \times (\mu+1) + \alpha \times \mu\}|\text{modulo } \mu^2$$

$$0 \le \alpha < \mu$$

P: index of a primary node

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

k: index of an egress node

| | | | | | | | | | | | | | | | |
|---|---|---|---|---|---|---|---|---|---|---|---|---|---|---|---|
| 0 | 0 | 0 | 0 | 3 | 3 | 3 | 3 | 6 | 6 | 6 | 6 | 9 | 9 | 9 | 9 |
| 1 | 1 | 1 | 1 | 4 | 4 | 4 | 4 | 7 | 7 | 7 | 7 | 10 | 10 | 10 | 10 |
| 2 | 2 | 2 | 2 | 5 | 5 | 5 | 5 | 8 | 8 | 8 | 8 | 11 | 11 | 11 | 11 |

$$\{k\}_m = \{\lfloor p/\mu \rfloor \times m + \lambda\}$$

$$0 \le \lambda < m$$

*FIG. 43* p: index of a primary switch

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

s: index of a secondary switch

| | | | | | | | | | | | | | | | |
|---|---|---|---|---|---|---|---|---|---|---|---|---|---|---|---|
| 0 | 0 | 0 | 0 | 3 | 3 | 3 | 3 | 6 | 6 | 6 | 6 | 9 | 9 | 9 | 9 |
| 1 | 1 | 1 | 1 | 4 | 4 | 4 | 4 | 7 | 7 | 7 | 7 | 10 | 10 | 10 | 10 |
| 2 | 2 | 2 | 2 | 5 | 5 | 5 | 5 | 8 | 8 | 8 | 8 | 11 | 11 | 11 | 11 |

$$\{s\}_n = \{\lfloor p/\mu \rfloor \times n + \lambda\}$$

$0 \le \lambda < n$

*Configuration "A"*

$\mu=4$, $m=n=3$ s: index of a secondary switch

| 0 | 1 | 2 | 3 | 4 | 5 | 6 | 7 | 8 | 9 | 10 | 11 |
|---|---|---|---|---|---|---|---|---|---|---|---|

p': index of a primary switch

| | | | | | | | | | | | |
|---|---|---|---|---|---|---|---|---|---|---|---|
| 0 | 0 | 0 | 5 | 5 | 5 | 10 | 10 | 10 | 15 | 15 | 15 |
| 4 | 4 | 4 | 9 | 9 | 9 | 14 | 14 | 14 | 3 | 3 | 3 |
| 8 | 8 | 8 | 13 | 13 | 13 | 2 | 2 | 2 | 7 | 7 | 7 |
| 12 | 12 | 12 | 1 | 1 | 1 | 6 | 6 | 6 | 11 | 11 | 11 |

$$\{p'\}_\mu = \{\lfloor s/n \rfloor \times (\mu+1) + \alpha \times \mu\}|\text{modulo } \mu^2$$

$0 \le \alpha < \mu$

*FIG. 44*

*Configuration "B"*

$\mu=4$, $m=n=3$ j: index of an ingress node

| 0 | 1 | 2 | 3 | 4 | 5 | 6 | 7 | 8 | 9 | 10 | 11 |
|---|---|---|---|---|---|---|---|---|---|---|---|

p: index of a primary switch

| 0 | 0 | 0 | 4 | 4 | 4 | 8 | 8 | 8 | 12 | 12 | 12 |
|---|---|---|---|---|---|---|---|---|---|---|---|
| 1 | 1 | 1 | 5 | 5 | 5 | 9 | 9 | 9 | 13 | 13 | 13 |
| 2 | 2 | 2 | 6 | 6 | 6 | 10 | 10 | 10 | 14 | 14 | 14 |
| 3 | 3 | 3 | 7 | 7 | 7 | 11 | 11 | 11 | 15 | 15 | 15 |

$$\{p\}_{\mu} = \{\lfloor j/m \rfloor \times \mu + \alpha\}$$

$$0 \le \alpha < \mu$$

p: index of a primary switch

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

k: Index of an egress node

| 0 | 3 | 6 | 9 | 0 | 3 | 6 | 9 | 0 | 3 | 6 | 9 | 0 | 3 | 6 | 9 |
|---|---|---|---|---|---|---|---|---|---|---|---|---|---|---|---|
| 1 | 4 | 7 | 10 | 1 | 4 | 7 | 10 | 1 | 4 | 7 | 10 | 1 | 4 | 7 | 10 |
| 2 | 5 | 8 | 11 | 2 | 5 | 8 | 11 | 2 | 5 | 8 | 11 | 2 | 5 | 8 | 11 |

$$\{k\}_{m} = \{\lfloor p_{\text{modulo } \mu} \rfloor \times m + \lambda\}$$

$$0 \le \lambda < m$$

*FIG. 51*

*Configuration "B"*

μ=4, m=n=3 p: index of a primary switch

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

s: index of a secondary switch

| 0 | 3 | 6 | 9 | 0 | 3 | 6 | 9 | 0 | 3 | 6 | 9 | 0 | 3 | 6 | 9 |
|---|---|---|---|---|---|---|---|---|---|---|---|---|---|---|---|
| 1 | 4 | 7 | 10 | 1 | 4 | 7 | 10 | 1 | 4 | 7 | 10 | 1 | 4 | 7 | 10 |
| 2 | 5 | 8 | 11 | 2 | 5 | 8 | 11 | 2 | 5 | 8 | 11 | 2 | 5 | 8 | 11 |

$$\{s\}_n = \{\lfloor p_{\text{modulo } \mu} \rfloor \times n + \lambda\}$$

$$0 \le \lambda < n$$

s: index of a secondary switch

| 0 | 1 | 2 | 3 | 4 | 5 | 6 | 7 | 8 | 9 | 10 | 11 |
|---|---|---|---|---|---|---|---|---|---|---|---|

p': index of a primary switch

| 0 | 0 | 0 | 4 | 4 | 4 | 8 | 8 | 8 | 12 | 12 | 12 |
|---|---|---|---|---|---|---|---|---|---|---|---|
| 1 | 1 | 1 | 5 | 5 | 5 | 9 | 9 | 9 | 13 | 13 | 13 |
| 2 | 2 | 2 | 6 | 6 | 6 | 10 | 10 | 10 | 14 | 14 | 14 |
| 3 | 3 | 3 | 7 | 7 | 7 | 11 | 11 | 11 | 15 | 15 | 15 |

$$\{p'\}_\mu = \{\lfloor s/n \rfloor \times \mu + \alpha$$

$$0 \le \alpha < \mu$$

*FIG. 52*

500
Universal controller
114
Egress node
104
Egress channel
6020
payload data to egress node
6010
Control data to egress node
6030
6030
control data from universal controller
6030
6030
102
Ingress channel

LARGE-SCALE DATA CENTER BASED ON A CONTIGUOUS NETWORK

CROSS-REFERENCE TO RELATED APPLICATIONS

The present application claims the benefit of provisional application 62/131,996 filed on Mar. 12, 2015, titled "Clos-type network having orthogonal inner connectivity", the entire content of which is incorporated herein by reference, and claims the benefit of provisional application 62/240,523 filed on Oct. 12, 2015, titled "A contiguous network for cloud communications", the entire content of which is incorporated herein by reference.

FIELD OF THE INVENTION

The present invention relates to telecommunications systems and, in particular, to methods and apparatus for constructing a large-scale data center or a network that scales to a high capacity and wide coverage suitable for deployment as a shared cloud network.

BACKGROUND

The need for an improved telecommunications network with a much higher capacity, simpler control, lower capital cost and lower operating cost is well recognized. For the past two decades, researches have been rethinking the art of telecommunication networking to overcome the difficulties arising from the rapid untidy growth of the Internet.

Using switches of m×m dimension each, m>1, to construct a three-stage network, the dimension of the network would be $m^2 \times m^2$. With m=64, for example, a network of 4096 input ports and 4096 output port can be realized, with each connection traversing three switches.

Using switches of m×m dimension each to construct a five-stage network, the dimension of the network would be $m^3 \times m^3$. With m=64, a network of 262144 input ports and 262144 output port can be realized. With each connection traversing three intermediate switches, a significant dilation (inner expansion) would be needed where the inner capacity of the network substantially exceeds its access capacity.

The dimension of a multi-stage network grows rapidly as the number of stages increases. However, the complexity increases, and the performance deteriorates, as the number of stages increases. There is a need to explore switching methods which enable constructing large-scale networks while reducing the number of switching stages traversed.

SUMMARY

The invention provides a large-scale data center based on orthogonal connectivity of a distributed single-stage connector, having a large number of disjoint primary switches, to a large number of access nodes and a large number of secondary switches. The orthogonal-connectivity scheme yields a contiguous network providing single-hop paths from each access node to each other access node, from each secondary switch to each other secondary switch, from each access node to each secondary switch, and from each secondary switch to each access node.

An access node includes an ingress node and an egress node. Each access node connects to input ports of a respective first set of primary switches and output ports of a respective second set of primary switches; the second set being orthogonal to the first set. Likewise, each secondary switch connects to input ports of a respective third set of primary switches and output ports of a respective fourth set of primary switches; the fourth set being orthogonal to the first set and the third set. Each access node includes an ingress node and egress node which may be communicatively coupled or completely integrated to share a common switching mechanism. Each access node has a primary path and multiple compound paths to each other access node. A primary path traverses a respective primary switch. Each compound path traverses a respective first primary switch, a respective secondary switch, and a respective second primary switch.

Each access node is equipped with a respective access controller. Each primary switch is equipped with a respective primary controller, and each secondary switch is equipped with a respective secondary controller.

In accordance with an aspect, the present invention provides a network comprising a plurality of access nodes, a plurality of servers, a plurality of primary switches, and a plurality of secondary switches. Each access node is coupled to a set of access channels, upstream channels to a respective first set of primary switches, and downstream channels from a respective second set of primary switches. The second set of primary switches is orthogonal to the first set of primary switches. Each secondary switch is coupled to a respective set of servers of the plurality of servers, channels to a respective third set of primary switches, and channels originating from a respective fourth set of primary switches. The fourth set of primary switches is orthogonal to both the first set of primary switches and the third set of primary switches.

Each access node is coupled to a respective hardware access controller configured to schedule data transfer from the access node to any access node and to any secondary switch. Each secondary switch is coupled to a respective hardware secondary controller configured to schedule data transfer from the secondary switch to any access node and to any other secondary switch.

The hardware access controller comprises a memory device storing a respective access routing table identifying a one-hop path from each access node to each other access node traversing a respective primary switch and a one-hop path from each access node to each secondary switch traversing a respective primary switch. The respective access routing table further identifies for each pair of access nodes at least one compound path traversing a first primary switch, a secondary switch, and a second primary switch, and at least one compound path traversing a first primary switch, an intermediate access node, and a second primary switch.

The hardware secondary controller comprises a memory device storing a respective secondary routing table identifying a one-hop path from each secondary switch to each other secondary switch traversing a respective primary switch, and a one-hop path from each secondary switch to each access node traversing a respective primary switch. The respective secondary routing table further identifies for each pair of secondary switches at least one compound path traversing a first primary switch, an intermediate secondary switch, and a second primary switch, and at least one compound path traversing a first primary switch, an intermediate access node, and a second primary switch. The respective secondary routing table further identifies at least one compound path from each secondary switch to each access node traversing a first primary switch, an intermediate access node, and a second primary switch.

Each of the first set of primary switches and the second set of primary switches comprises μ primary switches, μ>1.

Thus, the plurality of primary switches contains $\mu^2$ primary switches. To facilitate exchange of distributed-control data, each pair of primary switches of indices {p and q}, $q=\{\mu\times p_{modulo\ \mu}+\lfloor p/\mu\rfloor\}$, $0\le p<\mu^2$, share a respective common primary controller; the primary switches being indexed sequentially as 0 to $\mu^2-1$.

It may be desirable to provide central-control capability in addition to distributed control. The network may then include a universal controller. To simplify access to the universal controller, the universal controller is positioned to have a one-hop path from each access node and a one-hop path to each access node. This is realized by coupling the universal controller to μ channels directed to a set of μ primary switches and μ channels originating from an orthogonal set of μ primary switches.

The set of μ primary switches comprises primary switches of indices:

$$\{\eta\times(\mu+1)+\alpha\times\mu\}|\text{modulo } \mu^2.$$

The orthogonal set of μ primary switches comprises primary switches of indices:

$$\{\eta\times\mu+\alpha\};$$

where $0\le\alpha<\mu$, and η is any integer in the range $0\le\eta<\mu$.

In one connectivity scheme, each primary switch comprises m primary input ports each connecting to an upstream channel from an access node and m primary output ports each connecting to a downstream channel to an access node, n secondary input ports each connecting to a channel from a secondary switch and n secondary output ports each connecting to a channel directed to a secondary switch; m>2 and n>1.

The primary input ports connect to m access nodes of indices: $m\times p_{modulo\ \mu}+\lambda$, $0\le\lambda<m$.

The primary output ports connect to m access nodes of indices: $\lfloor p/\mu\rfloor\times m+\lambda$, $0\le\lambda<m$.

The secondary input ports connect to n secondary switches of indices:

$$n\times p_{modulo\ \mu}+\lambda,\ 0\le\lambda<n.$$

The secondary output ports connect to n secondary switches of indices:

$$\lfloor p/\mu\rfloor\times n+\lambda,\ 0\le\lambda<n.$$

The plurality of primary switches comprises $\mu^2$ primary switches indexed sequentially between 0 and $\mu^2-1$, μ>1. The plurality of access nodes comprises μ×m access nodes indexed sequentially between 0 and (μ×m−1). The plurality of secondary switches comprising μ×n secondary switches indexed sequentially between 0 and (μ×n−1).

In another connectivity scheme, the connectivity of each primary switch is devised so that:

the primary input ports connect to m access nodes of indices: $\lfloor p/\mu\rfloor\times m+\lambda$, $0\le\lambda<m$;

the primary output ports connect to m access nodes of indices: $m\times p_{modulo\ \mu}+\lambda$, $0\le\lambda<m$;

the secondary input ports connect to n secondary switches of indices:

$$\lfloor p/\mu\rfloor\times n+\lambda,\ 0\le\lambda<n;\text{ and}$$

the secondary output ports connect to n secondary switches of indices:

$$n\times p_{modulo\ \mu}+\lambda,\ 0\le\lambda<n.$$

In accordance with another aspect, the present invention provides a network comprising a plurality of primary switches interconnecting access nodes of a plurality of access nodes connecting to access channels. The plurality of primary switches further interconnects secondary switches of a plurality of secondary switches and interconnects the plurality of access nodes and the plurality of secondary switches.

In order to provide a one-hop path for any pair of access nodes, any pair of secondary switches, and any pair of an access node and a secondary switch, the connectivity of the network is devised so that:

- each access node is coupled to upstream channels directed to a respective first set of μ primary switches and downstream channels from a respective second set of μ primary switches which is orthogonal to the first set of μ primary switches, μ>1; and
- each secondary switch connects to channels directed to a respective third set of μ primary switches which is orthogonal to the second set of μ primary switches and channels originating from a respective fourth set of μ primary switches which is orthogonal to the third set of μ primary switches.

At least one access node is coupled to a respective set of access channels connected to external data sources and sinks, and at least one access node is coupled to a respective set of servers of a plurality of servers.

Each access node is coupled to a respective hardware access controller configured to schedule data transfer to any other access node or to any secondary switch. The hardware access controller comprises a memory device storing a respective access routing table providing identifiers of one-hop paths from each access node to each other access node, each one-hop path traversing a respective primary switch. The access routing table may also provide identifiers of one-hop paths from each access node to each secondary switch, each one-hop path traversing a respective primary switch. The access routing table also stores identifiers of multiple compound paths from each access node to each other access node, each compound path traversing a first primary switch, a secondary switch, and a second primary switch.

Servers may be coupled to access nodes. However, servers may also be coupled to secondary switches since each access node has a respective one-hop path to each secondary switch and to each other access node and each secondary switch has a one-hop path to each access node and to each other secondary switch.

Each secondary switch is coupled to a respective hardware secondary controller configured to schedule data transfer to any other secondary switch and to any access node. The hardware secondary controller comprises a memory device storing a respective secondary routing table identifying a one-hop path to each other secondary switch traversing a respective primary switch. The secondary routing table may also identify a one-hop path to each access node traversing a respective primary switch. The secondary routing table may also store identifiers of multiple compound paths from the secondary switch to each other secondary switch, each compound path traversing a first primary switch, an access node, and a second primary switch.

According to a first connectivity scheme:

the first set of μ primary switches comprises μ primary switches, μ>1, of indices:

$$\{\lfloor j/m\rfloor\times(\mu+1)+\alpha\times\mu\}|\text{modulo } \mu^2,\ 0\le\alpha<\mu;$$

the second set of primary switches comprises μ primary switches of indices:

$$\{\lfloor j/m\rfloor\times\mu+\alpha\},\ 0\le\alpha<\mu;$$

the third set of primary switches comprises μ primary switches, μ>1, of indices:

$\{\lfloor s/n \rfloor \times(\mu+1)+\alpha\times\mu\}|_{\text{modulo } \mu^2}$, $0\leq\alpha<\mu$;

and the fourth set of primary switches comprises μ primary switches of indices:

$\{\lfloor s/n \rfloor \times\mu+\alpha\}$, $0\leq\alpha<\mu$;

m being the number of access nodes connecting to a primary switch, m>2, n being the number of secondary switches connecting to a primary switch, n>1, j being the index of an access node, 0≤j<μ×m, and s being an index of a secondary switch, 0≤s<μ×n.

According to a second connectivity scheme:

the first set of μ primary switches comprises μ primary switches, μ>1, of indices:

$\{\lfloor j/m \rfloor \times\mu+\alpha\}$, $0\leq\alpha<\mu$;

the second set of primary switches comprises μ primary switches of indices:

$\{\lfloor j/m \rfloor \times(\mu+1)+\alpha\times\mu\}|_{\text{modulo } \mu^2}$, $0\leq\alpha<\mu$;

the third set of primary switches comprises μ primary switches, μ>1, of indices:

$\{\lfloor s/n \rfloor \times\mu+\alpha\}$, $0\leq\alpha<\mu$;

and the fourth set of primary switches comprises μ primary switches of indices:

$\{\lfloor s/n \rfloor \times(\mu+1)+\alpha\times\mu\}|_{\text{modulo } \mu^2}$, $0\leq\alpha<\mu$.

In accordance with a further aspect, the present invention provides a network based on a distributed single-stage connector, comprising a plurality of disjoint primary switches, coupled to a plurality of access nodes and a plurality of secondary switches. Each primary switch is coupled to a respective primary controller. The access nodes are coupled to access channels connecting to external data sources and data sinks. The plurality of secondary switches is coupled to a plurality of servers forming a server farm.

An orthogonal-connectivity scheme is devised to yields a contiguous network providing single-hop paths from each access node to each other access node, from each secondary switch to each other secondary switch, from each access node to each secondary switch, and from each secondary switch to each access node.

Each access node is coupled to:

upstream channels to a respective first set of primary switches; and downstream channels from a respective second set of primary switches orthogonal to the first set of primary switches.

Each secondary switch is coupled to:

channels to a respective third set of primary switches; and channels originating from a respective fourth set of primary switches orthogonal to the first set of primary switches and to the third set of primary switches.

BRIEF DESCRIPTION OF THE DRAWINGS

Example embodiments of the present invention are described below with reference to accompanying drawings, in which:

FIG. 33 illustrates orthogonal connectivity of ingress nodes and egress nodes to primary switches in the network of FIG. 32, in accordance with an embodiment of the present invention;

FIG. 34 illustrates orthogonal connectivity of secondary switches to primary switches in the network of FIG. 32, in accordance with an embodiment of the present invention;

FIG. 35 illustrates connectivity of ingress nodes and egress nodes to primary switches in the network of FIG. 32, in accordance with an embodiment of the present invention;

FIG. 40 illustrates orthogonal connectivity of ingress nodes and egress nodes to primary switches in the network of FIG. 38 and FIG. 39, in accordance with an embodiment of the present invention;

FIG. 41 illustrates orthogonal connectivity of secondary switches to primary switches in the network of FIG. 38 and FIG. 39, in accordance with an embodiment of the present invention;

FIG. 43 illustrates orthogonal connectivity of ingress nodes and egress nodes to primary switches in the network of FIG. 42, in accordance with an embodiment of the present invention;

FIG. 44 illustrates orthogonal connectivity of secondary switches to primary switches in the network of FIG. 42, in accordance with an embodiment of the present invention;

FIG. 51 illustrates orthogonal connectivity of ingress nodes and egress nodes to primary switches in the network of FIG. 50, in accordance with an embodiment of the present invention;

FIG. 52 illustrates orthogonal connectivity of secondary switches to primary switches in the network of FIG. 50, in accordance with an embodiment of the present invention;

Figure 1:
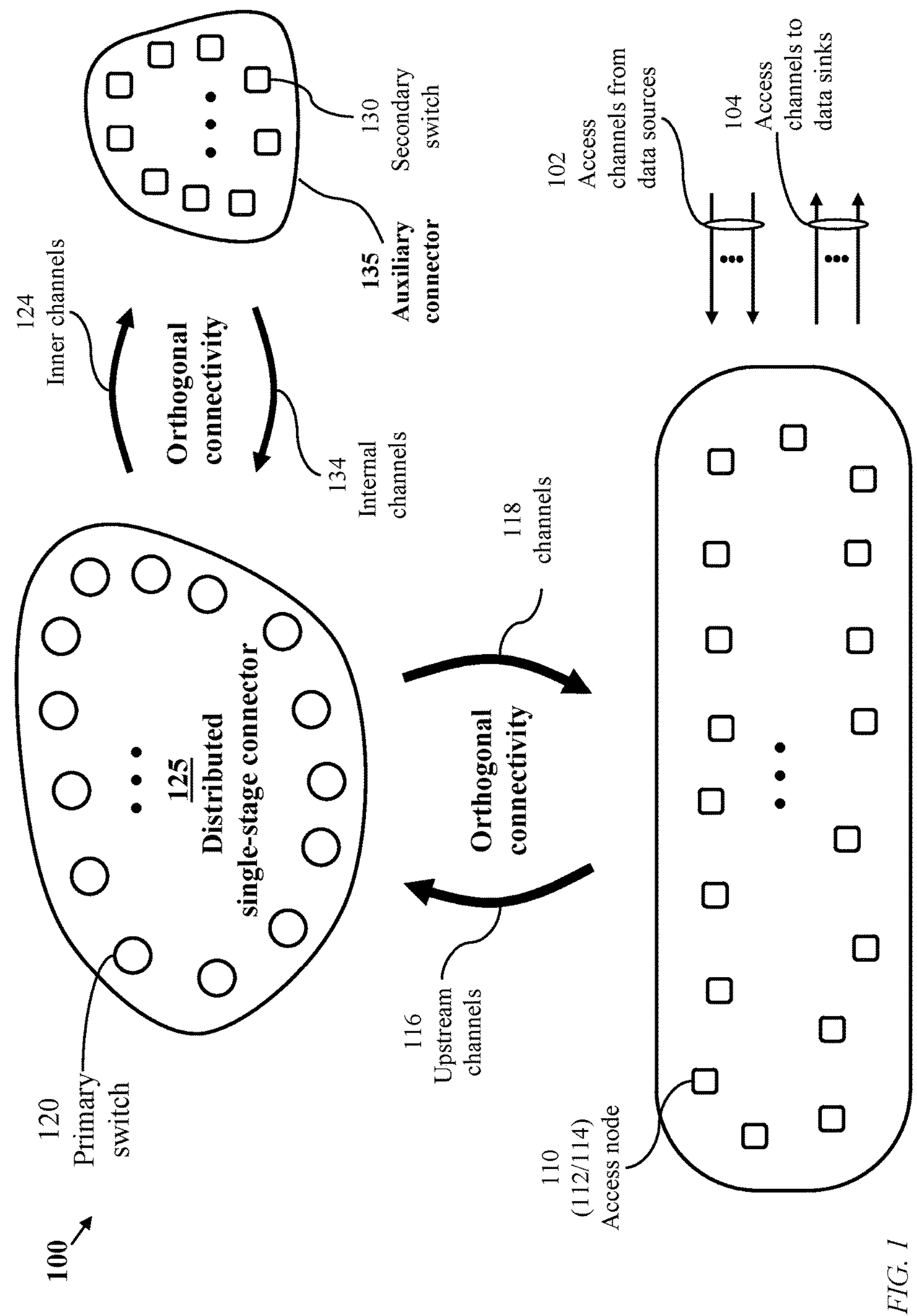
FIG. 1 illustrates a contiguous network, serving external traffic, based on an orthogonal-connectivity concept, the network comprising access nodes, primary switches, and secondary switches, in accordance with an embodiment of the present invention.
Figure 2:
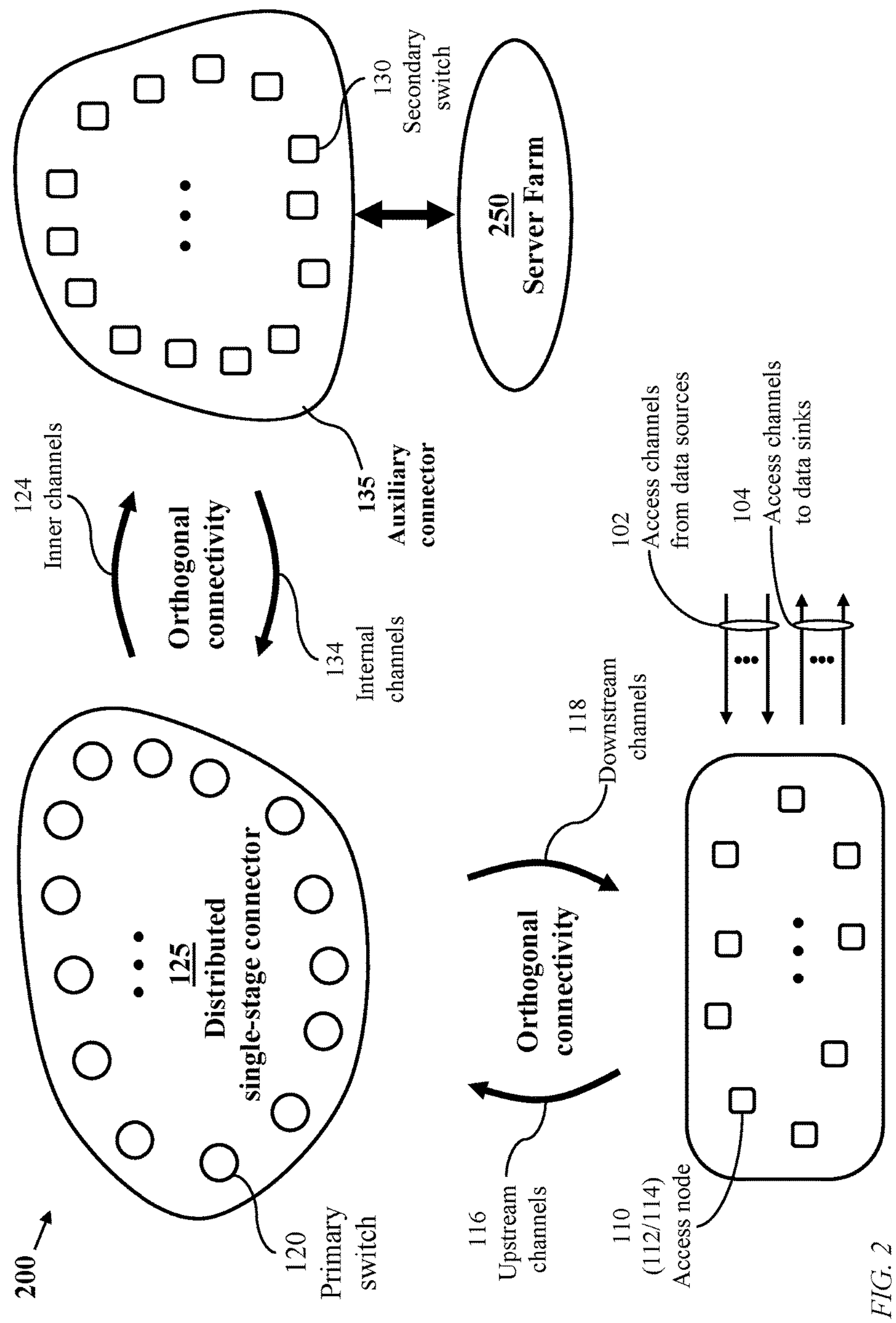
FIG. 2 illustrates the contiguous network of FIG. 1 serving external traffic and providing access to a server farm, in accordance with an embodiment of the present invention.
Figure 20:
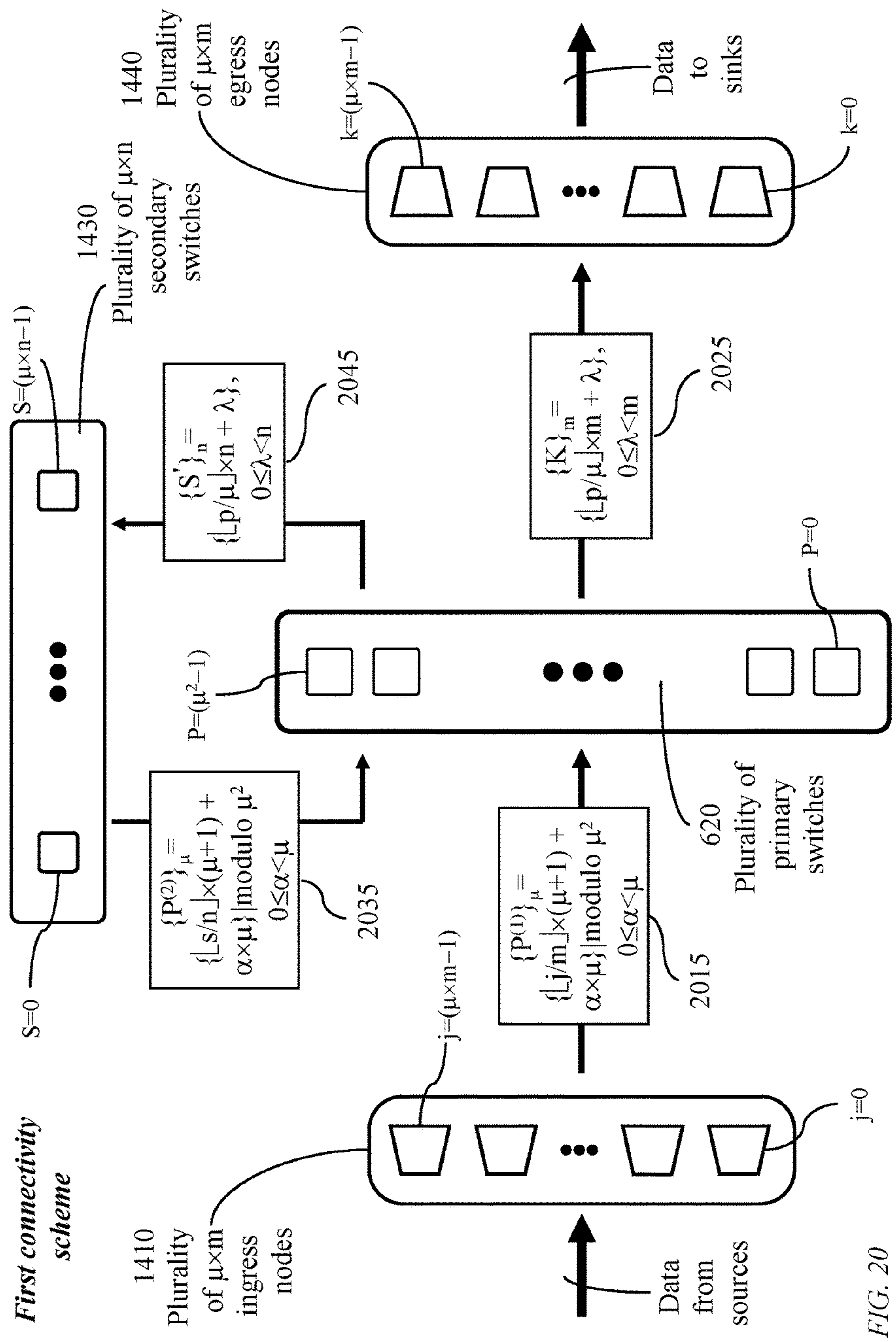
FIG. 20 illustrates a first scheme of inter-stage connectivity of the contiguous network of FIG. 1, in accordance with an embodiment of the present invention.
Figure 64:
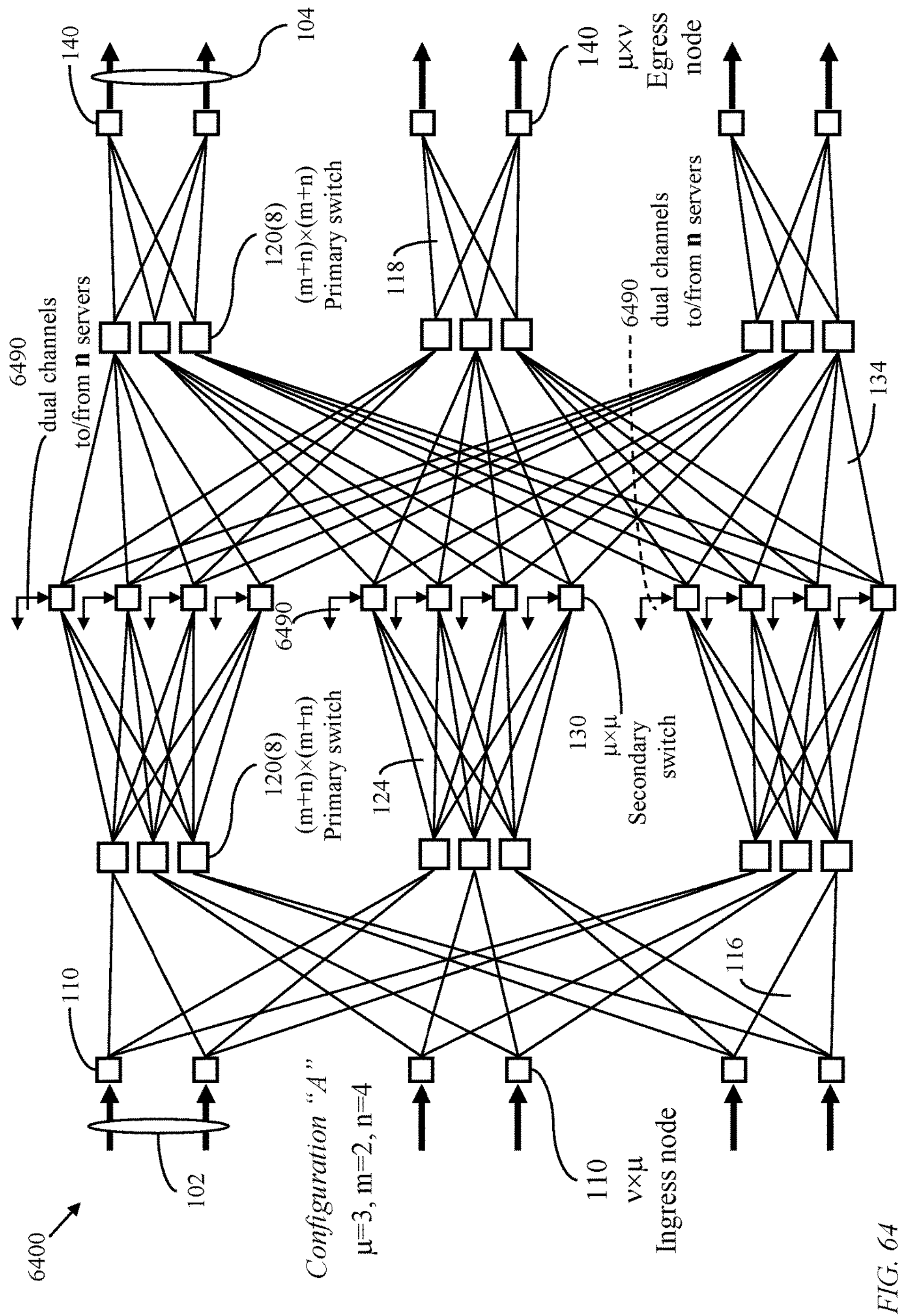
Figure 65:
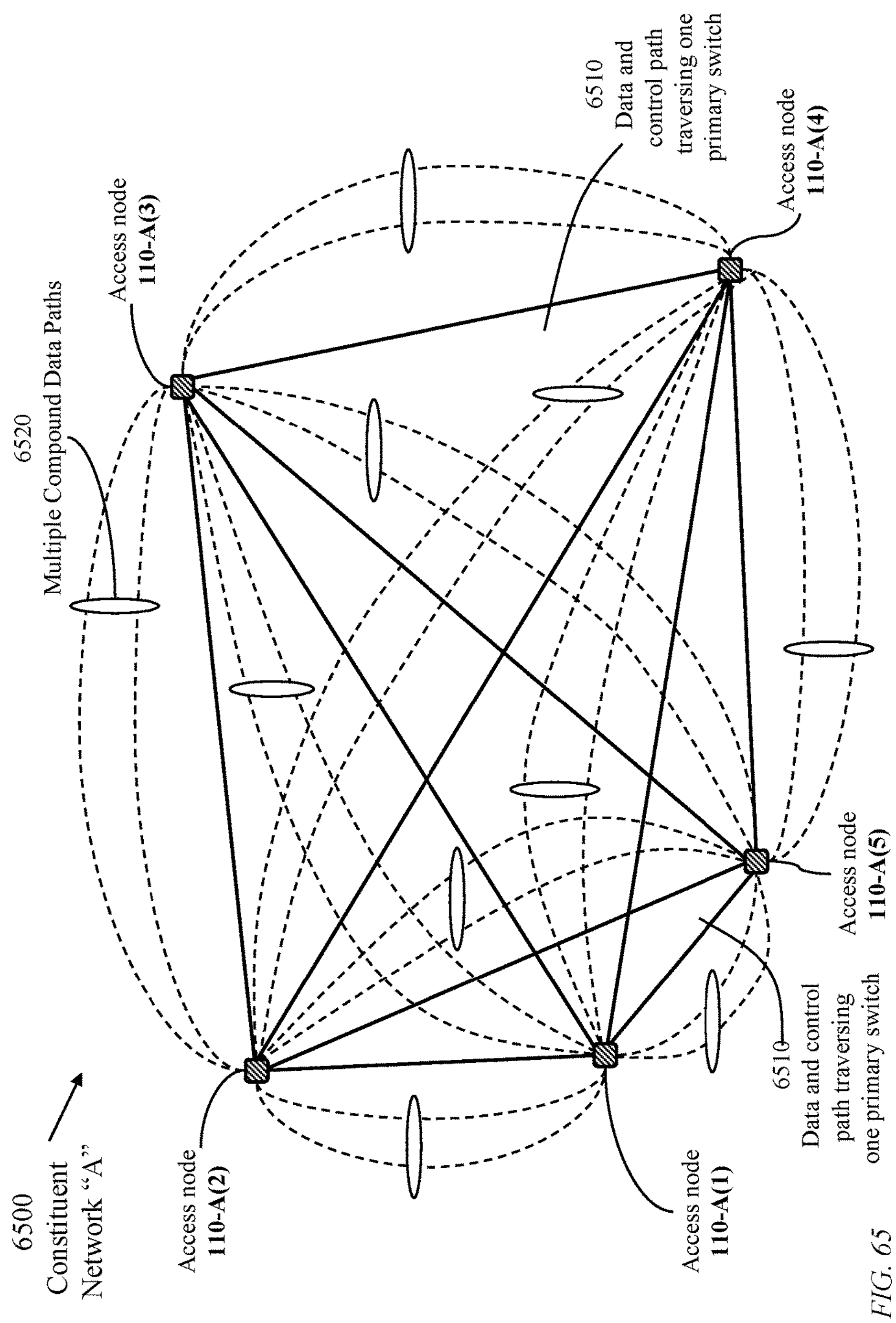
Figure 66:
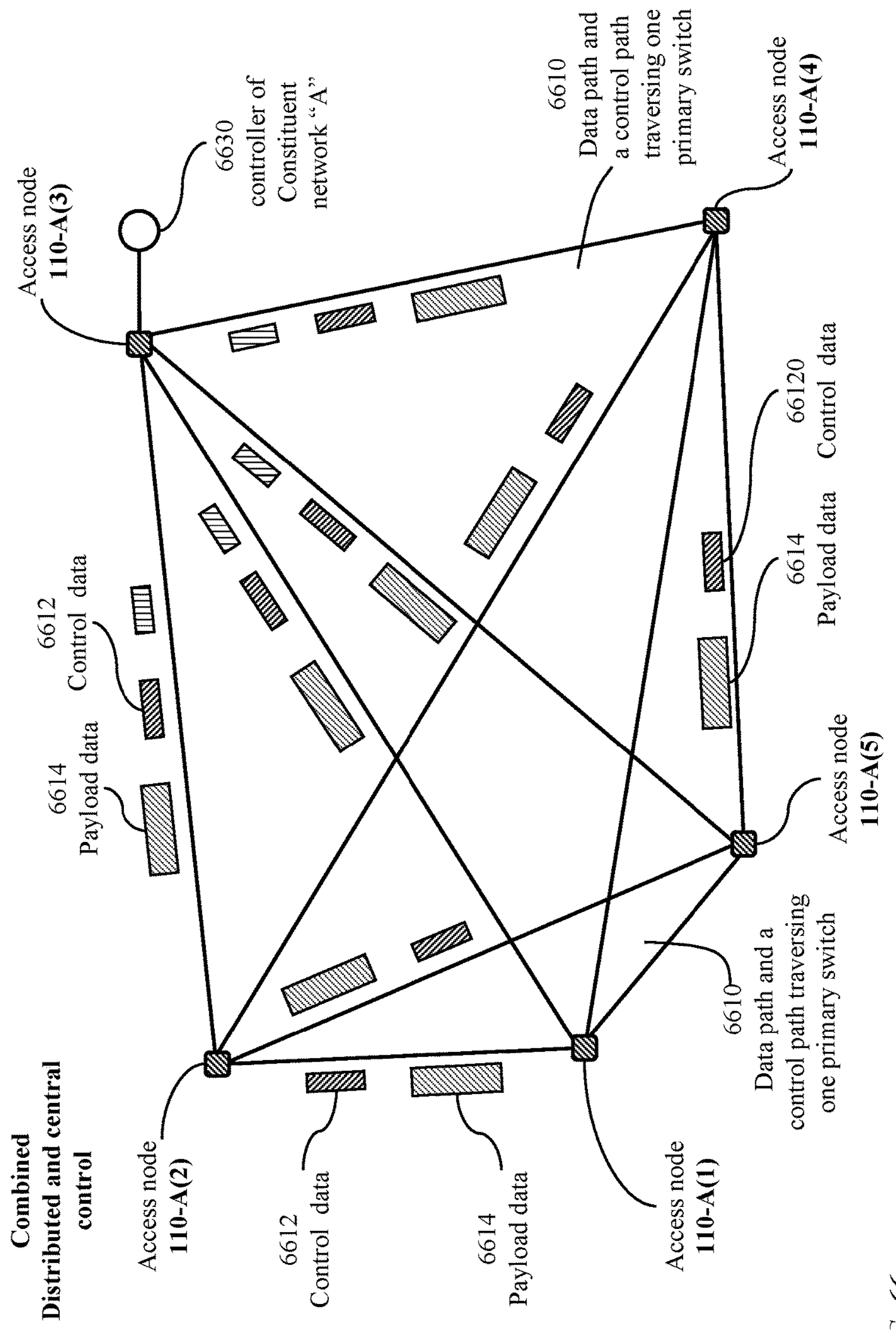
Figure 67:
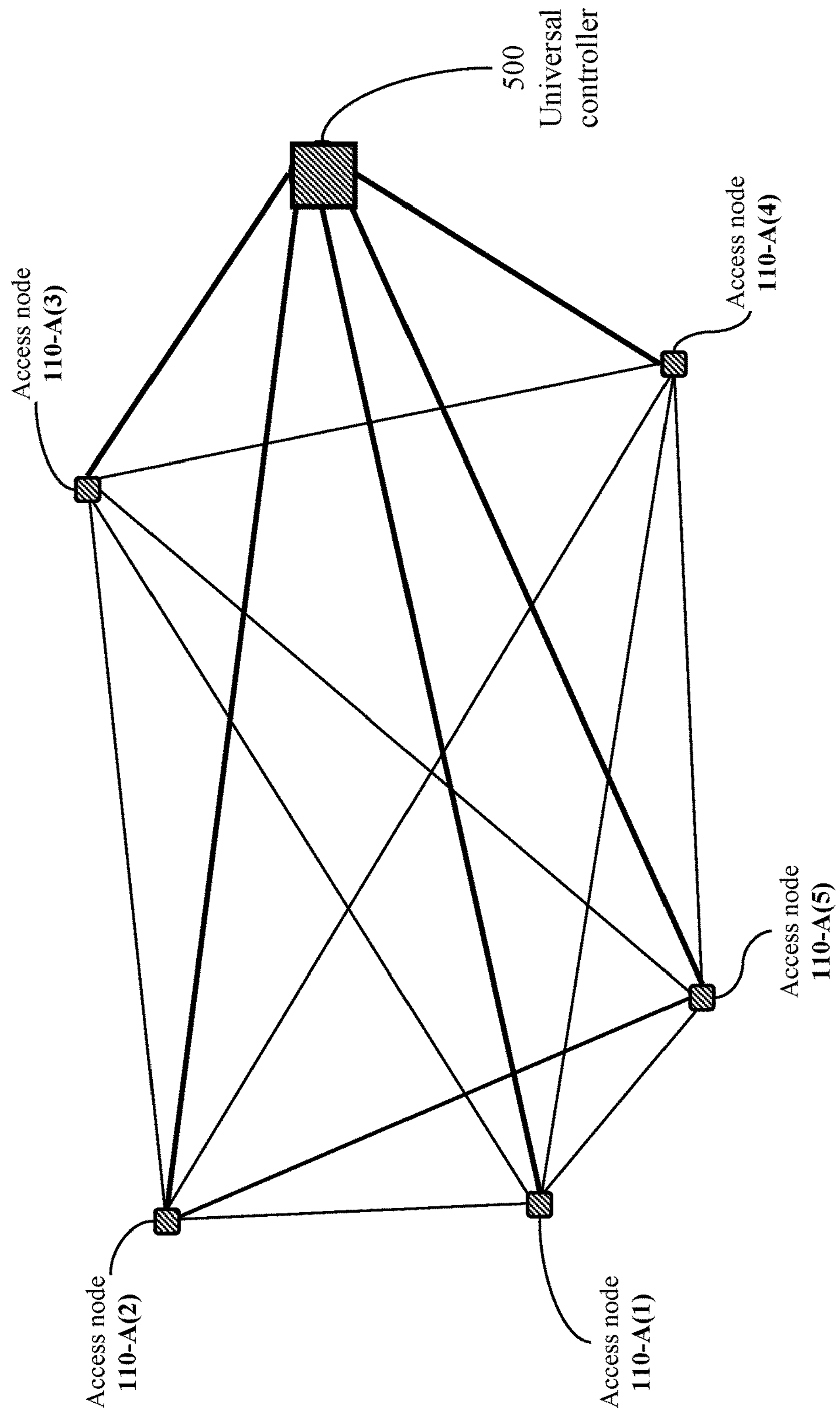
Figure 68:
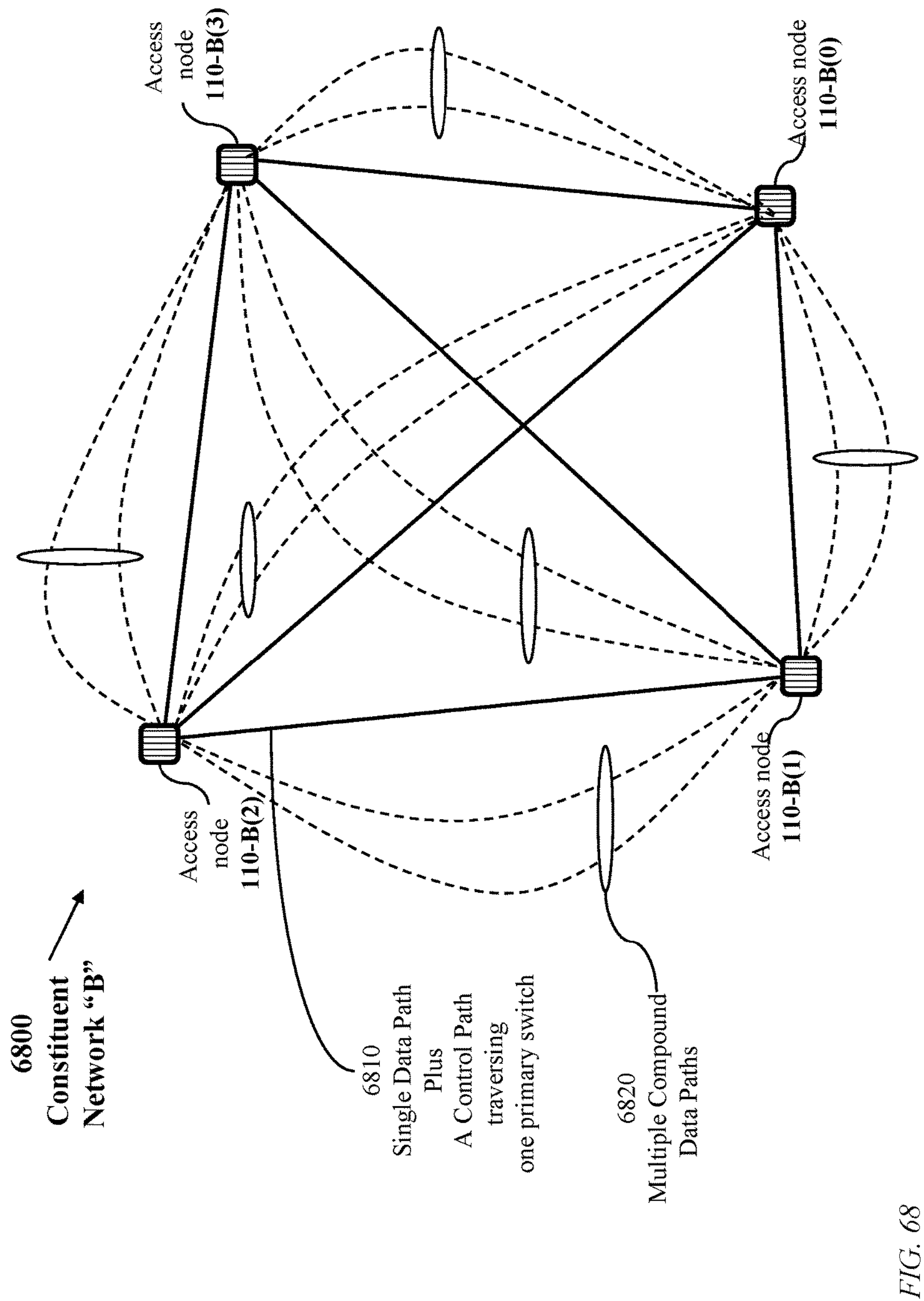
Figure 69:
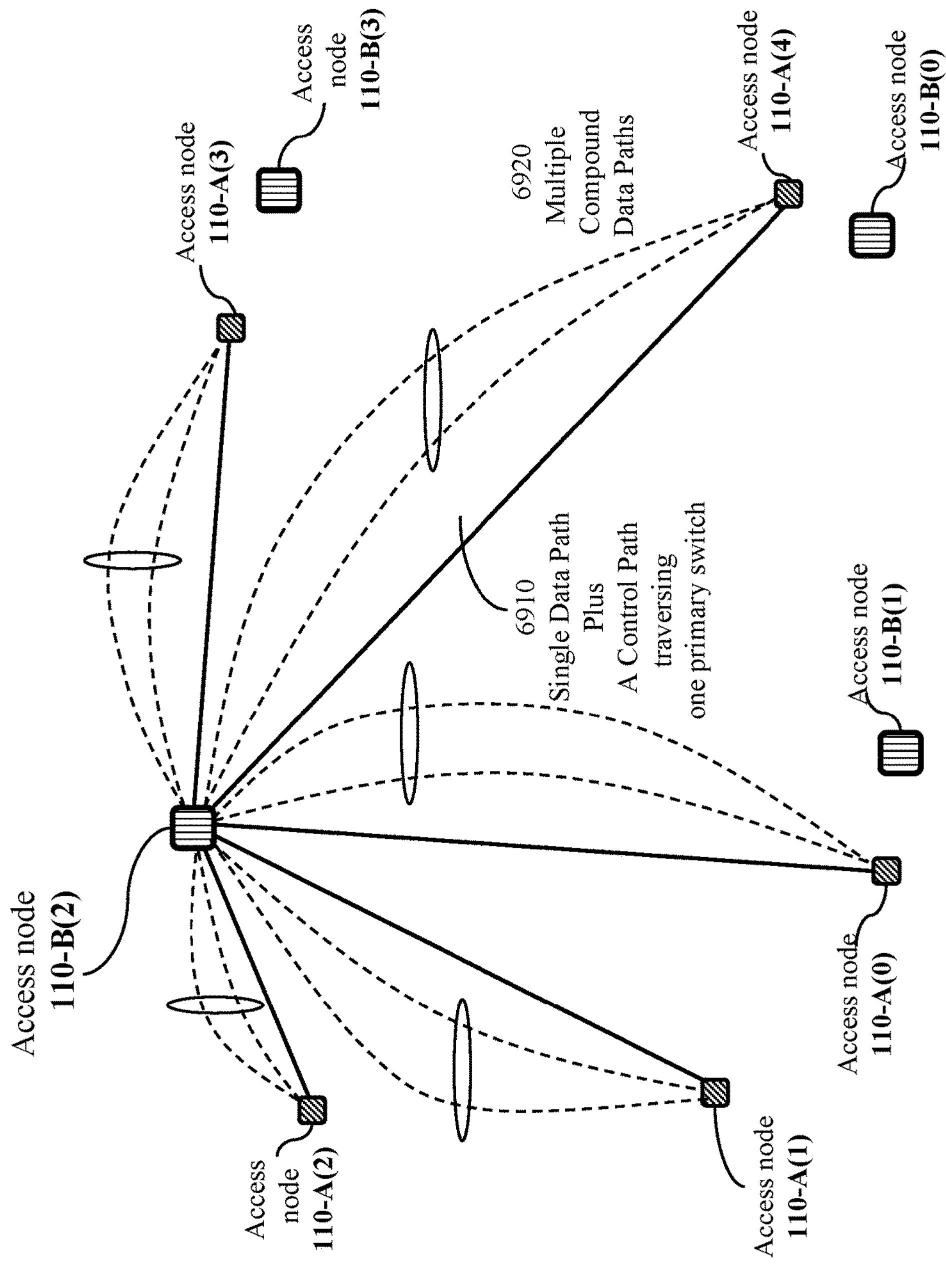

21, with each secondary switch coupled to a respective set of servers, in accordance with an embodiment of the present invention;

FIG. 64 illustrates an implementation of the network of FIG. 2 according to the first connectivity scheme of FIG. 20, with each secondary switch coupled to a respective set of servers, in accordance with an embodiment of the present invention;

FIG. 65 illustrates a first constituent network of the cloud-communications network of FIG. 1;

FIG. 66 illustrates payload data and control data flow in the constituent network of FIG. 65, in accordance with an embodiment of the present invention;

FIG. 67 illustrates the constituent network of FIG. 65 having control paths to a universal controller;

FIG. 68 illustrates a second constituent network of the cloud-communications network of FIG. 1; and FIG. 69 illustrates connections from an access node of the second constituent network of FIG. 68 to the access nodes of the first constituent network of FIG. 65.

REFERENCE NUMERALS

A reference numeral may individually or collectively refer to items of a same type. A reference numeral may further be indexed to distinguish individual items of a same type.

100: A high-capacity wide-coverage network of minimal diameter that may be operated as a shared cloud network
102: Access channels (ingress channels) from external data sources to access nodes 110
104: Access channels (egress channels) from access nodes 110 to external data sinks
110: An access node comprising an ingress node 112 and an egress node 114
112: An ingress node
114: An egress node
116: a set of upstream channels from a set of access nodes 110 to distributed single-stage connector 125
118: a set of downstream channels from distributed single-stage connector 125 to the set of access nodes 110
120: A primary switch
124: a set of inner channels from distributed single-stage connector 125 to a set 135 of secondary switches 130
125: A distributed single-stage connector comprising disjoint primary switches 120
134: a set of internal channels from the set 135 of secondary switches 130 to distributed single-stage connector 125
135: An auxiliary connector comprising disjoint secondary switches 130
130: A secondary switch
200: A high-capacity network of minimal diameter that may be operated as a large-scale data center
250: A server farm comprising a large number of servers (computer devices/hosts)
416: A WDM (wavelength division multiplexed) link from an access node 110 to a primary switch 120
418: A WDM (wavelength division multiplexed) link from a primary switch 120 to an access node 110
500: A universal controller
612: One-hop path
700: Upstream paths from access nodes 110 to a universal controller 500
800: Downstream paths from universal controller 500 to access nodes 110
900: An access node comprising an ingress node 112 and an egress node 114 sharing an access controller 960
960: Access controller
1010: Ingress ports each connecting to an ingress channel or a server
1020: input ports each connecting to a channel from a primary switch
1030: Egress ports each connecting to an ingress channel or a server
1040: Output ports each connecting to a channel to a primary switch
1050: Switching mechanism of an access node 110
1051: A path from any ingress port 1010 to any egress port 1030
1052: A path from any ingress port 1010 to any output port 1040
1053: A path from any input port 1020 to any egress port 1030
1054: A path from any input port 1020 to any output port 1040
1060: An access controller
1110: Input port of a primary switch 120 connecting to an ingress node 112
1120: Input port of a primary switch 120 connecting to a secondary switch 130
1130: Output port of a primary switch 120 connecting to an egress node 114
1140: Output port of a primary switch 120 connecting to a secondary switch 130
1150: Switching mechanism of a primary switch 120
1151: A path from any of m input ports 1110 connecting to m ingress nodes 112 to any of m output ports 1130 connecting to m egress nodes 114
1152: A path from any of m input ports 1110 connecting to m ingress nodes 112 to any of n output ports 1140 connecting to n secondary switches 130
1153: A path from any of n input ports 1120 connecting to n secondary switches 130 to any of m output ports 1130 connecting to m egress nodes 114
1154: A path from any of n input ports 1120 connecting to n secondary switches 130 to any of n output ports 1140 connecting to n secondary switches 130
1160: Controller of a primary switch 120
1200: A secondary switch for network 100
1210: Input ports of a secondary switch 1200
1211: Control input port
1230: Output ports of a secondary switch 1200
1231: Control output port
1250: Switching mechanism of a secondary switch 1200
1260: Controller of a secondary switch 1200
1300: A secondary switch for network 200
1310: Input ports of a secondary switch 1300 connecting to channels from primary switches 120
1311: Control input port
1320: Input ports of a secondary switch 1300 connecting to servers 1370
1330: Output ports of a secondary switch 1300 connecting to channels directed to primary switches 120
1331: Control output port
1340: Output ports of a secondary switch 1300 connecting to servers 1370
1350: Switching mechanism of a secondary switch 1300
1360: Controller of a secondary switch 1300
1370: Servers coupled to a secondary switch 1300
1400: A schematic of network 100
1402: Data originating from data sources
1410: A plurality of ingress nodes
1420: A plurality of primary switches 120 forming the distributed single-stage connector 125

1422: Data transferred from the plurality 1410 of ingress nodes to the plurality 1440 of egress nodes through the plurality 1420 of primary switches 120 forming the distributed single-stage connector 125
1424: Data transferred from the plurality 1410 of ingress nodes to the plurality 1430 of secondary switches 130 through the plurality 1420 of primary switches 120 forming the distributed single-stage connector 125
1430: A plurality of secondary switches 130 forming the auxiliary connector 135
1440: A plurality of egress nodes
1442: Data delivered to data sinks
1618: Ingress ports of an ingress node 112
1619: Output ports of an ingress node 112
1628: Input ports of a primary switch 120
1629: Output ports of a primary switch 120
1638: Input ports of a secondary switch 130
1639: Output ports of a secondary switch 130
1643: Input ports of an egress node 114
1644: Egress ports of an egress node 114
1702: Data from data sources
1710: Aggregate ingress flow of the entire network 100
1720: Aggregate flow through the distributed single-stage connector 125
1721: Control data directed to the auxiliary connector 135
1722: Control data from the auxiliary connector 135
1740: Aggregate egress flow of the entire network 100
1802: Data from data sources
1810: Aggregate ingress flow
1820: Aggregate flow through the distributed single-stage connector 125
1830: Aggregate flow of data through the auxiliary connector 135
1840: Aggregate egress flow
1902: Data from data sources
1910: Aggregate ingress flow
1920: Aggregate flow through the distributed single-stage connector 125
1930: Aggregate flow of data through the auxiliary connector 135 coupled to a server farm
1940: Aggregate egress flow
2015: A first connectivity pattern of the plurality 1410 of ingress nodes 112 to the plurality 1420 of primary switches 120 forming the distributed single-stage connector 125
2025: A first connectivity pattern of the plurality 1420 of primary switches 120 forming the distributed single-stage connector 125 to the plurality 1440 of egress nodes 114
2035: A first connectivity pattern of the plurality 1430 of secondary switches 130 forming the auxiliary connector 135 to the plurality 1420 of primary switches 120 forming the distributed single-stage connector 125
2045: A first connectivity pattern of the plurality 1420 of primary switches 120 forming the distributed single-stage connector 125 to the plurality 1430 of secondary switches 130 forming the auxiliary connector 135
2115: A second connectivity pattern of the plurality 1410 of ingress nodes 112 to the plurality 1420 of primary switches 120 forming the distributed single-stage connector 125
2125: A second connectivity pattern of the plurality 1420 of primary switches 120 forming the distributed single-stage connector 125 to the plurality 1440 of egress nodes 114
2135: A second connectivity pattern of the plurality 1430 of secondary switches 130 forming the auxiliary connector 135 to the plurality 1420 of primary switches 120 forming the distributed single-stage connector 125
2145: A second connectivity pattern of the plurality 1420 of primary switches 120 forming the distributed single-stage connector 125 to the plurality 1430 of secondary switches 130 forming the auxiliary connector 135
2210: Identifiers of ingress nodes connecting to inputs of a specific primary switch according to the first connectivity pattern
2220: Identifiers of egress nodes connecting to outputs of the specific primary switch according to the first connectivity pattern
2230: Identifiers of secondary switches connecting to inputs of the specific primary switch according to the first connectivity pattern
2240: Identifiers of secondary switches connecting to outputs of the specific primary switch according to the first connectivity pattern
2310: Identifiers of ingress nodes connecting to inputs of a specific primary switch according to the second connectivity pattern
2320: Identifiers of egress nodes connecting to outputs of the specific primary switch according to the second connectivity pattern
2330: Identifiers of secondary switches connecting to inputs of the specific primary switch according to the second connectivity pattern
2340: Identifiers of secondary switches connecting to outputs of the specific primary switch according to the second connectivity pattern
2620: Index of a primary switch
2750A: Switching mechanism of a first primary switch 120A
2750B: Switching mechanism of a second primary switch 120B
2760A: Controller of first primary switch 120A
2760B: Controller of second primary switch 120B
2780: Timing circuit
2850A: Switching mechanism of a first primary switch 120A
2850B: Switching mechanism of a second primary switch 120B
2851: Control input port
2852: Control output port
2860A: Controller of first primary switch 120A
2860B: Controller of second primary switch 120B
2910 to 2980: Processes of connection routing through a primary switch
3010 to 3070: Processes of connection routing through a secondary switch and two primary switches
3100: A primary switch configured as a latent switch
3200: A network with orthogonal inner connectivity
3600: A network with orthogonal inner connectivity similar to the network of FIG. 32 with a reduced number of secondary switches
3800: A network with orthogonal inner connectivity
4200: A network with orthogonal inner connectivity
4500: A network with orthogonal inner connectivity
4800: A network with orthogonal inner connectivity similar to the network of FIG. 45 with a reduced number of secondary switches
5000: A network with orthogonal inner connectivity
5716: Channels from universal controller 500 to primary switches 120
5718: Channels from primary switches 120 to the universal controller 500
5910: Control data from ingress nodes 112 directed to universal controller 500
5920: Payload data

5930: Switched control data at inputs of universal controller 500

6010: Control data from universal controller 500 directed to egress nodes 114

6020: Payload data

6030: Control data at outputs of universal controller 500

6170: A set of servers

6300: An exemplary implementation of network 200 according to the first connectivity scheme of FIG. 20

6390: Dual channels from secondary switches 130 to/from servers

6400: An exemplary implementation of network 200 according to the second connectivity scheme of FIG. 21

6500: A first constituent network

6510: One-hop path carrying control data and payload data between two access nodes traversing one primary switch in the first constituent network 6500

6520: Multiple compound paths, between two access nodes, in the first constituent network

6612: Control data

6614: Payload data

6630: Central controller of constituent network 6500

6800: A second constituent network

6810: One-hop path carrying control data and payload data between two access nodes traversing one primary switch in a second constituent network

6820: Multiple compound paths, between two access nodes, in a second constituent network

6910: One-hop path carrying control data and payload data between an access node of the second constituent network 6800 and an access node of the first constituent network 6500 traversing one primary switch of the cloud communication network 100

6920: Multiple compound paths, between an access node of the second constituent network 6800 and an access node of the first constituent network 6500, through the contiguous network 100

Terminology and Notations

Access node: A switching node connecting data sources and data sinks to switches/routers of a network is referenced as an "access node" or simply "node" for brevity. An access node comprises an "ingress node" and an "egress node" which may share a common node controller and may share a common switching mechanism.

Switch: A switch has a number of input ports, a number of output ports, and a switching mechanism (often called a "switch fabric") connecting any input port to any output port. A switch may comprise multiple building blocks called "switch units" or "switch modules".

Switch dimension: The number of input ports (inlet ports) and the number of output ports (outlet ports) of a switch define a "dimension" of the switch. A switch having $n_1$ input ports and $n_2$ output ports, $n_1>1$, $n_2>1$, is said to be of dimension $n_1 \times n_2$. An input port and a corresponding output port constitute a dual port. With $n_1=n_2=n$, the switch would have n dual ports and the switch dimension may simply be expressed as the number of dual ports.

Space switch: A space switch has input ports and output ports and is configured to connect any input port to any output port. An instantaneous space switch transfers data from an input port to a selected output port with negligible delay. A latent space switch transfers data from an input port to an output port after a systematic switching delay.

Primary switch: The term is used herein to refer to a switch which directly connects a first set of nodes (a first set of access nodes) to second set of nodes (another set of access nodes).

Secondary switch: The term is used herein to refer to a switch which interconnects a first set of primary switches to a second set of primary switches. A secondary switch does not connect directly to nodes (access nodes).

Data-switching center: A data-switching centre is an apparatus for directing data from any input channel of a plurality input channels to any output channel of a plurality of output channel. The input data may include packets of arbitrary lengths and, to facilitate switching, the packets may be segmented into data segments of equal size and switched internally as such. The switched data segments are reassembled at output to reproduce the packets in the forms in which they were received.

Non-blocking switching: A switching device having multiple input ports and multiple output ports which guarantees a path from an input port to an output port (where each of the input port and the output port has a sufficient vacancy) is said to provide non-blocking switching.

Contention-free switching: A switching device having multiple input ports and multiple output ports which establishes a path from an input port to an output port (where each of the input port and the output port has a sufficient vacancy) without a search process is said to provide contention-free switching. A contention-free switching device is naturally a non-blocking switching device. A contention-free switching device is typically of a moderate dimension; having 64 dual ports for example.

Rotator: A rotator is a simple device having multiple inlets and multiple outlets. The rotator cyclically connects each inlet to each outlet in a predefined order during every rotation cycle. The rotator itself is not a switching device because it lacks the steering capability; a switching device should have at least one degree of freedom. A rotator scales to a very high dimension, i.e., a large number of inlets and a large number of outlets.

Wide-coverage network: A wide-coverage network is a distributed switching system comprising a large number of access nodes. The network transfers data from data sources to data sinks, where the data sources and sinks may be distributed over a wide geographical area, such as a continent or the entire Globe.

Switching-system coverage: The term refers to the number of access nodes of a switching system. A switching system herein may refer to a large-scale data center or a geographically distributed network.

Adjacent nodes: Access nodes connecting to a same switch are said to be "topologically mutually adjacent nodes" or simply "mutually adjacent nodes". A first access node is said to be adjacent to a second access node if the two access nodes connect to a same switch.

Topologically distant nodes (distant nodes for brevity): any two access nodes connecting to different switches are said to be "topologically distant access nodes" or simply "distant access nodes". An access node not connected to a particular switch is also said to be a distant access node with respect to the particular switch. Thus, all access nodes excluding a set of access nodes connecting to a particular switch are distant access nodes with respect to the particular switch.

Flow: The term refers to at least one data stream from an originating node to a destination node.

Access capacity: The access capacity of a switching system is the sum of port capacities of all ingress ports, receiving data from external sources, which is typically equal to the sum of port capacities of all egress ports transmitting data to external sinks.

Inner capacity: The term is relevant to a switching system of at least two switching stages. A first sum of the port capacities of all output ports of switches of a first stage or a second sum of the port capacities of all input ports of switches of a last stage, if less than the first sum, is referenced as an inner capacity of the switching system.

Port capacity: The maximum flow rate (in bits/second for example) that a port of a switching device can sustain is referenced as a port capacity.

Input occupancy: The allocated capacity of an input port of a switch is referenced as the (absolute) input occupancy of the input port. A relative occupancy of the input port may be defined as a ratio of the allocated capacity to capacity of the input port. In operation, the controller of a switch may use an indication of the vacancy of the input port for route allocation. The vacancy of an input port is the capacity of the input port minus the allocated capacity.

Output occupancy: The allocated capacity of an output port of a switch is referenced as the (absolute) output occupancy of the output port. A relative occupancy of the output port may be defined as a ratio of the allocated capacity to capacity of the output port. In operation, the controller of a switch may use an indication of the vacancy of the output port for route allocation. The vacancy of an output port is the capacity of the output port minus the allocated capacity.

Orthogonal sets of switches: Two sets of switches are said to be orthogonal if they have a specified number of common switches. Unless otherwise stated, the specified number is one.

Orthogonal sets: Any two sets are said to be orthogonal if the two sets have a number of common elements (node or switch) not exceeding a predefined upper bound.

Orthogonality Index: The number of common nodes in any two sets of nodes defines an orthogonality index.

Channel: A communication medium or a portion of a communication medium carrying a continuous stream of data is referenced as a channel.

Channel capacity: The maximum flow rate, in bits-per-second for example, of a communication channel is referenced as a channel capacity.

Upstream direction: The direction of signal flow from a node towards a switch is referenced as the upstream direction. A channel from a node to a switch is referenced as an upstream channel.

Downstream direction: The direction of signal flow from a switch towards a node is referenced as the downstream direction. A channel from a switch to a node is referenced as a downstream channel.

Upstream channel: A communication channel from an ingress node to a primary switch is referenced as an upstream channel.

Downstream channel: A communication channel from a primary switch to an egress node is referenced as a downstream channel.

Inner channel: A communication channel from a primary switch to a secondary switch is referenced as an inner channel.

Internal channel: A communication channel from a secondary switch to a primary switch is referenced as an internal channel.

Link: a number of channels sharing a communication medium form a link; a wavelength band in an optical fiber link may have multiple wavelength bands each constituting a single a channel.

Primary path: A primary path from an access node to another access node traverses one primary switch. Likewise, a primary path from an access node to a secondary switch traverses one primary switch, and a primary path from a secondary switch to another secondary switch traverses one primary switch.

One-hop path: The terms "primary path" and "one-hop path" are used synonymously

Compound path: A compound path comprises two concatenated primary paths, i.e., two adjoined one-hop paths. Thus, a compound path from a first access node to a second access node may comprise a primary path from the first access node to a secondary switch and a primary path from the secondary switch to the second access node. Alternatively, the compound path may comprise a primary path from the first access node to an intermediate access node and a primary path from the intermediate access node to the second access node. A compound path comprises two adjoined primary paths.

Route: The terms "route" and "path" are used synonymously.

Hardware controller: A hardware controller comprises at least one hardware processor and at least one memory device storing software instructions which cause the processor to implement predefined functions.

Node controller: A node controller is a device having at least one hardware processor and at least one memory device storing processor-readable instructions. Each node is coupled to a respective node controller. A node controller may be embedded in the structure of a respective node or configured as a separate entity communicatively coupled to the respective node.

Ingress controller: A controller of an ingress node is referenced as an ingress controller.

Egress controller: A controller of an egress node is referenced as an egress controller.

Access controller: Preferably, each ingress node is paired with an egress node to form an access node. A controller of the access node performs the functions of an ingress controller and an egress controller.

Switch controller: A switch controller is a device having at least one hardware processor and at least one memory device storing processor-readable instructions. Each switch is coupled to a respective switch controller. A switch controller may be embedded in the structure of a respective switch or configured as a separate entity communicatively coupled to the respective switch.

Primary controller: A controller of a primary switch is referenced as a primary controller.

Secondary controller: A controller of a secondary switch is referenced as a secondary controller.

$\lfloor\alpha\rfloor$: $\lfloor\alpha\rfloor$ denotes the nearest integer lower than or equal to $\alpha$ if $\alpha$ is a real number; $\lfloor\alpha\rfloor=\alpha$ if $\alpha$ is an integer $\lceil\alpha\rceil$: $\lceil\alpha\rceil$ denotes the nearest integer higher than or equal to $\alpha$ if $\alpha$ is a real number; $\lceil\alpha\rceil=\alpha$ if $\alpha$ is an integer Modulo operation: The operation X modulo W, herein denoted $X_{modulo\ W}$, X|modulo W, or $|X|_W$, where X is any integer, which may be a positive integer or a negative integer, and W is a positive integer is a remainder determined as: $X_{modulo\ W}=X-W\times\lfloor X/W\rfloor$, where $\lfloor R\rfloor$ is the nearest integer that is less than R or equal to R if R is an integer. For example: $\lfloor 7/8\rfloor=0$, $\lfloor -7/8\rfloor=-1$, $\lfloor 8/8\rfloor=1$, $\lfloor -8/8\rfloor=-1$, $\lfloor 9/8\rfloor=1$, $\lfloor -9/8\rfloor=-2$. Thus, $7_{modulo\ 8}=7$, $(-7)_{modulo\ 8}=\{-7-(-1)\times 8\}=1$, $8_{modulo\ 8}=0$, $(-8)_{modulo\ 8}=0$, $9_{modulo\ 8}=1$, and $(-9)_{modulo\ 8}=7$.

$\{A\}_J$: A set of elements denoted as $A_0, A_1, \ldots, A_{J-1}$, J>1, is denoted $\{A\}_J$.

The notation $\{G\}_q$ refers to a set of q elements of a variable G. For example: $\{P\}_\mu$ is used in the specification to denote indices, P, of a set of μ primary switches connecting to an ingress node; $\{k\}_m$ denotes indices, k, of a set of m egress nodes connecting to a primary switch;

$\{S\}_n$ denotes indices, S, of a set of n secondary switches connecting to output ports of a primary switch; and $\{P'\}_\mu$ denotes indices P' of a set of μ primary switches connecting to output ports of a secondary switch.

DETAILED DESCRIPTION

The present application discloses a switching system which scales gracefully from a capacity of the order of a terabit per second to tens of thousands of terabits per second. Independent space switches interconnect access nodes coupled to data sources and data sinks, where each access node has a path to each other access node traversing only one switch. Sets of source nodes connecting to independent switch units are selected to be mutually orthogonal. Two sets of nodes are said to be mutually orthogonal if the two sets have a number of nodes in common not exceeding a predefined upper bound; the upper bound is preferably 1. A controller of a switch unit implemented as an instantaneous space switch may allocate time slots for connections according to a temporal-packing process where a search for an allocable time slot for each of the connections starts from a designated time slot in a slotted time frame. A controller of a switch unit implemented as a latent space switch comprising a first rotator connecting input ports to a bank of transit memory devices and a second rotator connecting the bank of transit memory devices to output ports may allocate time slots for connections according to a transit-memory-packing process where a search for an allocable time slot, in a slotted time frame, for each of the connections starts from a designated transit memory.

The data switching/routing system disclosed herein scales gracefully, virtually indefinitely, and uses a simple distributed control system which may be complemented with a centralized control system.

According to an embodiment, a switching system comprises access nodes, primary switches, and secondary switches where each access node has a primary path and multiple compound paths to each other access node. The primary path traverses a primary switch, and each compound path traverses a first primary switch, a secondary switch, and a second primary switch. The disclosed connectivity pattern enables network scalability while permitting a significant proportion of incoming data to be routed through the primary switches, avoiding the secondary switches, thus significantly reducing switching delay and rendering the switching system a viable candidate for a large-scale data center in addition to a network of global coverage. A data center capacity of 5000 Terabits per second, for example, is realizable with access nodes and switch units of relatively moderate dimensions.

FIG. 1 illustrates the orthogonal-connectivity concept on which the switching systems of the present invention are based.

The switching system depicted in FIG. 1 applies to a large-scale data center or a clean-slate distributed network which may initially overlay, and eventually replace, the current legacy network. Two features are inherent in the disclosed switching systems:

(i) mutual contiguity of access nodes where tens of thousands of access nodes may be interconnected through a distributed single-stage connector with each access node being adjacent to each other access node; and (ii) reduced or eliminated buffering of payload data beyond the access nodes.

These features significantly simplify overall network control, enhance performance, and increase reliability. Mutual contiguity, in particular, simplifies both distributed control and centralized control, which may co-exist within a switching system. Switching systems possessing these features, whether configured as localized data centers or widely distributed networks, would be of widespread interest considering the renewed appreciation of software-defined networking.

A distributed single-stage connector 125, comprising a plurality of mutually unjoined primary switches 120, interconnects access nodes 110 of a plurality of access nodes through a plurality of upstream channels 116 and a plurality of downstream channels 118.

Figure 9:
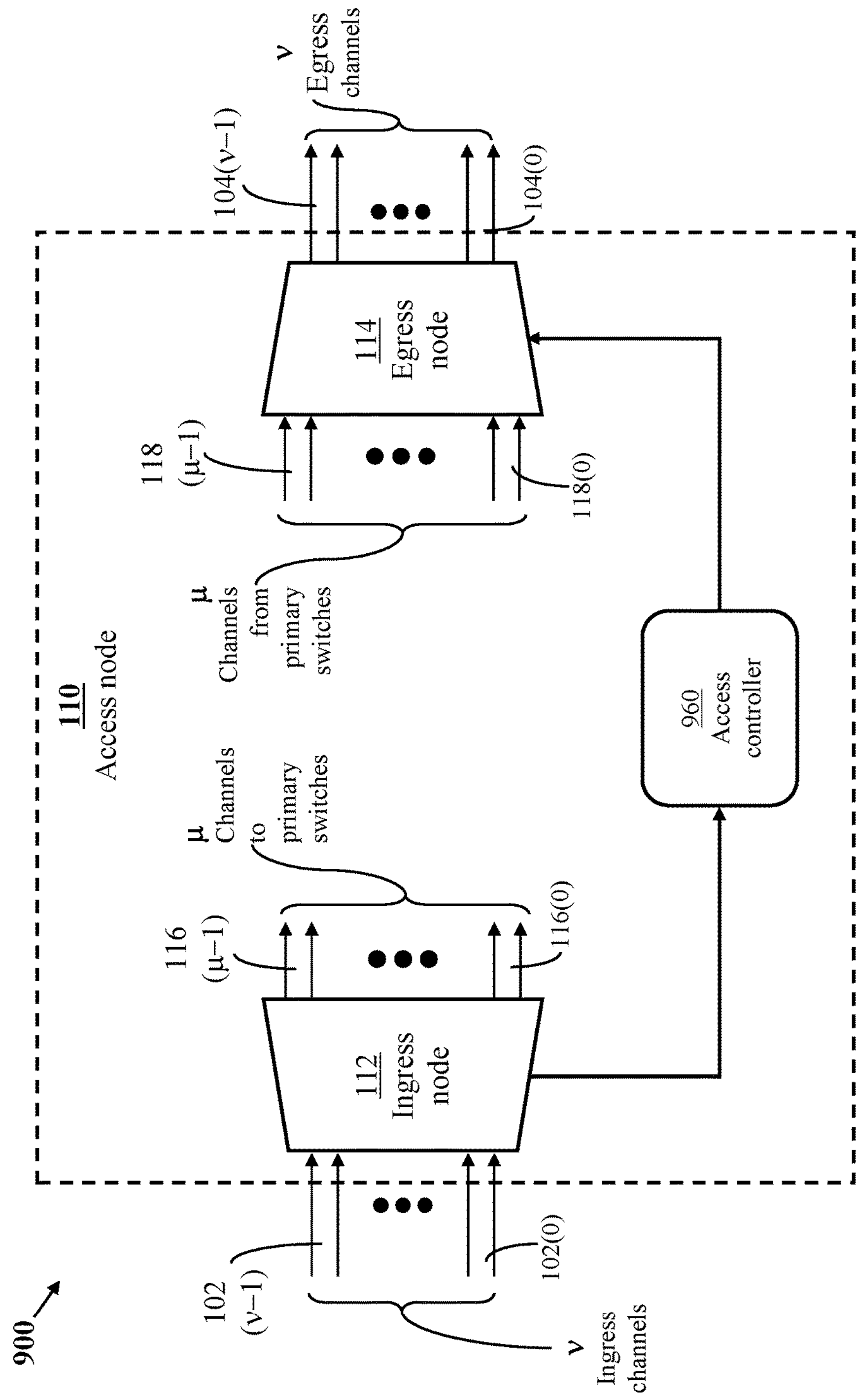
FIG. 9 illustrates dimensions of an access node comprising an ingress node and an egress node sharing an access controller.
Figure 10:
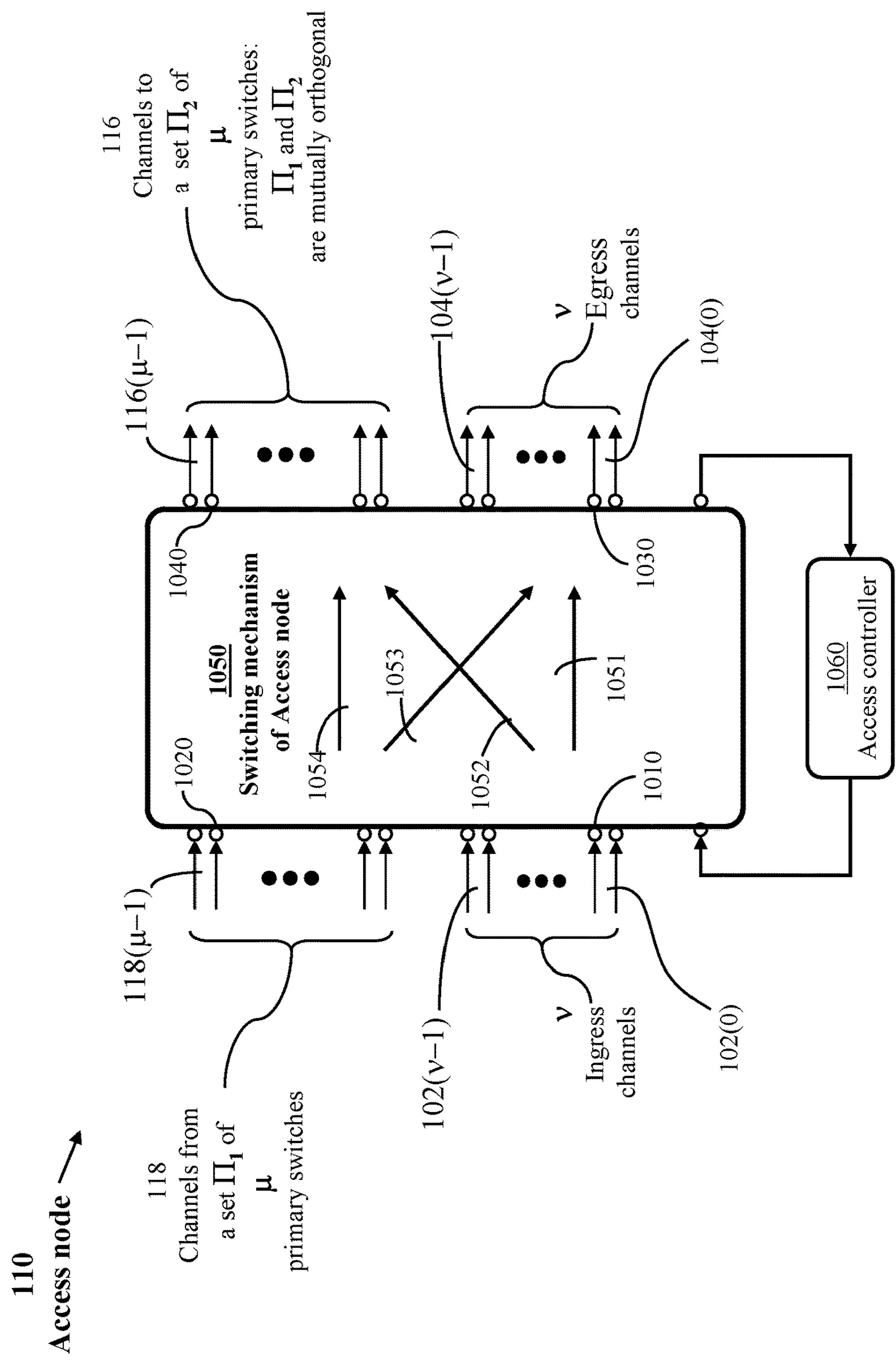
FIG. 10 illustrates an access node comprising an ingress node and an egress node sharing a switching mechanism and an access controller.

The plurality of access nodes 110 is coupled to a plurality of incoming access channels (ingress channels) 102 from data sources and a plurality of outgoing access channels (egress channels) 104 to data sinks. Each access node 110 comprises an ingress node 112 and an egress node 114 which may share an access controller as illustrated in FIG. 9 and may additionally share a switching mechanism as illustrated in FIG. 10.

A plurality of mutually unjoined secondary switches 130, forming an auxiliary connector 135, is coupled to the distributed single-stage connector 125 through a plurality of "inner channels" 124 and a plurality of "internal channels" 134.

Figure 13:
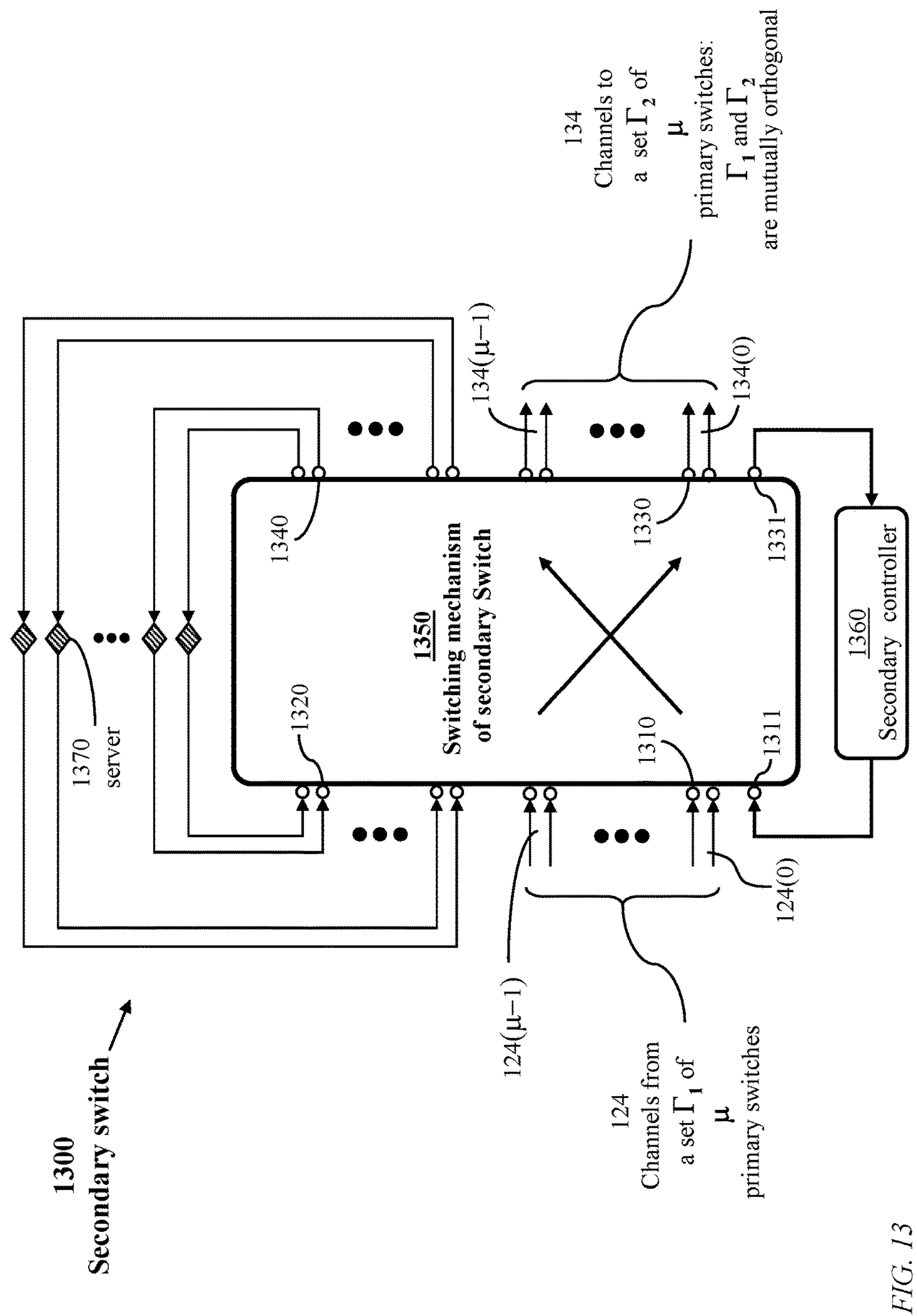
FIG. 13 illustrates connectivity of a secondary switch of the network of FIG. 2, in accordance with an embodiment of the present invention.

FIG. 2 illustrates the contiguous network 200 similar to network 100 of FIG. 1 serving external traffic and providing access to a server farm 250. The servers of the server farm connect to the secondary switches 130 as illustrated in FIG. 13.

Figure 3:
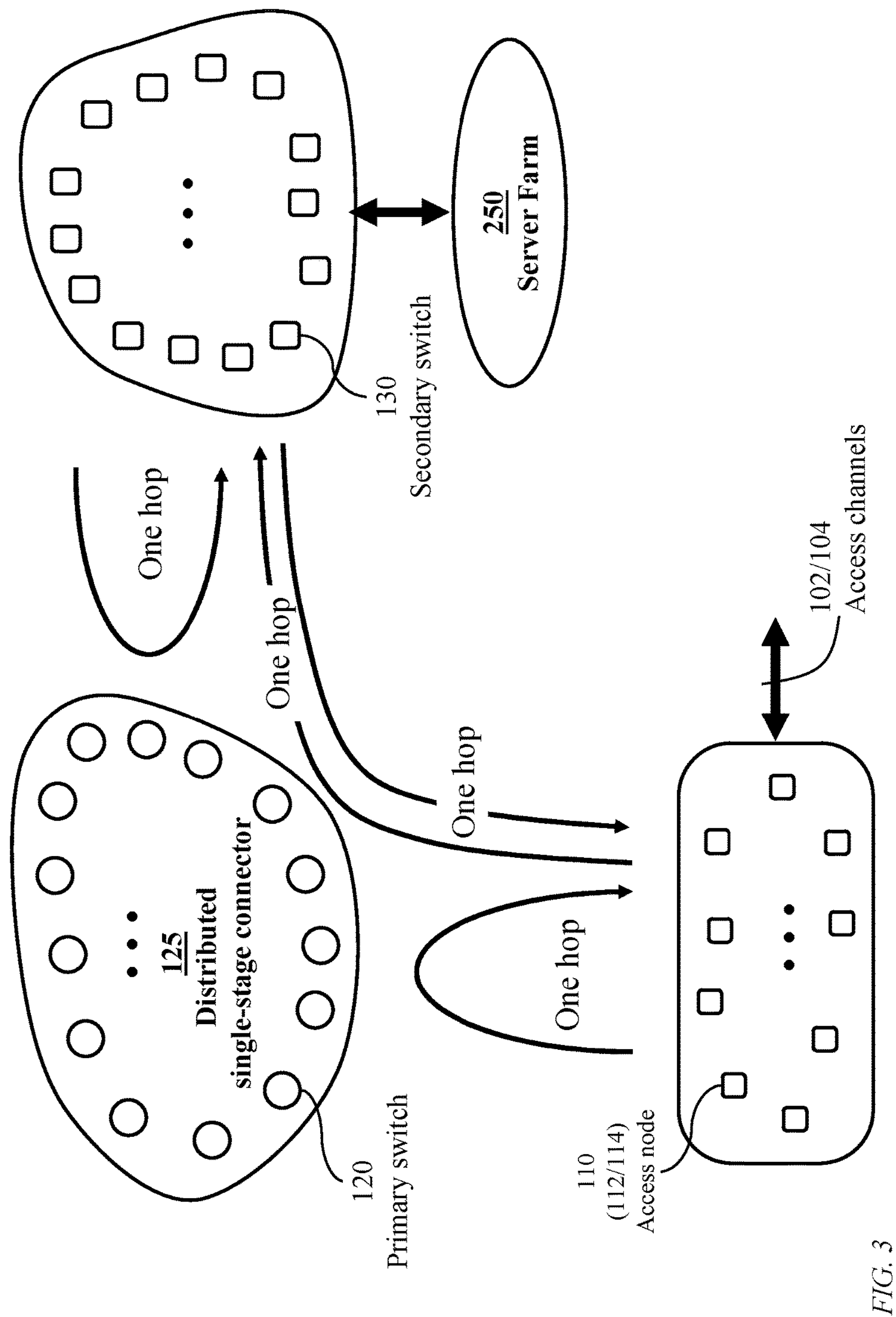
FIG. 3 illustrates an underlying concept of the contiguous network of FIG. 1, in accordance with an embodiment of the present invention.

FIG. 3 illustrates an underlying concept of the contiguous network of FIG. 1 or FIG. 2. Each access node 110 has a one-hop path to each other access node 110 through a respective primary switch 120. Each secondary switch 130 has a one-hop path to each other secondary switch traversing a respective primary switch 120. Each access node 110 has a one-hop path to each secondary switch 130 traversing a respective primary switch and each secondary switch 130 has a one-hop path to each access node 110 traversing a respective primary switch. The traffic between access nodes may be contained within the access nodes 110 and the single-stage connector 125 or spread to flow through the secondary switches 130. Likewise, the inter-server traffic may be contained within the secondary switches 130 and the single-stage connector 125 or spread to flow through the access nodes 110. The traffic between an access node and a server traverses a respective primary switch 120.

Figure 4:
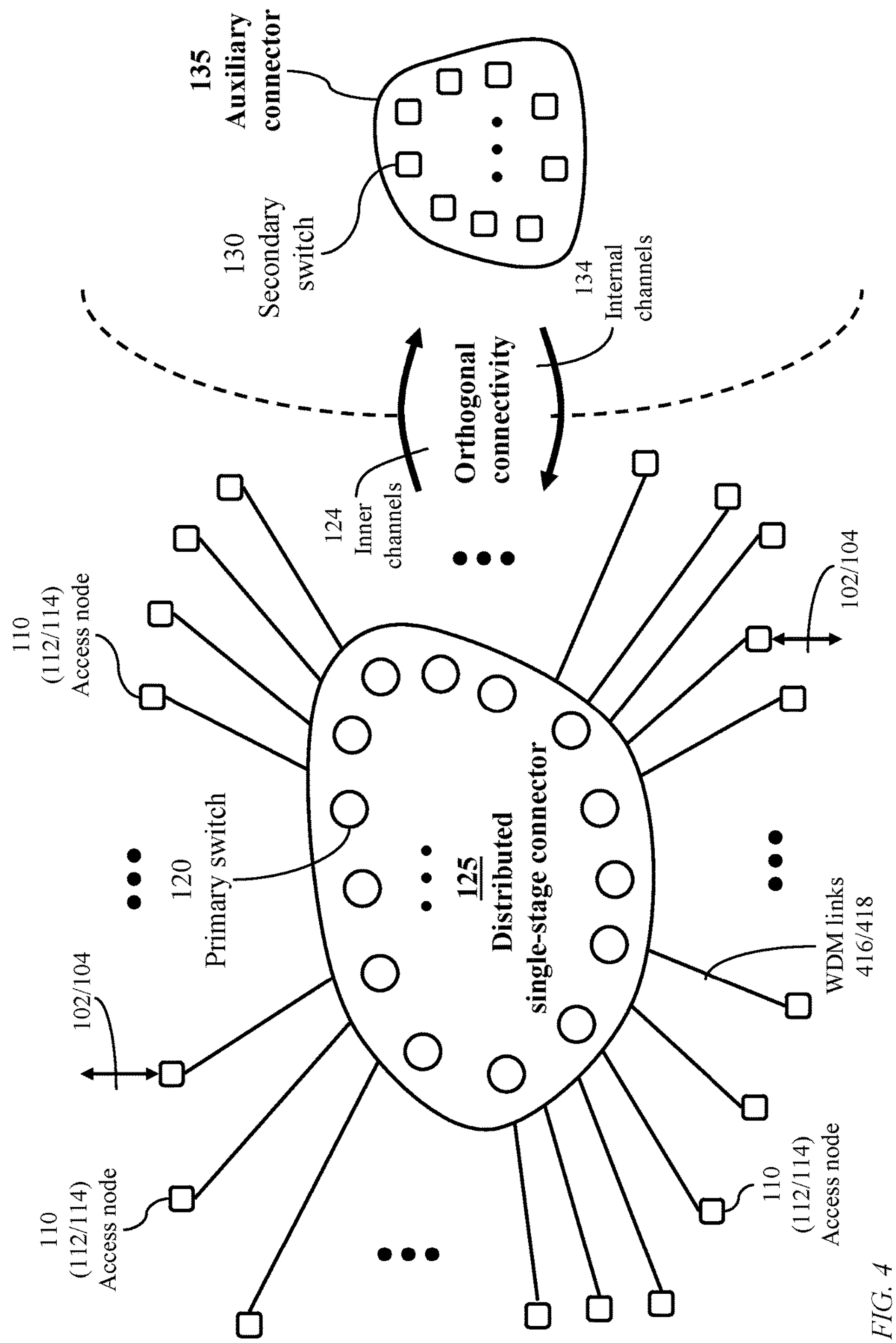
FIG. 4 illustrates access to a high-capacity wide-coverage cloud-communications network, in accordance with an embodiment of the present invention.

FIG. 4 illustrates a high-capacity wide-coverage cloud-communications network. In the example of FIG. 4, access nodes (edge nodes) 110 are interconnected through a set of disjoint bufferless primary switches 120, which are preferably implemented as fast optical switches, where each primary switch 120 is of a relatively small dimension. Each access node has a number of upstream channels of an upstream WDM link 416 to a respective first set of primary switches and a number of downstream channels of a downstream WDM link 418 from a respective second set of primary switches, where the first set of primary switches and the second set of primary switches are orthogonal, having at most one primary switch in common. The orthogonal connectivity pattern enables creation of a contiguous network where each access node connects to each other access node through a single primary switch. In a contiguous network, a set of switches, each of a relatively small dimension, may interconnect a large number of access nodes, providing a topologically short path traversing only one switch for each directed pair of access nodes.

Thus, the set of switches forms a distributed single-stage connector 125 and each access node 110 is adjacent to each other access node 110 in the entire network 100. With each primary switch 120 being of dimension 64×64, for example, and with 512 upstream channels from each access node, the switching system supports 32768 access nodes. To account for spatial variation of the traffic received at the access nodes 110 from external sources, a set of disjoint secondary switches 130, forming an auxiliary connector 135, is coupled to the set of bufferless primary switches according to an orthogonality pattern where each secondary switch 130 has a number of channels to a set of bufferless primary switches 120 and a number of channels from another set of bufferless primary switches 120 where the two sets are mutually orthogonal. Each access node has a path to each other access node traversing only one primary switch 120 and numerous compound paths to each other access node 110 each traversing a primary switch 120, a secondary switch 130, and another primary switch 120.

The advantage of mutual adjacency of access nodes is threefold:

(i) a significant proportion of data traffic of each directed pair of access nodes may be transferred over topologically short paths;

(ii) exchange of control signals among access nodes is simplified, thus enabling efficient distributed control; and (iii) one or more of the access nodes may be replaced with a universal controller which would be adjacent to each access node, thus enabling manageable central control which may optionally complement the simplified distributed control.

Notably, the simplified distributed control together with topological proximity of an optional universal controller to each access node in a large-scale network would render the architecture based on orthogonal connectivity an attractive candidate for a new high-performance clean-slate network as well as an efficient large-scale low-latency data center.

Figure 5:
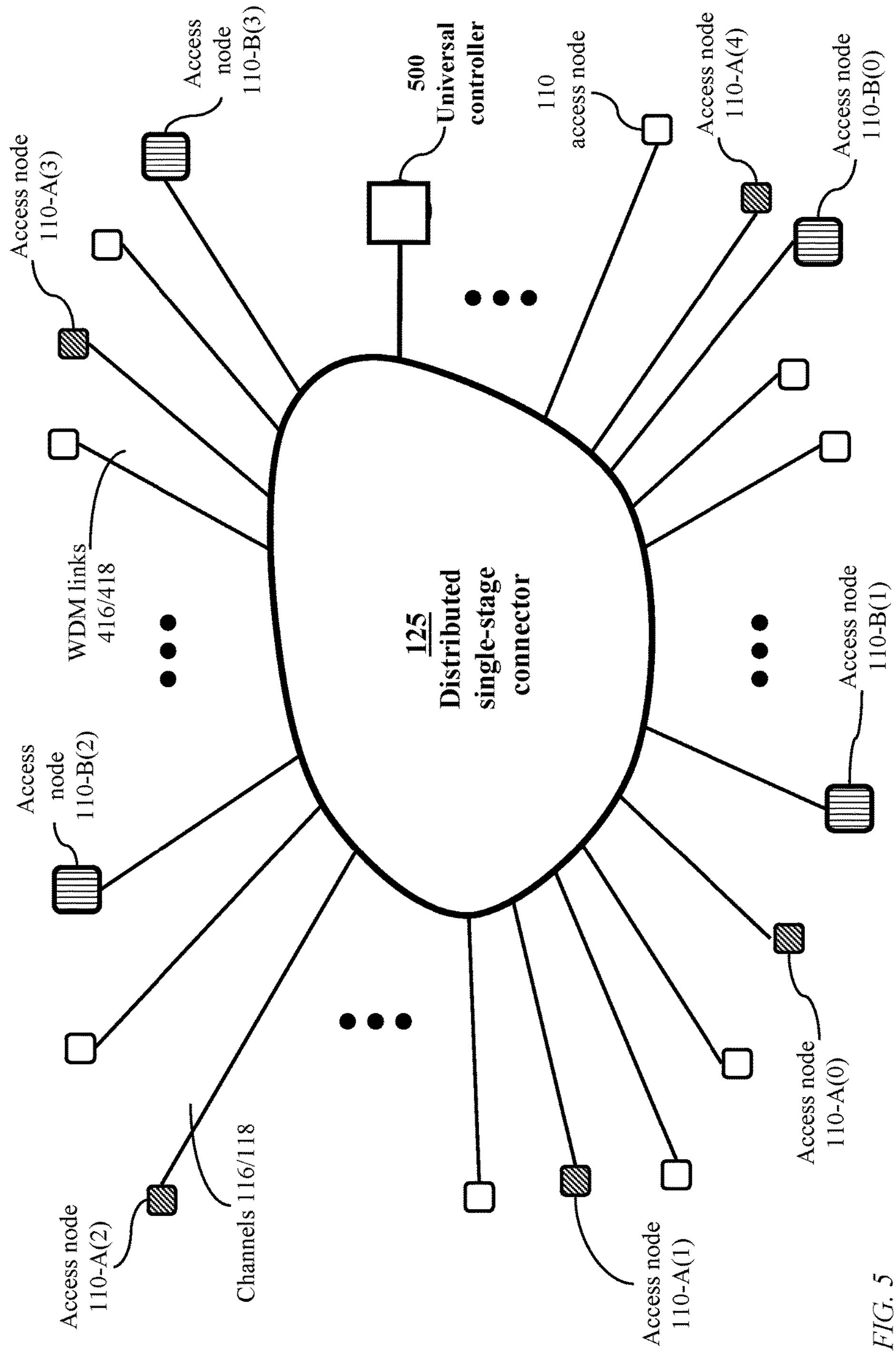
FIG. 5 illustrates access nodes belonging to different constituent networks of the cloud-communications network of FIG. 1, in accordance with an embodiment of the present invention.

A high-performance clean-slate network based on the concepts outlined above may function as a shared cloud network which may include numerous constituent networks. A constituent network may be a regional network, a continental network, or a network of global coverage. FIG. 5 illustrates access nodes 110 belonging to different constituent networks of a cloud-communications network based on the architecture of FIG. 4. The auxiliary connector 135 has been omitted in FIG. 5. In a large-scale shared cloud network 100, the number of access nodes 110 may be of the order of tens of thousands. FIG. 5 illustrates access nodes 110-A(0), to 110-A(4), defining a first constituent network "A", and access nodes 110-B(0) to 110-B(3) defining a second constituent network "B". An optional universal controller 500 may be coupled to the distributed single-stage connector 125.

As described above, each access node 110 has a single one-hop path, traversing only one primary switch 120, and numerous other compound paths, to each other access node in the entire shared cloud network 100. A one-hop path may be organized to include a time-limited control path and a simple data path. Notably, a time-limited control path would consume an insignificant portion of the capacity of a one-hop path.

Figure 6:
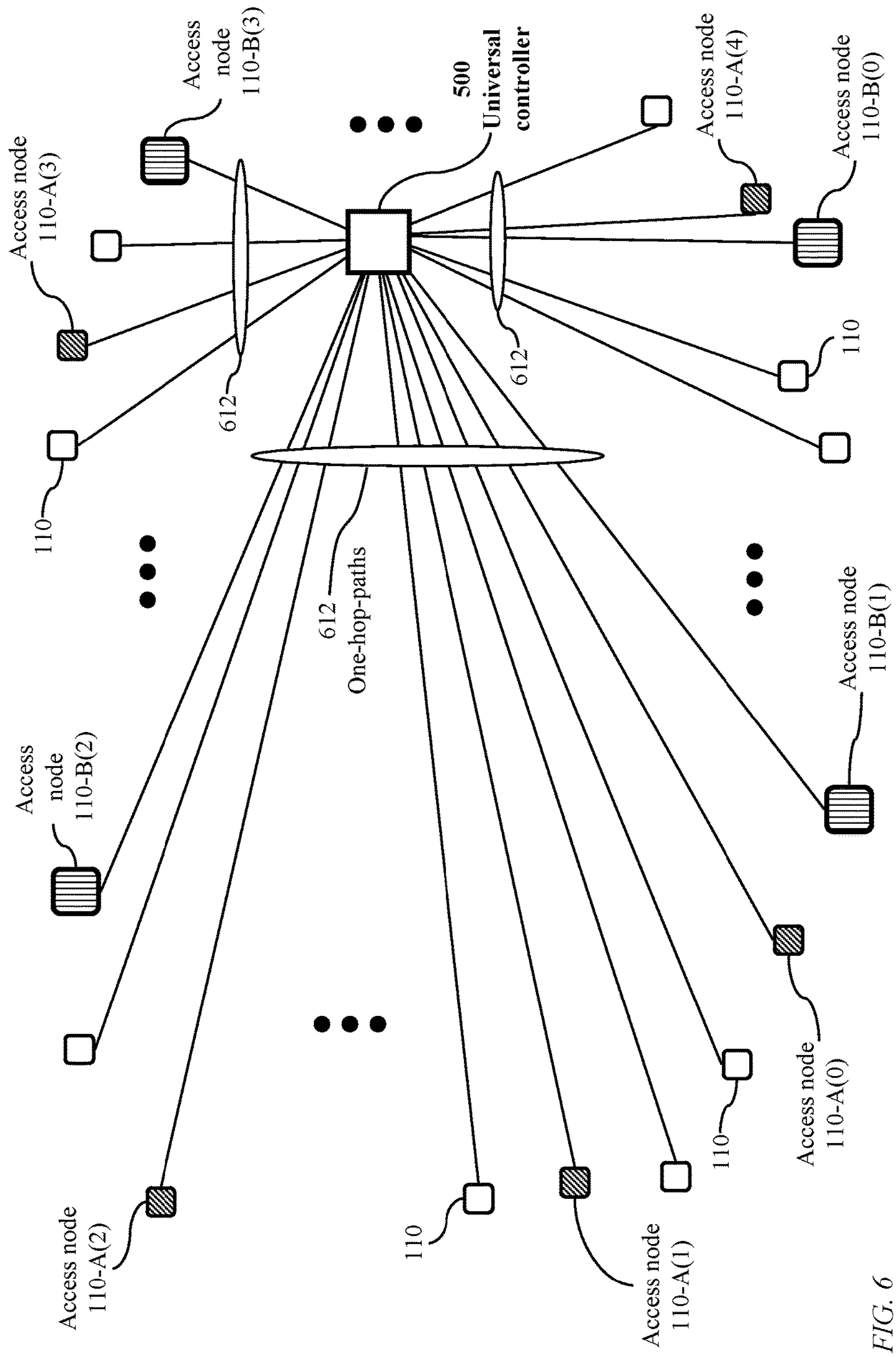
FIG. 6 illustrates access to an optional universal controller of the cloud-communications network of FIG. 1, in accordance with an embodiment of the present invention.

FIG. 6 illustrates connectivity of each access node 110 to the optional universal controller 500 of the cloud-communications network of FIG. 5. Each access node 110 has a one-hop path 612 to the universal controller 500.

Figure 7:
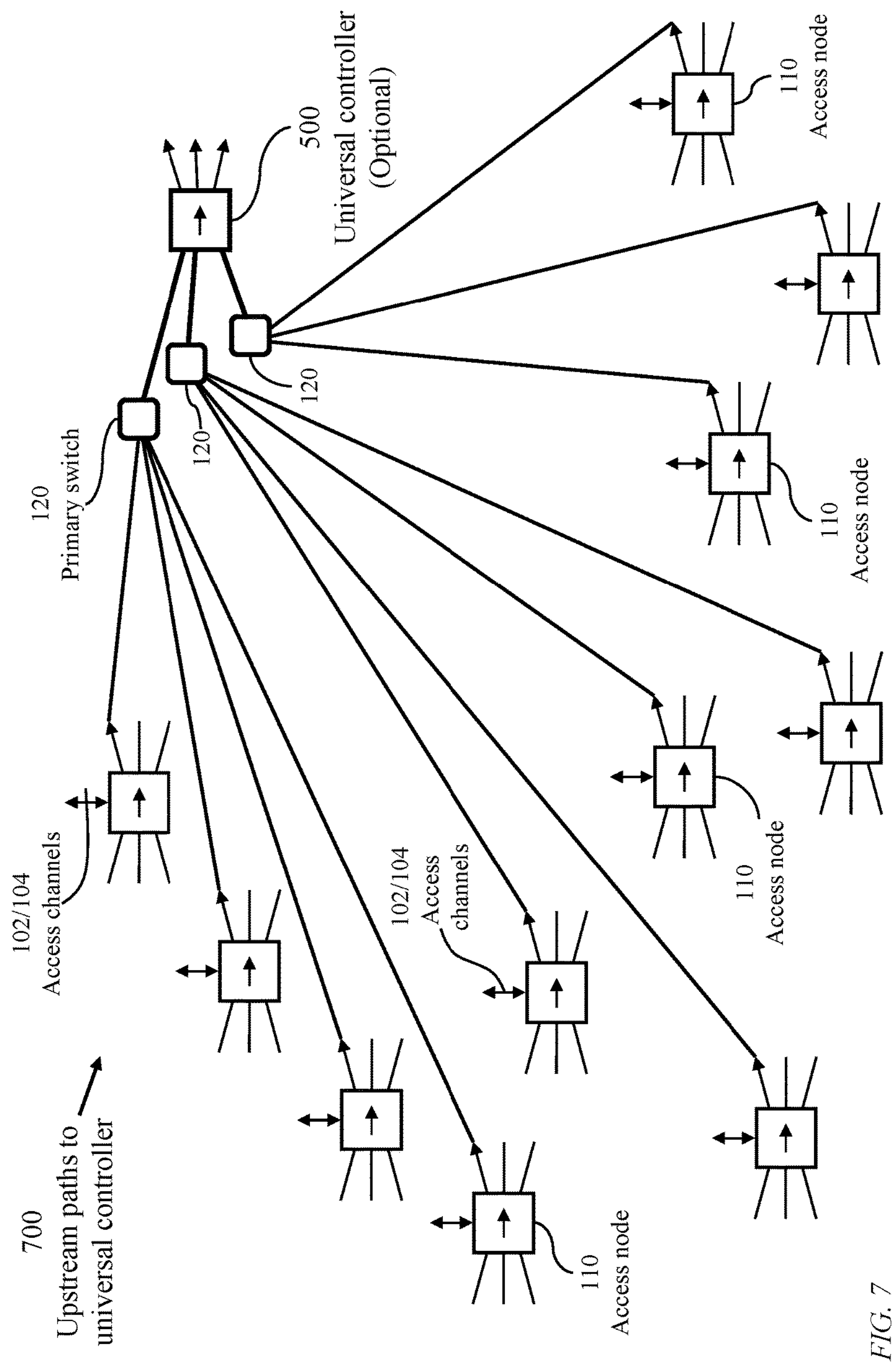
FIG. 7 illustrates upstream paths from access nodes to a universal controller of the network of FIG. 1, in accordance with an embodiment of the present invention.

FIG. 7 illustrates upstream paths 700 from access nodes 110 to the universal controller 500. The universal controller 500 replaces one of the access nodes 110. Thus, each access node 110 has a single-hop path to the universal controller 500 traversing a respective primary switch 120.

Figure 8:
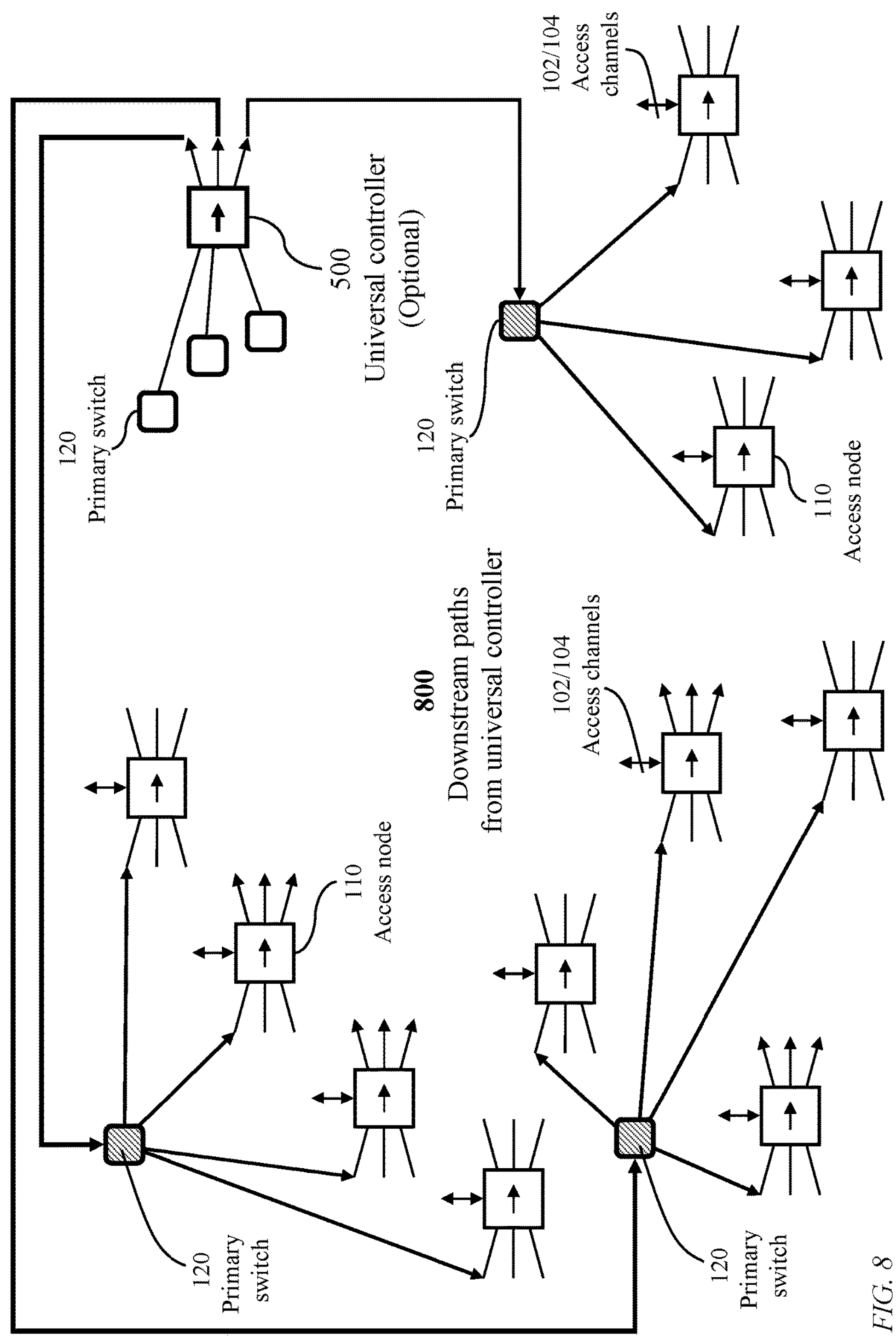
FIG. 8 illustrates downstream paths from a universal controller to access nodes, in accordance with an embodiment of the present invention.

FIG. 8 illustrates downstream paths 800 from the universal controller 500 to access nodes 110. Since the universal controller 500 replaces one of the access nodes 110, the universal controller 500 has a single-hop path to each access node 110 traversing a respective primary switch 120.

FIG. 9 illustrates an implementation 900 of an access node 110 comprising an ingress node 112 and a separate egress node 114. The ingress node 112 and the egress node 114, however, share an access controller 960. Each ingress node 112 has a number $\nu$ of ingress ports, connecting to ingress channels 102, and a number $\mu$ of output ports, connecting to upstream channels 116; $\nu>1$, $\mu>1$. Each egress node 114 has $\mu$ input ports, connecting to downstream channels 118, and $\nu$ egress ports connecting to egress channels 104. The output capacity of an ingress node 112 may be selected to exceed the input capacity to reduce potential queueing delay at ingress ports. Selecting all ports of the network to be of a same capacity R (R=10 Gigabits/second for example), the number $\mu$ may be selected to exceed the number $\nu$.

The total number of ingress nodes is $\mu\times m$, and the total number of egress nodes is also $\mu\times m$. The total number of ingress ports is $\nu\times\mu\times m$ and the total number of egress ports is $\nu\times\mu\times m$. With each ingress node paired with a respective egress node to form an access node, the access node would have $\nu$ access ports where each access port is a dual port comprising an ingress port and an egress port. The total number of access ports of the entire network is then $\nu\times\mu\times m$. The total number of dual inner ports is $2\times\mu^2\times(m+n)$. The total capacity of the access ports defines the structural capacity of the network. The total capacity of the inner ports represents an overhead. The ratio $\omega$ of the capacity of the inner ports to the total access capacity is a measure of network efficiency; the lower the ratio $\omega$ the higher the efficiency. In a conventional 5-stage Clos-type network this ratio is 4 if no internal expansion is provided to induce traffic dilation but may significantly exceeds 4 if internal expansion is applied. With all ports selected to operate at a same rate (10 Gb/s, for example), the ratio $\omega$ for the networks of the present application is determined as:

$$\omega=2\times\mu\times(m+n)/(\nu\times m).$$

With $\nu=\mu$, and n=m, $\omega$=4 as it is in a conventional 5-stage network. However, in a conventional 5-stage network, each packet transferred from an ingress port to an egress port traverses five switching stages. Thus, a signification amount of traffic dilation is needed to realize an acceptable grade of service. Traffic dilation is typically realized by providing internal expansion where the combined capacity of input ports of any intermediate switching stage significantly exceeds the combined capacity of ingress ports. In a network based on either of two connectivity schemes to be described below with reference to FIG. 20 and FIG. 21, a significant proportion of incoming data is switched to destination egress nodes 114 through only one intermediate stage of switching;

high performance is realized without the need for dilation. Thus, ν may equal μ and n may even be less than m.

FIG. 10 illustrates an access node 110 comprising an ingress node and an egress node sharing a switching mechanism 1050 and an access controller 1060. The access node 110 comprises:

ν input ports 1010 each connecting to an ingress channel 102 or a server;

ν output ports 1030 each connecting to an egress channel 104 or a server;

μ input ports 1020; and

μ output ports 1040.

The μ input ports 1020 connect to channels emanating from a set $\Pi_1$ of μ primary switches. The μ output ports 1040 connect to channels to a set $\Pi_2$ of μ primary switches, where the sets $\Pi_1$ and $\Pi_2$ are mutually orthogonal.

1054: A path from any input port 1020 to any output port 1040

The switch controller 1160 may be connected to a control input port and a control output port through the switching mechanism 1050. Data from an ingress channel 102 to an egress channel 104 is transferred along path 1051. Data from an ingress channel 102 to a primary switch 120 is transferred along a path 1052. Data from a primary switch 120 to an egress channel 104 is transferred along a path 1053. Data from a primary switch 120 to another primary switch 120 is transferred along a path 1054.

Each of access controller 960 and access controller 1060 is hardware controller comprising at least one hardware processor coupled to at least one memory device. An access controller of an access node 110 is configured to identify a set of access nodes 110 and a set of secondary switches 130 connecting to output ports of each of μ primary switches 120 connecting to upstream channels 116 originating from the access node 110.

The hardware access controller is configured to schedule data transfer from the access node to any access node and to any secondary switch. The hardware access controller comprises a memory device storing a respective access routing table (not illustrated) identifying a one-hop path from each access node to each other access node traversing a respective primary switch and a one-hop path from each access node to each secondary switch traversing a respective primary switch. The respective access routing table further identifies for each pair of access nodes at least one compound path traversing a first primary switch, a secondary switch, and a second primary switch, and at least one compound path traversing a first primary switch, an intermediate access node, and a second primary switch.

The access controller is configured to select a primary (one-hop) path traversing one primary switch to a destination access node. Where the primary path has insufficient vacancy, the access controller selects one of μ×n compound paths to the destination access node traversing a first primary switch, a secondary switch, and a second primary switch.

The access controller of an access node may be configured to determine for each destination access node:

an index of an output port, of the access node, coupled to an upstream channel 116 to a respective primary switch connecting directly to the each destination access node; and identifiers of a plurality of compound paths, each compound path traversing a first primary switch, a secondary switch, and a second primary switch.

Figure 11:
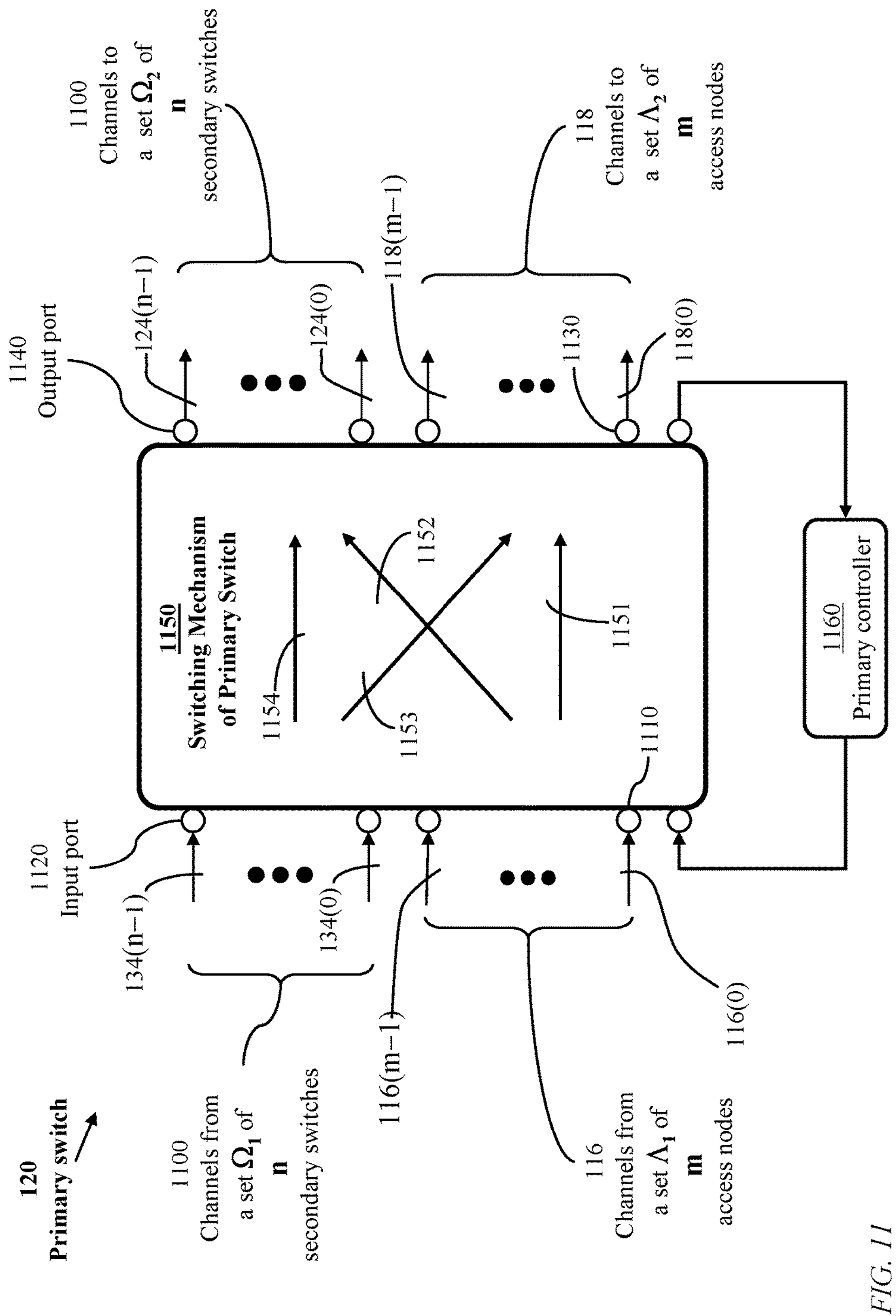
FIG. 11 illustrates connectivity of a primary switch to ingress nodes, egress nodes, and secondary switches, in accordance with an embodiment of the present invention.

FIG. 11 illustrates connection of a primary switch 120 to access nodes, and secondary switches. The primary switch receives data from m access nodes 110 through m input ports 1110 and receives data from n secondary switches 130 through n input ports 1120. The primary switch transmits data to m access nodes 110 through m output ports 1130 and transmits data to n secondary switches through n output ports 1140.

A primary controller 1160 may be connected to an input port and an output port through the switching mechanism 1150 of the primary switch. Data from an access node 110 to another access node 110 is transferred along path 1151. Data from an access node 110 to a secondary switch 130 is transferred along a path 1152. Data from a secondary switch 130 to an access node is transferred along a path 1153. Data from a secondary switch 130 to another secondary switch is transferred along a path 1154.

A primary controller 1160 of primary switch 120 may be coupled to a timing circuit (not illustrated in FIG. 11) and configured to exchange timing data with a set of access nodes to enable the set of access nodes to transmit data packets to the primary switch 120 at instants of time dictated by the primary controller 1160.

Figure 12:
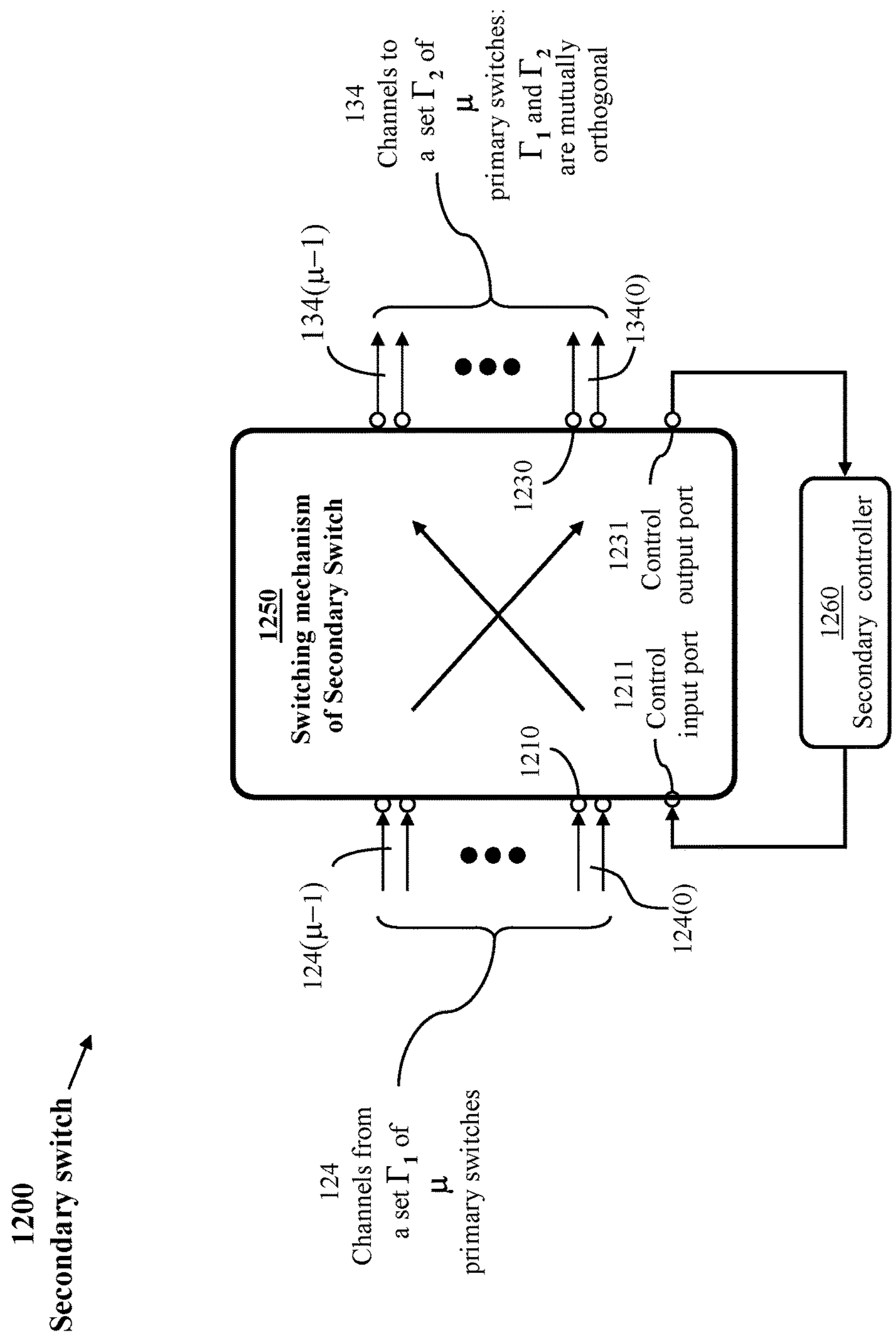
FIG. 12 illustrates connectivity of a secondary switch of the network of FIG. 1, in accordance with an embodiment of the present invention.

FIG. 12 illustrates an implementation 1200 of a secondary switch 130 of the network of FIG. 1 having a switching mechanism 1250, a number μ of input ports 1210 each connecting to an input channel from one of μ primary switches 120, a number μ of output ports 1230 each connecting to an output channel directed to one of μ primary switches 120, and a respective secondary controller 1260. The secondary controller 1260 may be coupled to a control output port 1231 to receive control data from input ports 1210 through the switching mechanism 1250 and a control input port 1211 to send control data to output ports 1230 through the switching mechanism. Alternatively, the secondary controller may also be coupled to the input ports 1210 and output ports 1230 to receive and send control data without traversing the switching mechanism 1250.

FIG. 13 illustrates an implementation 1300 of a secondary switch 130 of the network of FIG. 2 supporting a number of servers 1370. The secondary switch comprises a switching mechanism 1350, a number μ of input ports 1310 each connecting to an input channel from one of μ primary switches 120, a number μ of output ports 1330 each connecting to an output channel directed to one of μ primary switches 120, a number χ of input ports 1320 each connecting to a channel from one of χ servers, and a number χ of output ports 1340 each connecting to a channel to one of the χ servers, χ>1.

A respective secondary controller 1360 may be coupled to a control output port 1331 to receive control data from input ports 1310 and 1320 through the switching mechanism 1350 and a control input port 1311 to send control data to output ports 1330 and 1340 through the switching mechanism. Alternatively, the secondary controller 1360 may also be coupled to the input ports 1310 and output ports 1330 to receive and send control data without traversing the switching mechanism 1350.

Each of secondary controllers 1260 and 1360 is a hardware controller. A secondary controller of a secondary switch 130 is configured to identify a set of egress nodes connecting to output ports of each of μ primary switches connecting to output ports of the secondary switch 130. The secondary controller may also be configured to schedule data transfer from the secondary switch to any access node and to any other secondary switch. The hardware secondary controller comprises a memory device storing a respective secondary routing table identifying a one-hop path from each secondary switch to each other secondary switch traversing a respective primary switch, and a one-hop path from each secondary switch to each access node traversing a respective primary switch.

The respective secondary routing table further identifies for each pair of secondary switches at least one compound path traversing a first primary switch, an intermediate secondary switch, and a second primary switch, and at least one compound path traversing a first primary switch, an intermediate access node, and a second primary switch. The respective secondary routing table further identifies at least one compound path from each secondary switch to each access node traversing a first primary switch, an intermediate access node, and a second primary switch.

Figure 14:
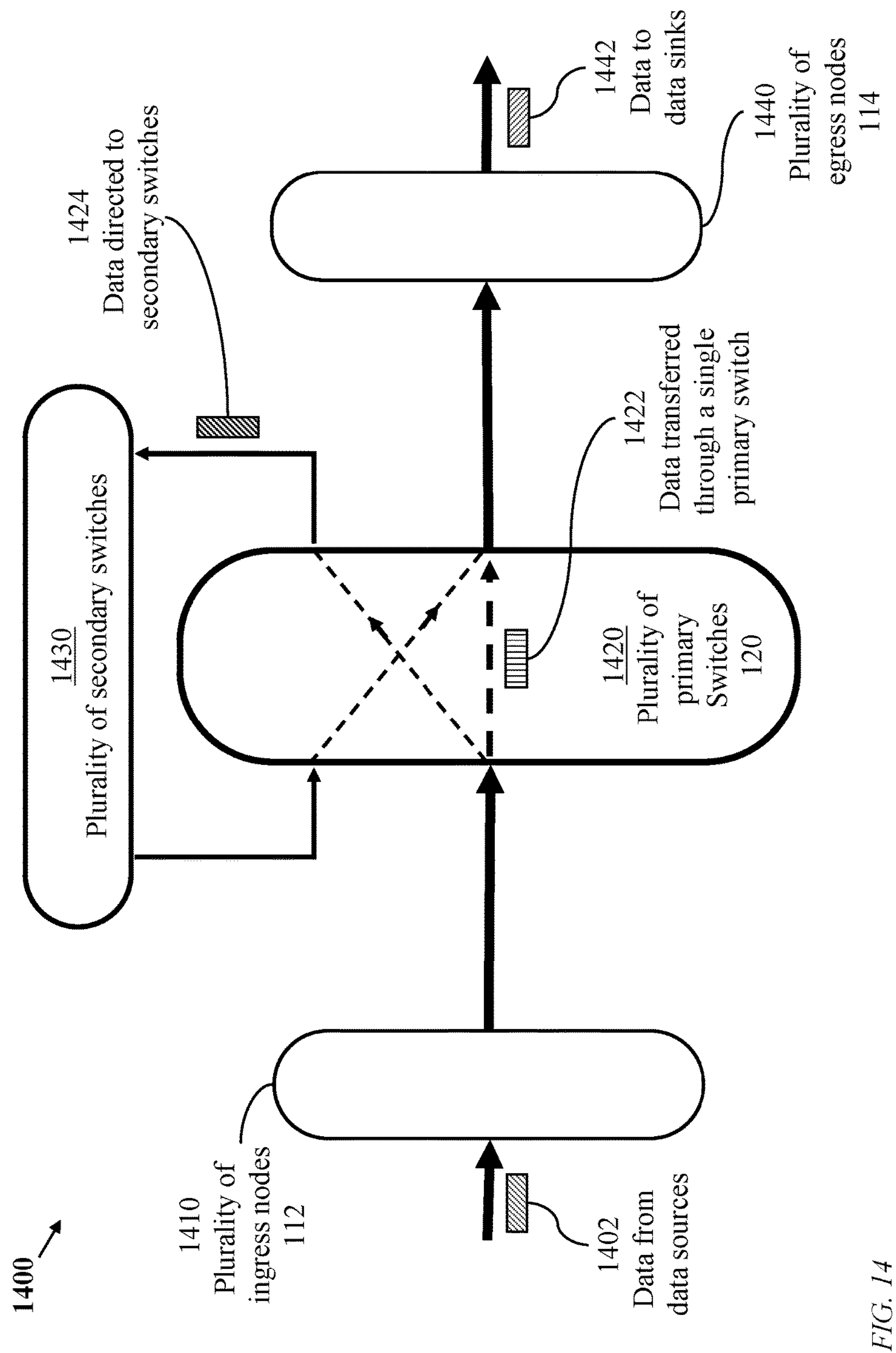
FIG. 14 illustrates switching stages of the cloud-communications network of FIG. 1, in accordance with an embodiment of the present invention.

FIG. 14 is a schematic 1400 of the cloud-communications network of FIG. 4. The plurality of access nodes 110 is represented as a plurality 1410 of ingress nodes 112 and a plurality 1440 of egress nodes 114. Each access node 110 combines an ingress node 112 connecting to data sources and an egress node 114 connecting to data sinks. The ingress node and the egress node components of an access node preferably share an access controller as illustrated in FIG. 9 and may also share a switching mechanism as illustrated in FIG. 10.

The plurality 1420 of primary switches 120 forms the distributed single-stage connector 125 and the plurality 1430 of secondary switches 130 forms the auxiliary connector 135. The plurality 1410 of ingress nodes receive data 1402 from channels originating from data sources and the plurality 1440 of egress nodes transmit data 1442 over channels to data sinks. In general, a portion 1422 of the data transferred from the plurality 1410 of ingress nodes to the plurality 1440 of egress nodes is routed through the plurality 1420 of primary switches forming the distributed single-stage connector 125 and a portion 1424 is routed through the plurality 1420 of primary switches 120 and the plurality 1430 of secondary switches 130.

Figure 15:
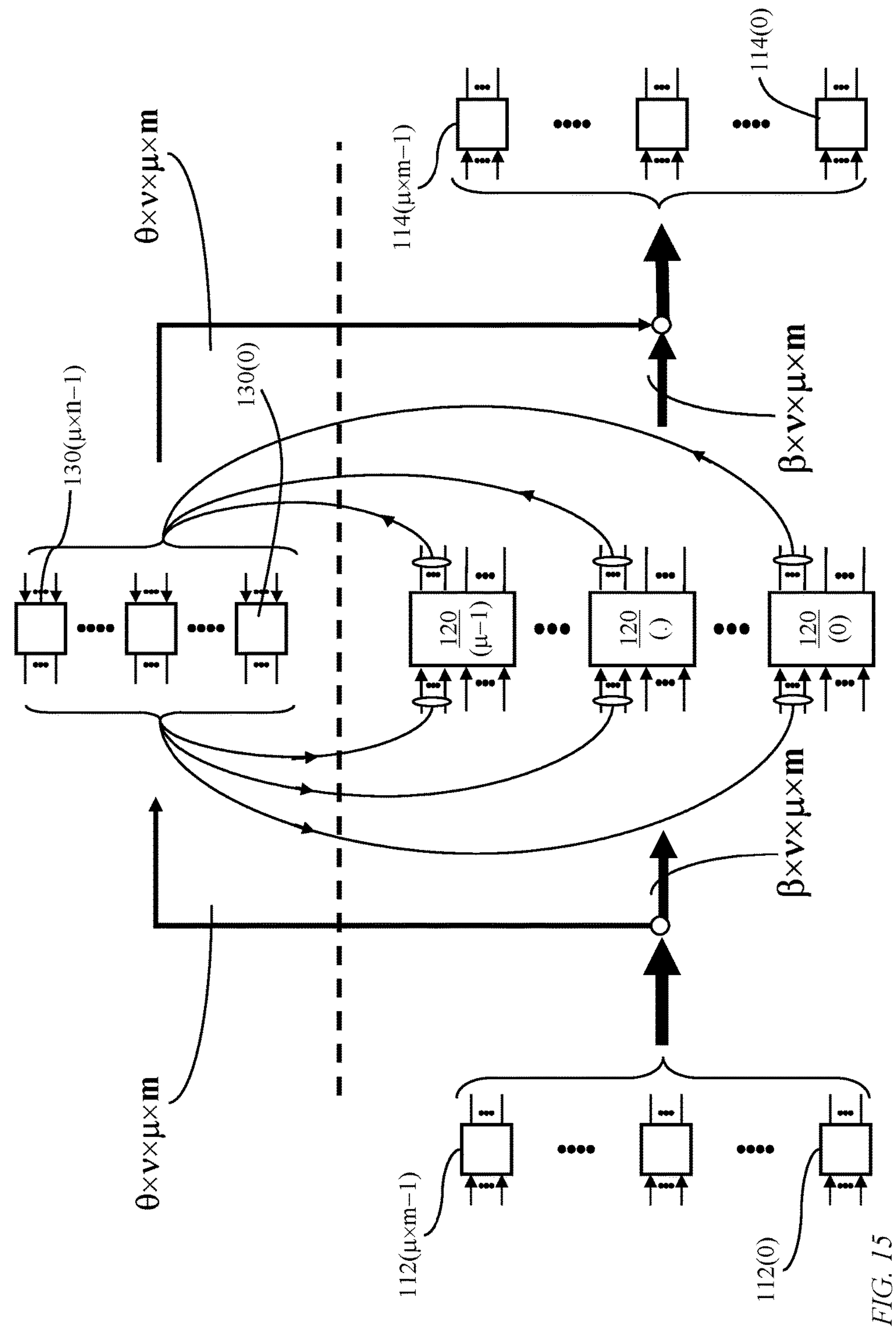
FIG. 15 illustrates data flow through the switching system of FIG. 1, in accordance with an embodiment of the present invention.

FIG. 15 illustrates data flow through the network of FIG. 4 based on the schematic of FIG. 14. The occupancy of the ingress ports fluctuates according to spatial and temporal variation of the incoming data traffic. The throughput may be defined as a mean value, over a specified period of time, of used capacity of ingress ports. The maximum throughput of a network is limited by the structural capacity of the ingress ports and the egress ports. The capacity of a channel from a port, or a channel to a port, may be used as a reference traffic load, and the throughput of the network may be expressed as a normalized ratio of the total flow rate through a channel to the capacity of the channel. The normalized maximum carried traffic load per channel is one unit, and the normalized ratio is expressed as a fraction of one unit.

Considering an upper bound of throughput which equals the structural capacity of the ingress ports, a proportion $\beta$, $\beta \leq 1.0$, of the incoming data is switched through the primary switches 120 to the egress nodes and the remainder "overflows" to the secondary switches 130. If the incoming data traffic is spatially balanced, where data received at any ingress node 112 is distributed evenly to all egress nodes 114, the proportion $\beta$ would approach 1.0. With typical uneven spatial distribution of the incoming data traffic, the proportion $\beta$ would be less than 1.0. With $\beta=0.6$, for example, the amount of data directed to the secondary switches is $0.4 \times \nu \times \mu \times m$ units. The amount of data switched through the secondary switches is $\theta \times \nu \times m/(\mu \times n)$; $(\theta+\beta) \leq 1.0$. Due to the large number of compound paths for each pair of access nodes 110 and the self-load-equalizing property of network 100, the value of $\theta$ would be very close to $(1-\beta)$ and the data switched through the ingress nodes 112 would experience infinitesimal loss.

Figure 16:
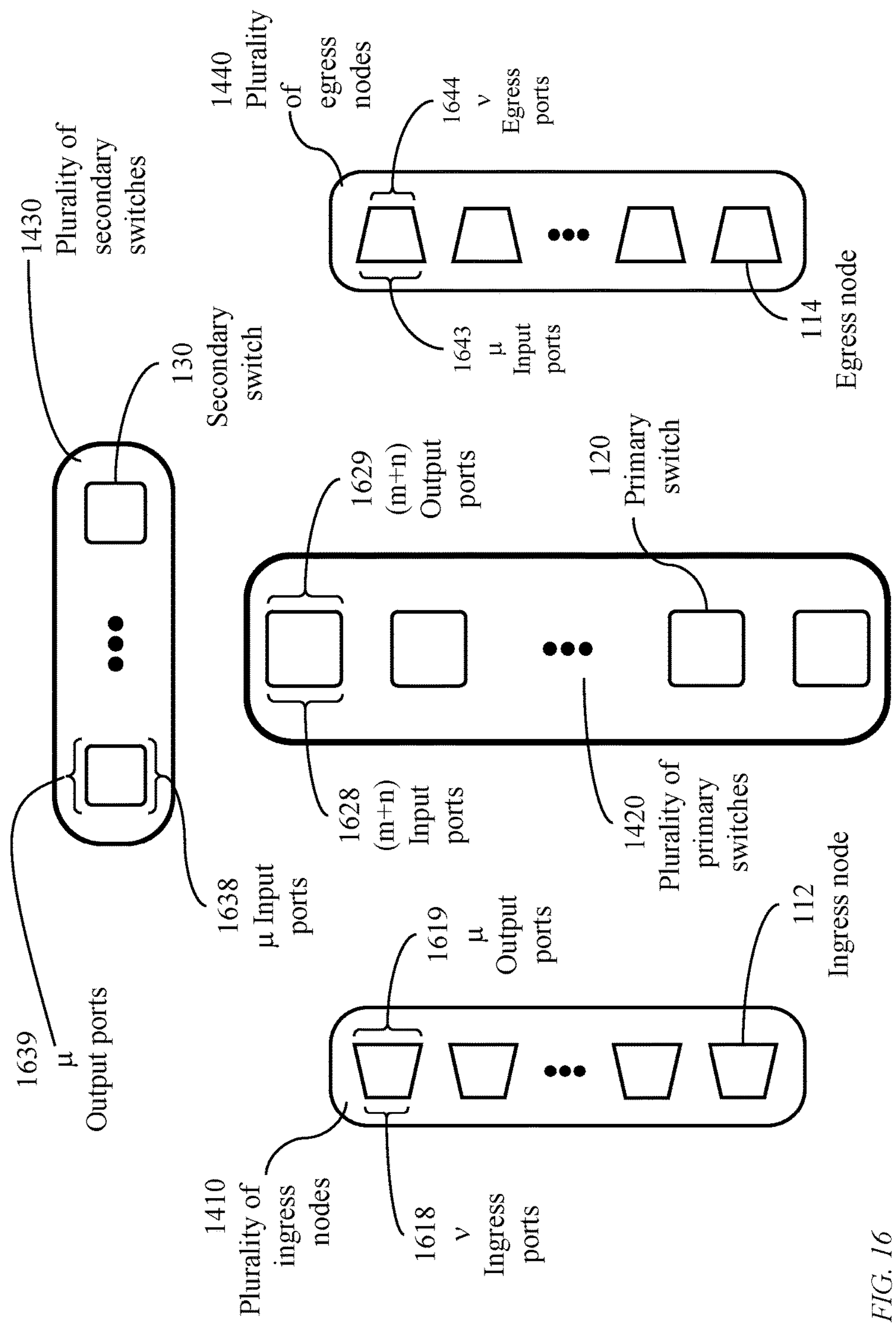
FIG. 16 illustrates constituent components of each of the switching stages of FIG. 14.

FIG. 16 illustrates constituent components of each of the stages of FIG. 14. The plurality 1410 of ingress nodes comprises a number of ingress nodes 112 each ingress node having a number $\nu$ of ingress ports 1618 connecting to data sources and a number $\mu$ of output ports 1619 connecting to primary switches 120. The plurality 1440 of egress nodes comprises a number of egress nodes 114 each egress node having a number $\nu$ of egress ports 1644 connecting to data sinks and a number $\mu$ of input ports 1643 connecting to primary switches 120. Each primary switch 120 of the plurality 1420 of primary switches has a number $(m+n)$ of input ports 1628 and the same number of output ports 1629. Each secondary switch 130 of the plurality 1430 of secondary switches has a number $\mu$ of input ports 1638 and the same number of output ports 1639 connecting to primary switches 120, $\mu>1$, $\nu>1$, $m>2$, and $n>0$.

Input ports 1628 include m input ports connecting to m ingress nodes and n input ports connecting to n secondary switches 130. Output ports 1629 include m output ports connecting to m egress nodes and n output ports connecting to n secondary switches 130.

Each primary switch 120 connects to an output port 1619 of each of a set of m ingress nodes, an input port 1643 of each of a set of m egress nodes, an input port 1638 of each of a first set of n secondary switches, and an output port 1639 of each of a second set of n secondary switches. Thus, the total number of ingress nodes 112 is $\mu \times m$, the total number of primary switches 120 is $\mu^2$, and the total number of secondary switches 130 is $\mu \times n$.

Figure 17:
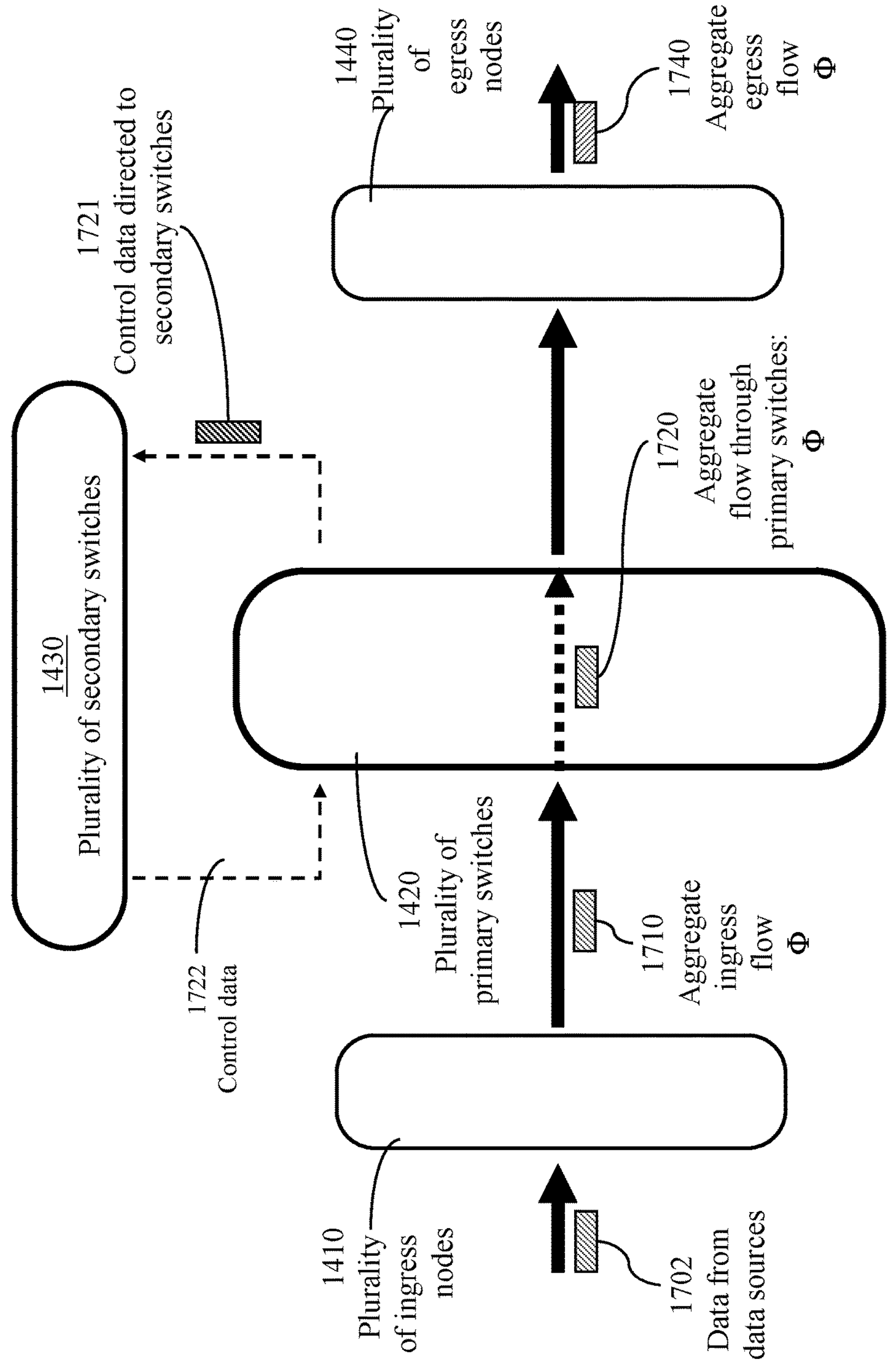
FIG. 17 illustrates data flow in the contiguous network of FIG. 1 under spatially-balanced data traffic condition.

FIG. 17 illustrates data flow in the contiguous network 100 under ideal spatially-balanced data traffic conditions where all the data streams originating from external sources are routed through one-hop paths each traversing one primary switch 120. The plurality 1410 of ingress nodes receives data 1702 from external data sources. The aggregate flow, denoted $\Phi$, is the total data passing through the network and transmitted from the plurality 1440 of egress nodes 114 to respective data sinks. The aggregate flow includes payload data and control data. Thus, the aggregate ingress flow 1710 through the plurality 1410 of ingress nodes 112, the aggregate flow 1720 through the plurality 1420 of primary switches, and the aggregate egress flow 1740 through the plurality 1440 of egress nodes 114 have equal flow rates. The plurality 1420 of primary switches and the plurality 1430 of secondary switches may exchange control data 1721/1722 through one-hop paths between secondary switches 130 and primary switches 120.

Figure 18:
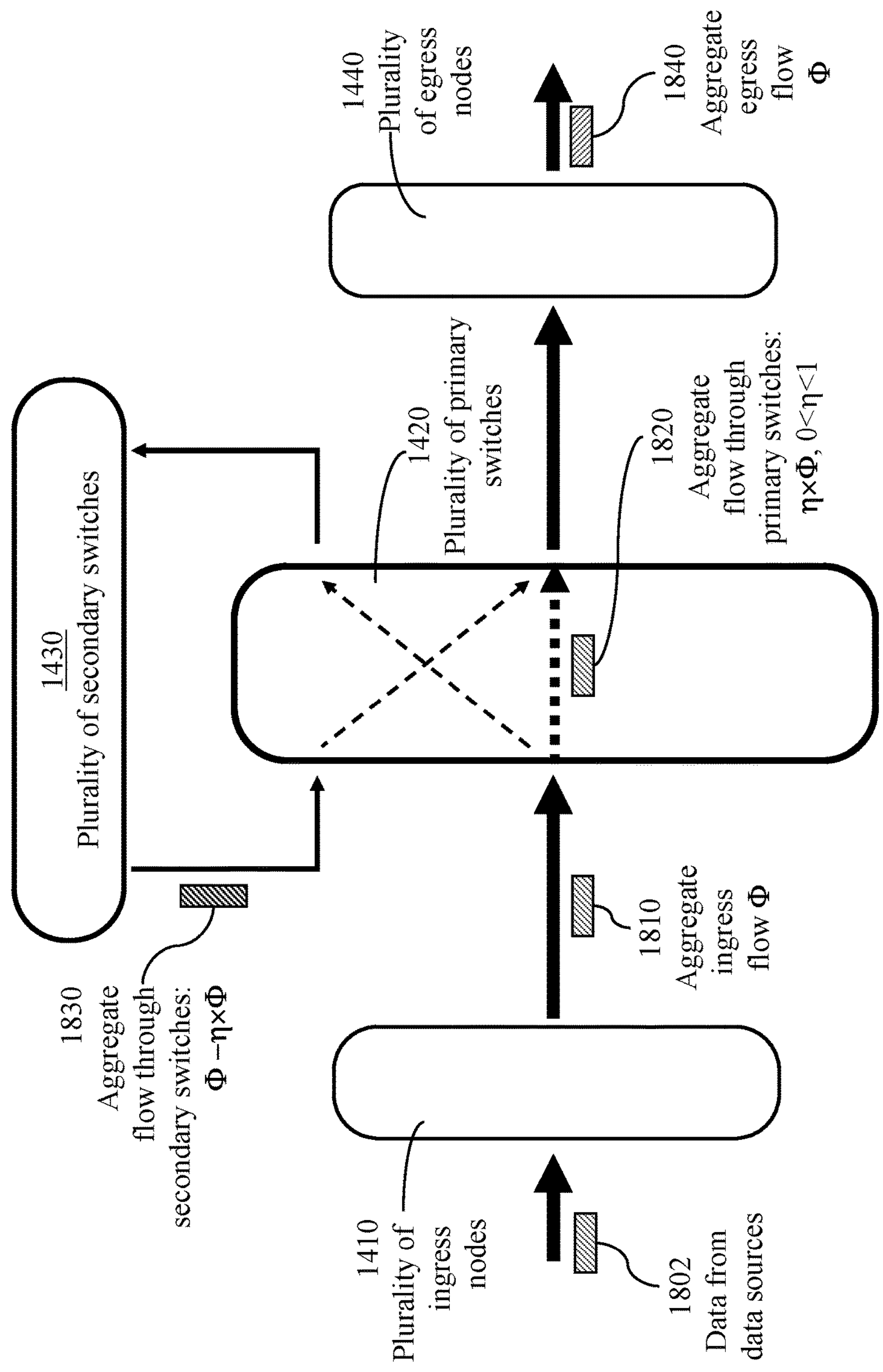
FIG. 18 illustrates data flow in the contiguous network of FIG. 1 under spatial variation of data traffic.

FIG. 18 illustrates data flow in the contiguous network 100 under anticipated spatial variation of data-traffic rates among the access nodes (i.e., between the ingress nodes and the egress nodes). The plurality 1410 of ingress nodes receives data 1802 from external data sources. The aggregate ingress flow 1810, $\Phi$, through the plurality 1410 of ingress nodes 112 and the aggregate flow 1840 through the plurality 1440 of egress nodes 114 have equal flow rates. A portion $\eta \times \Phi$, $0<\eta<1.0$, referenced as 1820, of the aggregate flow is transferred through one-hop paths traversing only the plurality 1420 of primary switches. The remainder $(\Phi-\eta \times \Phi)$, referenced as 1830, constitutes an inner flow. The inner flow 1830 does not include control data 1721/1722 between secondary switches 130 and primary switches 120, which would be relatively insignificant.

Figure 19:
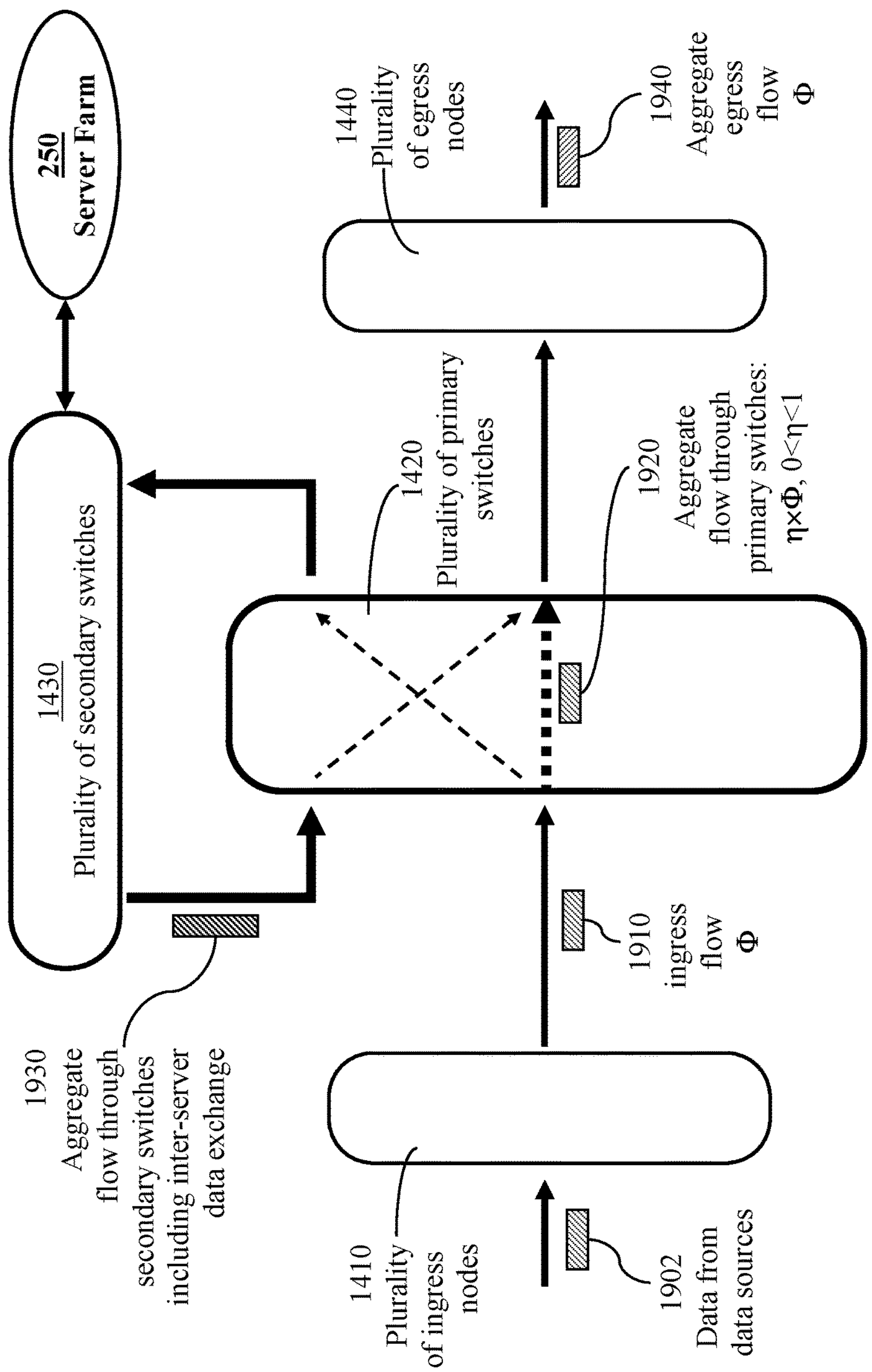
FIG. 19 illustrates data flow in the contiguous network of FIG. 2.

FIG. 19 illustrates data flow in the contiguous network 200. The plurality 1410 of ingress nodes receives data 1902 from external data sources. The aggregate ingress flow 1910, Φ, through the plurality 1410 of ingress nodes 112 and the aggregate egress flow 1940 through the plurality 1440 of egress nodes 114 have equal flow rates. A portion $\eta\times\Phi$, $0<\eta<1.0$, referenced as 1920, of the aggregate flow is transferred through one-hop paths traversing only the plurality 1420 of primary switches. The remainder $(\Phi-\eta\times\Phi)$ is transferred through compound paths each traversing a respective first primary switch 120, a respective secondary switch, and a respective second primary switch.

The inner flow 1930 between the plurality of 1420 of primary switches 120 and the plurality 1430 of secondary switches 130 includes the remainder $(\Phi-\eta\times\Phi)$ in addition to inter-server data flow among servers of the server farm 250. The plurality 1430 of secondary switches may include secondary switches 130 configured to switch data between primary switches 120, as illustrated in FIG. 12, as well as secondary switches 130 configured to support servers 1370, as illustrated in FIG. 13. The plurality 1430 of secondary switches comprises disjoint secondary switches 130. Data sent from one server 1370 coupled to a secondary switch 130 to another server coupled to another secondary switch traverses a respective primary switch 120. Thus, inner flow 1930 between the primary switches and the secondary switches may be significant as it includes both the inter-server data flow and the portion $(\Phi-\eta\times\Phi)$ of the aggregate flow Φ routed through compound paths.

With each ingress node having μ output ports, μ>1, each egress node having μ input ports, each secondary switch having μ input ports and μ output ports, and each primary switch having m primary input ports m>2, m primary output ports, n secondary input ports; and n secondary output ports, the plurality of ingress nodes contains μ×m ingress nodes, the plurality of egress nodes contains μ×m egress nodes, the plurality of primary switches contains $\mu^2$ primary switches, and the plurality of secondary switches contains μ×n secondary switches.

A primary input port 1110 of a primary switch connects to a respective ingress node 112, a primary output port 1130 of a primary switch 120 connects to a respective egress node 114, a secondary input port 1120 of a primary switch 120 connects to a respective secondary switch 130, and a secondary output port 1140 of a primary switch connects to a respective secondary switch 130.

The parameters μ and m are selected to satisfy a specified capacity requirement. The number n of secondary input ports and secondary output ports is judicially selected to ensure meeting requisite performance levels.

FIG. 20 illustrates a first scheme of inter-stage connectivity of the cloud-communications network of FIG. 1 or FIG. 2 as detailed below.

(i) The plurality 1410 of ingress nodes connects to the set of primary switches 120 forming the distributed single-stage connector 125 according to a pattern 2015 where an ingress node of index j, $0\le j<(\mu\times m)$, connects to a set $\{P^{(1)}\}_\mu$ of μ primary switches of indices:

$$\{\lfloor j/m\rfloor\times(\mu+1)+\alpha\times\mu\}|\text{modulo } \mu^2,\ 0\le\alpha<\mu.$$

(ii) The plurality 1420 of primary switches 120 forming the distributed single-stage connector 125 connects to the plurality 1440 of m egress nodes according to a pattern 2025 where a primary switch 120 of index p, $0\le p<\mu^2$, connects to a set $\{K\}_m$ of m egress nodes of indices: $\{\lfloor p/\mu\rfloor\times m+\lambda\}$, $0\le\lambda<m$.

(iii) The plurality 1420 of primary switches 120 forming the distributed single-stage connector 125 connects to the plurality 1430 of secondary switches 130 forming the auxiliary connector 135 according to a pattern 2045 where a primary switch 120 of index p, $0\le p<\mu^2$, connects to a set {S'}n of n secondary switches 130 of indices $\{\lfloor p/\mu\rfloor\times n+\lambda\}$, $0\le\lambda<n$.

(iv) The plurality 1430 of secondary switches 130 forming the auxiliary connector 135 connects to the plurality 1420 of primary switches forming the distributed single-stage connector 125 according to a pattern 2035 where a secondary switch of index s, $0\le s<\mu\times n$ connects to a set $\{P^{(2)}\}_\mu$ of μ primary switches of indices $\{\lfloor s/n\rfloor\times(\mu+1)+\alpha\times\mu\}|\text{modulo } \mu^2$, $0\le\alpha<\mu$.

Figure 21:
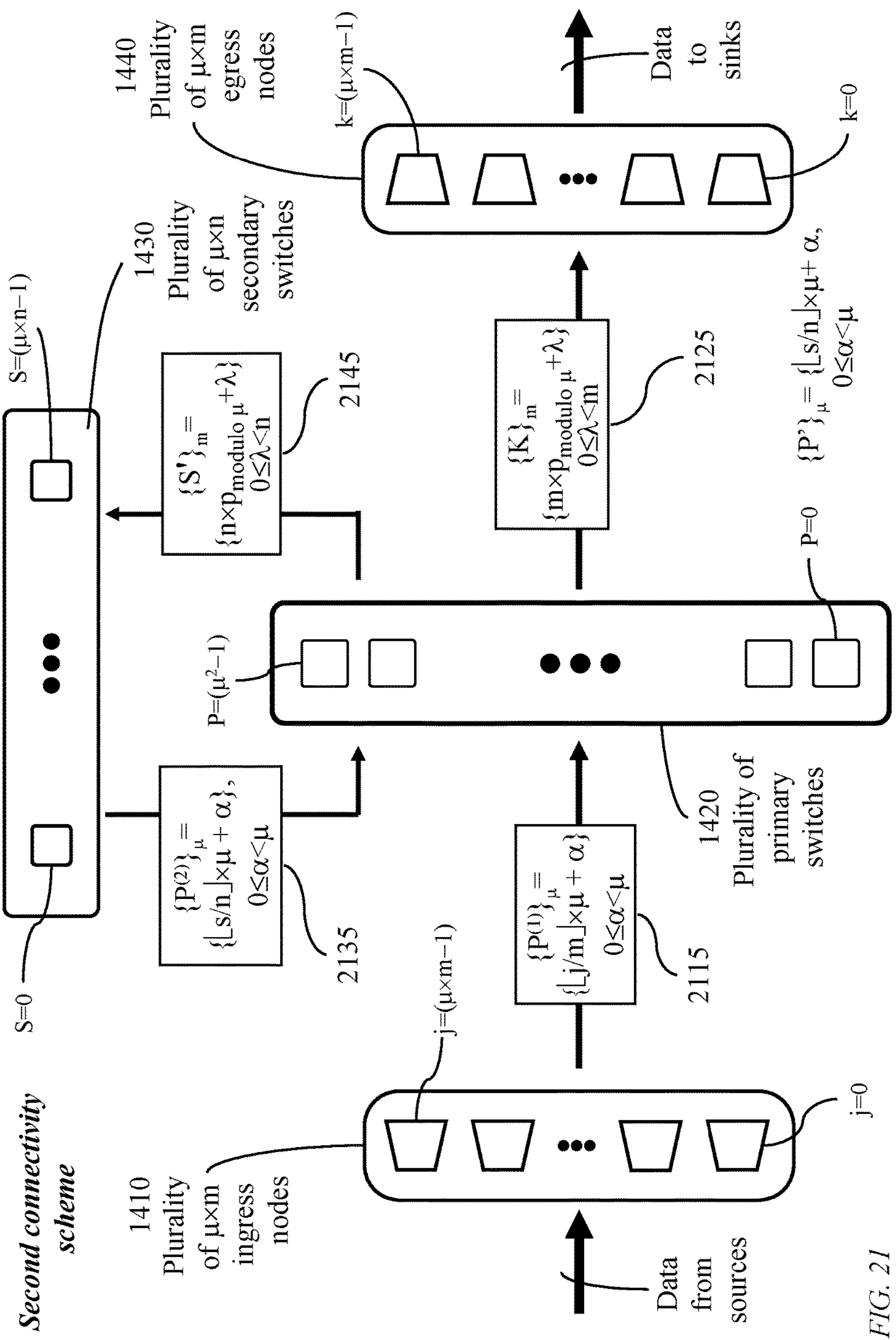
FIG. 21 illustrates a second scheme of inter-stage connectivity of the contiguous network of FIG. 1, in accordance with an embodiment of the present invention.

FIG. 21 illustrates a second scheme of inter-stage connectivity of the contiguous network of FIG. 1 or FIG. 2 as detailed below.

(1) The plurality 1410 of ingress nodes connects to the plurality 1420 of primary switches 120 forming the distributed single-stage connector 125 according to a pattern 2115 where an ingress node of index j, $0\le j<(\mu\times m)$, connects to a set $\{P^{(1)}\}_\mu$ of μ primary switches of indices $\{\lfloor j/m\rfloor\times\mu+\alpha\}$, $0\le\alpha<\mu$.

(2) The plurality 1420 of primary switches 120 forming the distributed single-stage connector 125 connects to the plurality 1440 of m egress nodes according to a pattern 2125 where a primary switch 120 of index p, $0\le p<\mu^2$, connects to a set $\{K\}_m$ of m egress nodes of indices: $\{m\times p_{modulo\ \mu}+\lambda\}$, $0\le\lambda<m$.

(3) The plurality 1420 of primary switches 120 forming the distributed single-stage connector 125 connects to the plurality 1430 of secondary switches 130 forming the auxiliary connector 135 according to a pattern 2145 where a primary switch 120 of index p, $0\le p<\mu^2$, connects to a set {S'}n of n secondary switches 130 of indices $\{n\times p_{modulo\ \mu}+\lambda\}$, $0\le\lambda<n$.

(4) The plurality 1430 of secondary switches 130 forming the auxiliary connector 135 connects to the plurality 1420 of primary switches forming the distributed single-stage connector 125 according to a pattern 2135 where a secondary switch of index s, $0\le s<\mu\times n$ connects to a set $\{P^{(2)}\}_\mu$ of μ primary switches of indices $\{\lfloor s/n\rfloor\times\mu+\alpha\}$, $0\le\alpha<\mu$.

In both connectivity schemes, an ingress controller of an ingress node may be configured to select an output port of the ingress node of index $\lfloor k/m\rfloor$ as a preferred primary switch to establish a connection over a one-hop path to an egress node of index k, $0\le k<(\mu\times m)$.

In both connectivity patterns, an ingress controller of an ingress node is preferably communicatively coupled to an egress controller of a respective egress node, and a controller of a primary switch of index p is preferably coupled to a controller of a primary switch of index $\{\mu\times p_{modulo\ \mu}+\lfloor p/\mu\rfloor\}$, $0\le p<\mu^2$ to facilitate dissemination of control data through the network as described below with reference to FIG. 24.

The network 100 may be configured as a localized data center with the ingress nodes, egress nodes, primary switches, and secondary switches configured as latent space switches which have the advantage of structural simplicity, scalability, and ease of control. Each primary switch has (m+n) input ports and (m+n) output ports. In a primary switch configured as a latent space switch, the m primary input ports and the n secondary input ports are preferably interleaved. Likewise, the m primary output ports and the n secondary output ports are preferably interleaved. A primary controller of the primary switch is configured to select for each primary input port a respective secondary output port so that a path from said each primary input port to said respective secondary output port has a least delay.

In the first and second connectivity patterns, a set of n secondary switches of indices {λ×n to (λ×n+n−1)} may be collocated with a set of μ primary switches of indices {ρ×μ to (λ×μ+μ−1)}, 0≤λ<μ.

Figure 22:
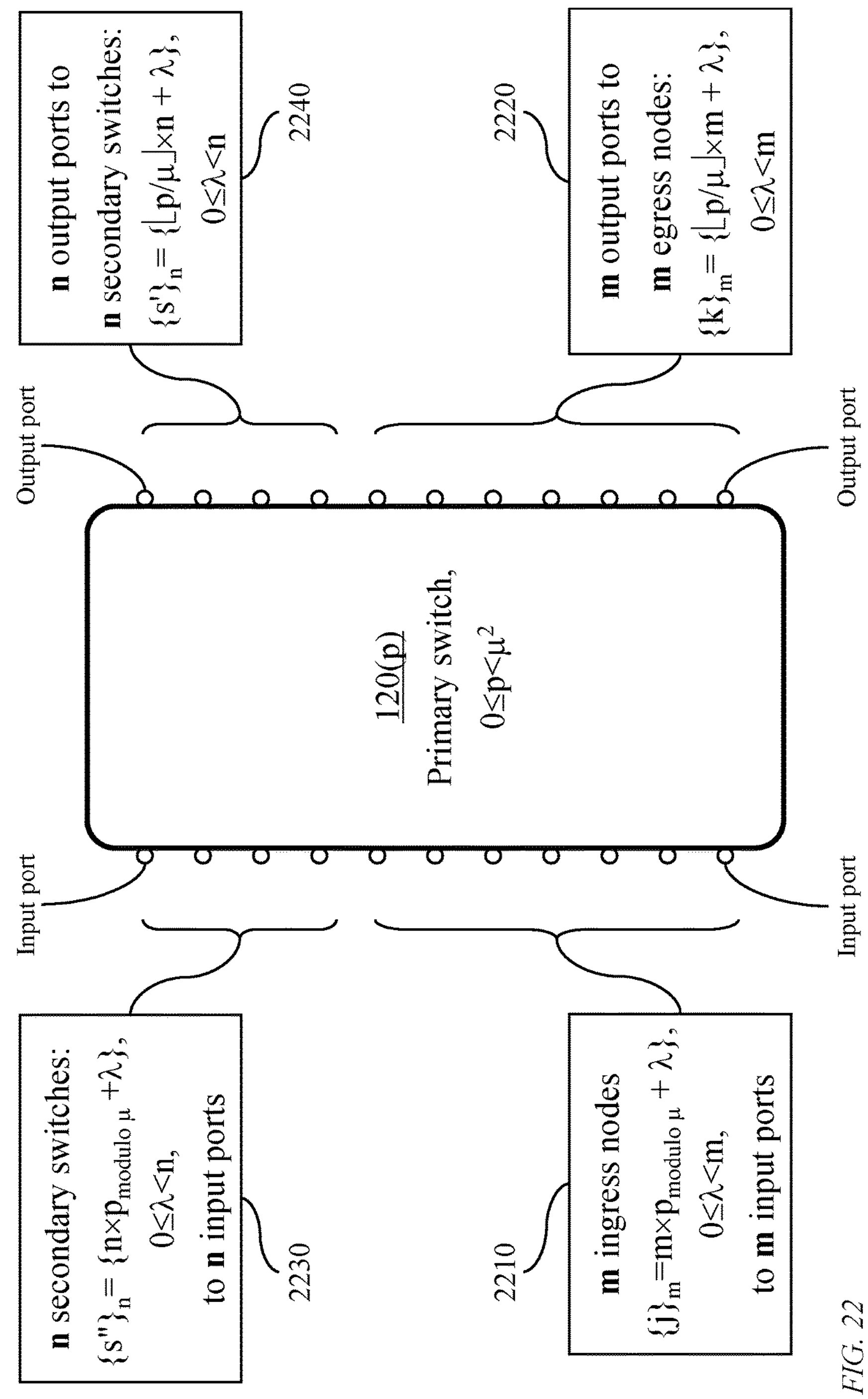
FIG. 22 illustrates connectivity of a primary switch according to the first scheme of inter-stage connectivity.

FIG. 22 illustrates connectivity of a primary switch 120 according to the first scheme of inter-stage connectivity. A primary switch of index p, $0 \le p < \mu^2$, comprises:

- m primary input ports each connecting an ingress node of a set 2210 of m ingress nodes of indices $\{m \times p_{modulo\ \mu} + \lambda\}$, 0≤λ<m;
- m primary output ports each connecting to an egress node of a set 2220 of m egress nodes of indices $\{\lfloor p/\mu \rfloor \times m + \lambda\}$, 0≤λ<m;
- n secondary input ports each connecting a secondary switch of a set 2230 of n secondary switches of indices of indices $\{n \times p_{modulo\ \mu} + \lambda\}$, 0≤λ<n;
- n secondary output ports each connecting to a secondary switch of a set 2240 of n secondary switches of indices $\{\lfloor p/\mu \rfloor \times n + \lambda\}$, 0≤λ<n.

Figure 23:
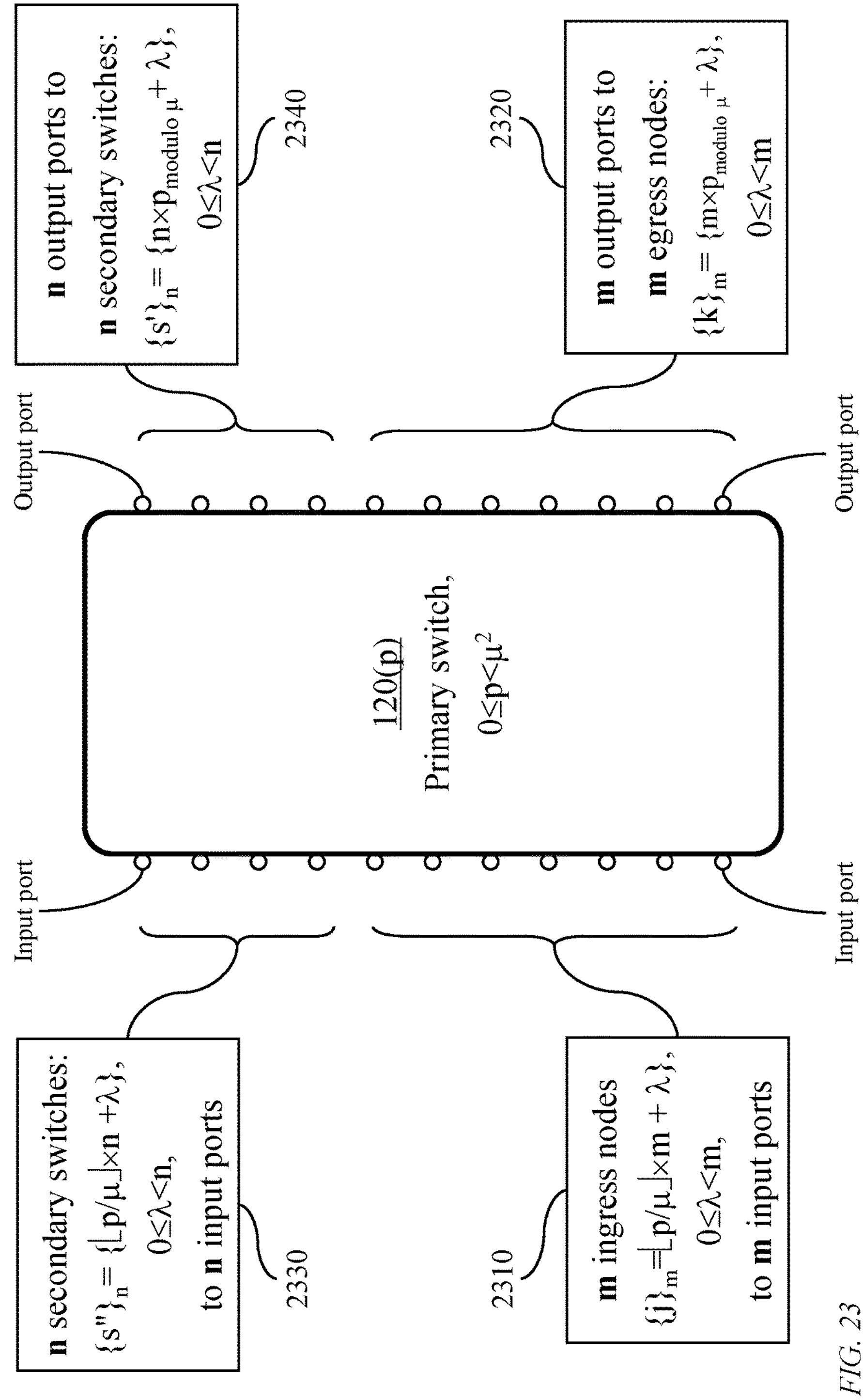
FIG. 23 illustrates connectivity of a primary switch according to the second scheme of inter-stage connectivity.

FIG. 23 illustrates connectivity of a primary switch 120 according to the second scheme of inter-stage connectivity. A primary switch of index p, $0 \le p < \mu^2$, comprises:

- m primary input ports each connecting an ingress node of a set 2310 of m ingress nodes of indices $\{\lfloor p/\mu \rfloor \times m + \lambda\}$, 0≤λ<m;
- m primary output ports each connecting to an egress node of a set 2320 of m egress nodes of indices $\{m \times p_{modulo\ \mu} + \lambda\}$, 0≤λ<m;
- n secondary input ports each connecting a secondary switch of a set 2330 of n secondary switches of indices of indices $\{\lfloor p/\mu \rfloor \times n + \lambda\}$, 0≤λ<n; and
- n secondary output ports each connecting to a secondary switch of a set 2240 of n secondary switches of indices $\{n \times p_{modulo\ \mu} + \lambda\}$, 0≤λ<n.

Table-1A and Table-1B indicate connectivity of primary switches to access nodes and secondary switches in a switching system configured according to the first connectivity scheme of FIG. 20 for μ=5, m=7, and n=4. The number of access nodes is μ×m=35, the number of primary switches is $\mu^2$=25, and the number of secondary switches is μ×n=20.

An access node of index j, 0≤j<(μ×m), has an upstream channel to each of μ primary switches of indices: $(\mu+1) \times \lfloor j/m \rfloor + \mu \times \alpha$, 0≤α<μ. Thus:

- each of the m access nodes of indices 0, 1, 2, 3, 4, 5, and 6 has an upstream channel to each of the primary switches of indices 0, 5, 10, 15, and 20;
- each of the m access nodes of indices 7, 8, 9, 10, 11, 12, and 13 has an upstream channel to each of the primary switches of indices 6, 11, 16, 21, and $26_{modulo\ 25}$ (i.e., 1, 6, 11, 16, and 21);
- each of the m access nodes of indices 28, 29, 30, 31, 32, 33, and 34 has an upstream channel to each of the primary switches of indices 24, $29_{modulo\ 25}$, $34_{modulo\ 25}$, $39_{modulo\ 25}$, and $44_{modulo\ 25}$ (i.e., 4, 9, 14, 19, 24).

A primary switch of index p, $0 \le p < \mu^2$, has a downstream channel to each of m access nodes of indices $m \times \lfloor p/\mu \rfloor + \lambda$, 0≤λ<m. Thus,

- each of primary switches of indices 0, 1, 2, 3, and 4 has a downstream channel to each of the access nodes of indices 0, 1, 2, 3, 4, 5, and 6;
- each of primary switches of indices 5, 6, 7, 8, and 9 has a downstream channel to each of the access nodes of indices 7, 8, 9, 10, 11, 12, and 13;
- each of primary switches of indices 20, 21, 22, 23, and 24 has a downstream channel to each of the access nodes of indices 28, 29, 30, 31, 32, 33, and 34.

TABLE 1A

First connectivity scheme: Access nodes to/from primary switches

| Connections of primary switches (indices 0-24, in italics) from/to access nodes (indices 0-34) | | | Destination access nodes 0-6 | 7-13 | 14-20 | 21-27 | 28-34 |
|---|---|---|---|---|---|---|---|
| | | | From primary switches to ↑ | | | | |
| From | 0-6 | To | *0* | *5* | *10* | *15* | *20* |
| source | 7-13 | Primary | *1* | *6* | *11* | *16* | *21* |
| access | 14-20 | switches | *2* | *7* | *12* | *17* | *22* |
| nodes | 21-27 | → | *3* | *8* | *13* | *18* | *23* |
| | 28-34 | | *4* | *9* | *14* | *19* | *24* |

TABLE 1B

First connectivity scheme: Secondary switches to/from primary switches

| Connections of primary switches (indicices 0-24, in italics) from/ to access nodes (indices 0-19) | | | Secondary switches 0-3 | 4-7 | 8-11 | 12-15 | 16-19 |
|---|---|---|---|---|---|---|---|
| | | | From primary switches to ↑ | | | | |
| From | 0-3 | To | *0* | *5* | *10* | *15* | *20* |
| Secondary | 4-7 | Primary | *1* | *6* | *11* | *16* | *21* |
| switches | 8-11 | switches | *2* | *7* | *12* | *17* | *22* |
| | 12-15 | → | *3* | *8* | *13* | *18* | *23* |
| | 16-19 | | *4* | *9* | *14* | *19* | *24* |

A secondary switch of index s, 0≤s<(μ×n), connects to primary switches of indices: $(\mu+1) \times \lfloor s/n \rfloor + \mu \times \alpha$, 0≤α<μ. Thus:

- each of the n secondary switches of indices 0, 1, 2, and 3 has a channel to each of the primary switches of indices 0, 5, 10, 15, and 20;
- each of the n secondary switches of indices 4, 5, 6 and 7 has an upstream channel to each of the primary switches of indices 6, 11, 16, 21, and $26_{modulo\ 25}$ (i.e., 1, 6, 11, 16, and 21);
- each of the n secondary switches of indices 16, 17, 18, and 19 has an upstream channel to each of the primary switches of indices 24, $29_{modulo\ 25}$, $34_{modulo\ 25}$, $39_{modulo\ 25}$, and $44_{modulo\ 25}$ (i.e., 4, 9, 14, 19, 24).

TABLE 2A

Second connectivity scheme: Access nodes to/from primary switches

| Connections of primary switches (indices 0-24, in italics) From/ to secondary switches (indices 0-34) | | | Destination access nodes 0-6 | 7-13 | 14-20 | 21-27 | 28-34 |
|---|---|---|---|---|---|---|---|
| | | | From primary switches to ↑ | | | | |
| From | 0-6 | To | *0* | *1* | *2* | *3* | *4* |
| source | 7-13 | Primary | *5* | *6* | *7* | *8* | *9* |
| access | 14-20 | switches | *10* | *11* | *12* | *13* | *14* |
| nodes | 21-27 | → | *15* | *16* | *17* | *18* | *19* |
| | 28-34 | | *20* | *21* | *22* | *23* | *24* |

TABLE 2B

| Second connectivity scheme: Secondary switches to/from primary switches | | | | | | | |
|---|---|---|---|---|---|---|---|
| Connections of primary switches | | | Secondary switches | | | | |
| (indices 0-24, in italics) From/ to secondary switches (indices 0-19) | | | 0-3 | 4-7 | 8-11 | 12-15 | 16-19 |
| | | | From primary switches to ↑ | | | | |
| From | 0-3 | To | *0* | *1* | *2* | *3* | *4* |
| Second- | 4-7 | Primary | *5* | *6* | *7* | *8* | *9* |
| ary | 8-11 | switches | *10* | *11* | *12* | *13* | *14* |
| switches | 12-15 | → | *15* | *16* | *17* | *18* | *19* |
| | 16-19 | | *20* | *21* | *22* | *23* | *24* |

A primary switch of index p, $0 \le p < \mu^2$, has a channel to each of n secondary switches of indices $n \times \lfloor p/\mu \rfloor + \lambda$, $0 \le \lambda < n$. Thus,

- each of primary switches of indices 0, 1, 2, 3, and 4 has a channel to each of the secondary switches of indices 0, 1, 2, and 3;
- each of primary switches of indices 5, 6, 7, 8, and 9 has a channel to each of the secondary switches of indices 4, 5, 6, and 7;
- each of primary switches of indices 20, 21, 22, 23, and 24 has a channel to each of the secondary switches of indices 16, 17, 18, and 19.

Table-2A and Table-2B indicate connectivity of primary switches to access nodes and secondary switches in a switching system configured according to the second connectivity scheme of FIG. 21 for $\mu=5$, m=7, and n=4.

An access node of index j, $0 \le j < (\mu \times m)$, has an upstream channel to a primary switch of index: $\mu \times \lfloor j/m \rfloor + \alpha$, $0 \le \alpha < \mu$. Thus:

- each of the m access nodes of indices 0, 1, 2, 3, 4, 5, and 6 has an upstream channel to each of the primary switches of indices 0, 1, 2, 3, and 4;
- each of the m access nodes of indices 7, 8, 9, 10, 11, 12, and 13 has an upstream channel to each of the primary switches of indices 5, 6, 7, 8, and 9;
- each of the m access nodes of indices 28, 29, 30, 31, 32, 33, and 34 has an upstream channel to each of the primary switches of indices 20, 21, 22, 23, and 24.

A primary switch of index p, $0 \le p < \mu^2$, has a downstream channel to each of m access nodes of indices $m \times p_{modulo\ \mu} + \lambda$, $0 \le \lambda < m$. Thus,

- each of primary switches of indices 0, 5, 10, 15, and 20 has a downstream channel to each of the access nodes of indices 0, 1, 2, 3, 4, 5, and 6;
- each of primary switches of indices 1, 6, 11, 16, and 21 has a downstream channel to each of the access nodes of indices 7, 8, 9, 10, 11, 12, and 13;
- each of primary switches of indices 4, 9, 14, 19, and 24 has a downstream channel to each of the access nodes of indices 28, 29, 30, 31, 32, 33, and 34.

A secondary switch of index s, $0 \le s < (\mu \times n)$, connects to primary switches of indices: $\mu \times \lfloor s/n \rfloor + \alpha$, $0 \le \alpha < \mu$. Thus:

- each of the n secondary switches of indices 0, 1, 2, and 3 has an upstream channel to each of the primary switches of indices 0, 1, 2, 3, and 4;
- each of the n access nodes of indices 4, 5, 6 and 7 has an upstream channel to each of the primary switches of indices 5, 6, 7, 8, and 9;
- each of the n access nodes of indices 16, 17, 18, and 19 has an upstream channel to each of the primary switches of indices 20, 21, 22, 23, and 24.

A primary switch of index p, $0 \le p < \mu^2$, has a channel to each of n secondary switches of indices $n \times p_{modulo\ \mu} + \lambda$, $0 \le \lambda < n$. Thus,

- each of primary switches of indices 0, 5, 10, 15, and 20 has a channel to each of the secondary switches of indices 0, 1, 2, and 3;
- each of primary switches of indices 1, 6, 11, 16, and 21 has a channel to each of the secondary switches of indices 4, 5, 6, and 7;
- each of primary switches of indices 4, 9, 14, 19, and 24 has a channel to each of the secondary switches of indices 16, 17, 18, and 19.

Collocating Primary Switches

Figure 24:
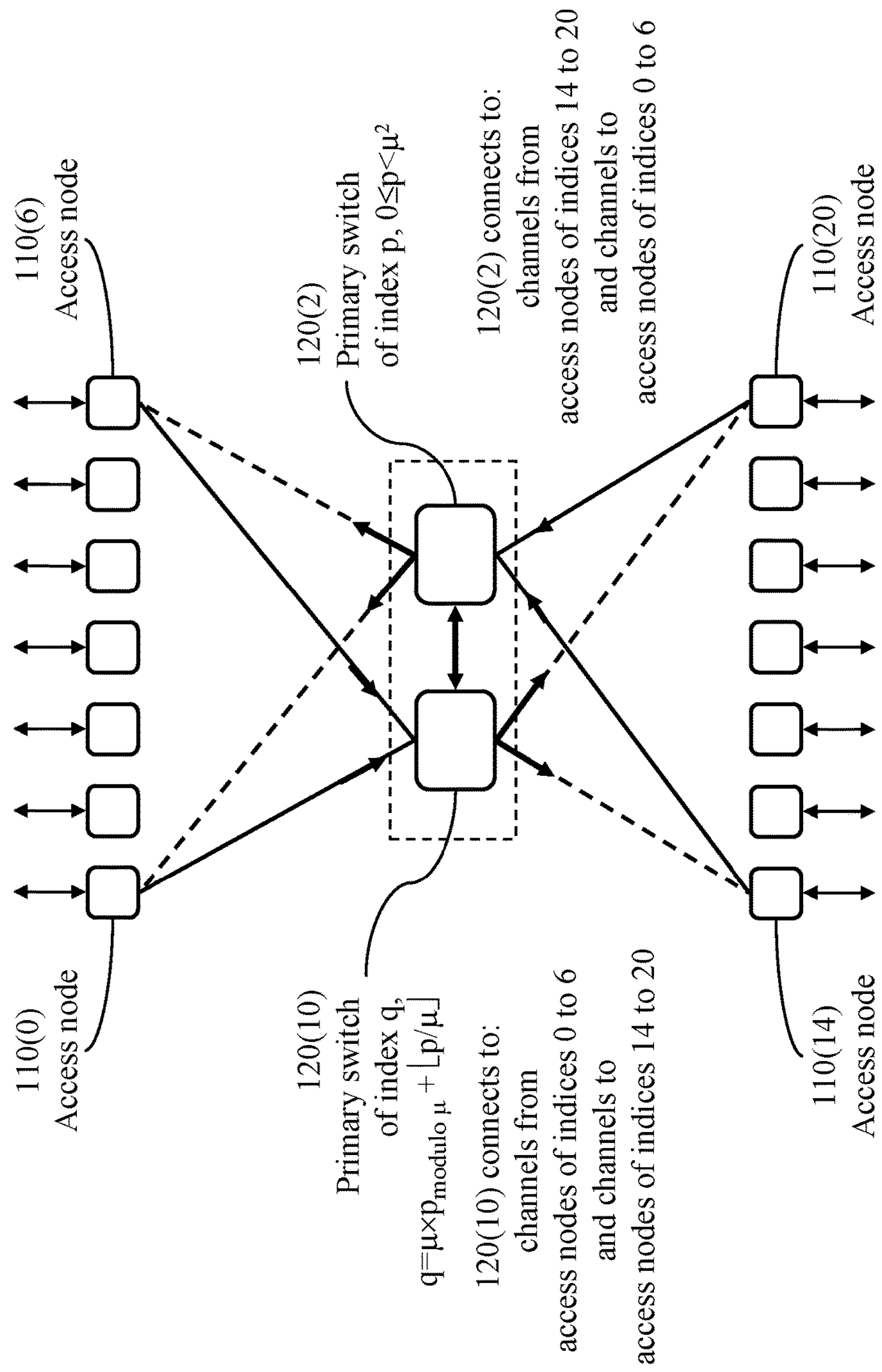
FIG. 24 illustrates collocating primary switches of the network of FIG. 1 for ease of exchange of control signals, in accordance with an embodiment of the present invention.

FIG. 24 illustrates collocating primary switches, for ease of exchange of control signals, of the network configured according to either of the connectivity schemes of FIG. 20 or FIG. 21, with $\mu=5$, m=7, and n=4.

As indicated in Table-1A and Table-2A, a primary switch 120 of index 2 connects to:

- upstream channels from access nodes 110 (ingress nodes 112) of indices 0 to 6;
- downstream channels to access nodes 110 (egress nodes 114) of indices 14 to 20;
- channels from secondary switches 130 of indices 0 to 3; and
- channels to secondary switches of indices 8 to 11.

Conversely, the primary switch 120 of index 2 connects to:

- upstream channels from access nodes 110 (ingress nodes 112) of indices 14 to 20;
- downstream channels to access nodes 110 (egress nodes 114) of indices 0 to 6;
- channels from secondary switches 130 of indices 8 to 11; and
- channels to secondary switches of indices 0 to 3.

Thus, if the primary controller of the primary switch 120 of index 2 is coupled to the primary controller of primary switch 120 of index 10, the coupled controllers can exchange control messages directly with access nodes of indices 0 to 6 and 14 to 20, and exchange control messages directly with secondary switches of indices 0 to 3 and 8 to 11. The two primary switches may, instead, share a common primary controller.

Likewise, if the primary controller of the primary switch 120 of index 8 is coupled to the primary controller of primary switch 120 of index 18, the coupled controllers can exchange control messages directly with access nodes of indices 7 to 13 and 21 to 27, and exchange control messages directly with secondary switches of indices 4 to 7 and 12 to 15.

In general, a primary switch of index p, $0 \le p < \mu^2$, may share a common primary controller with a primary switch of index q; $q = \{\mu \times p_{modulo\ \mu} \lfloor p/\mu \rfloor\}$. For an index p that is an integer multiple of $(\mu+1)$, q=p, and the primary switch of index p connects to: upstream channels from a set of m access nodes and downstream channels to the same set of access nodes; and channels from a set of n secondary switches and channels to the same set of secondary switches. Thus, the primary controller of the primary switch need not be coupled to another primary switch.

Figure 25:
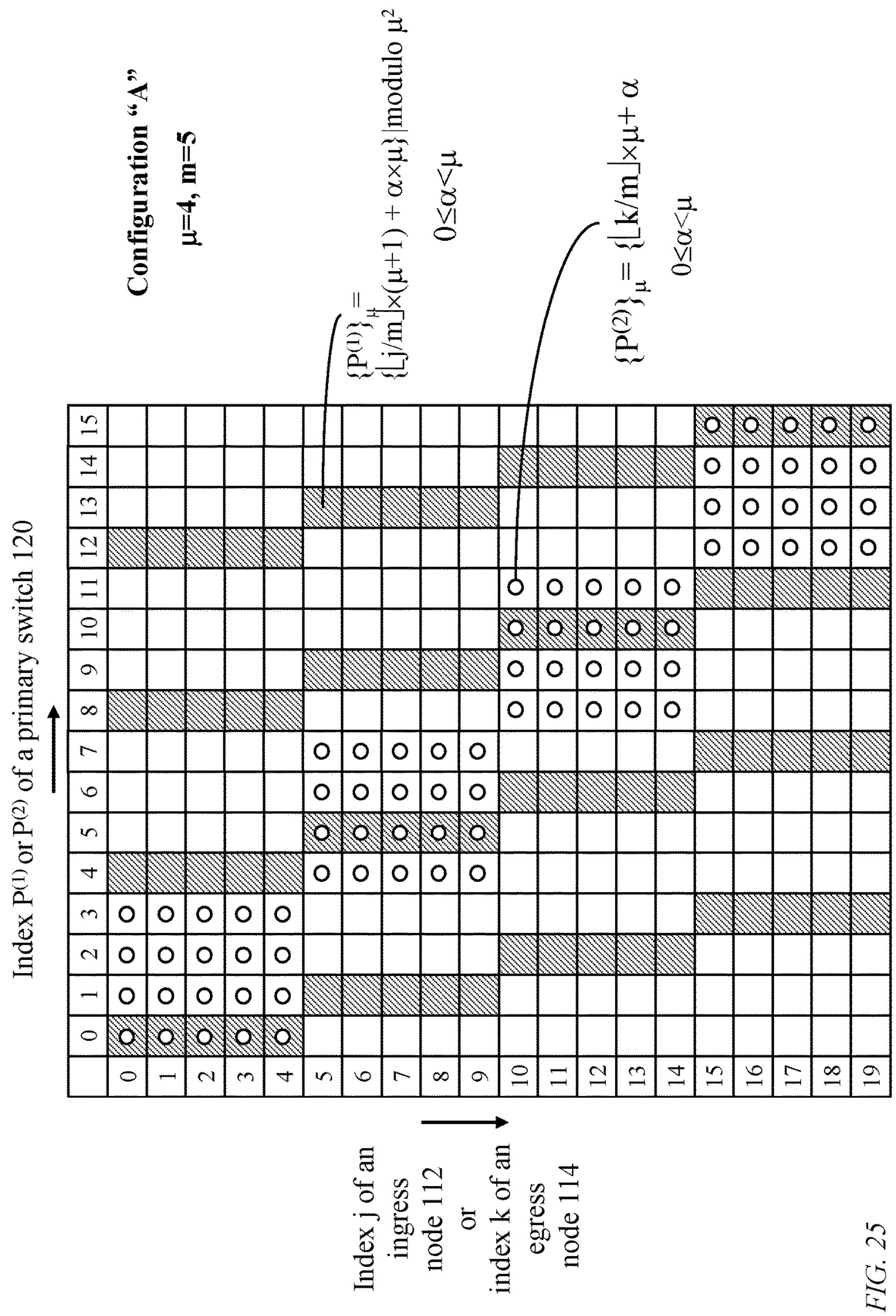
FIG. 25 illustrates exemplary connectivity of the network of FIG. 20.

FIG. 25 depicts connectivity of a network defined according to the first connectivity scheme of FIG. 20. An index $p^{(1)}$, $0 \le p^{(1)} < \mu^2$ of a primary switch 120 to which an ingress node of index j connects, $0 \le j < \mu \times m$, is indicated as a shaded (j, $P^{(1)}$) cell. An index $p^{(2)}$, $0 \le P^{(2)} < \mu^2$ of a primary switch 120 connecting to an egress node of index k, $0 \le k < \mu \times m$, is indicated by a circular mark in a (k, $p^{(2)}$) cell. FIG. 25 also represents connectivity of secondary output ports of primary switches to input ports of the secondary switches and connectivity of output ports of secondary switches to secondary input ports of the primary switches. The connectivity patterns are defined in Table-5 and Table-6.

Figure 26:
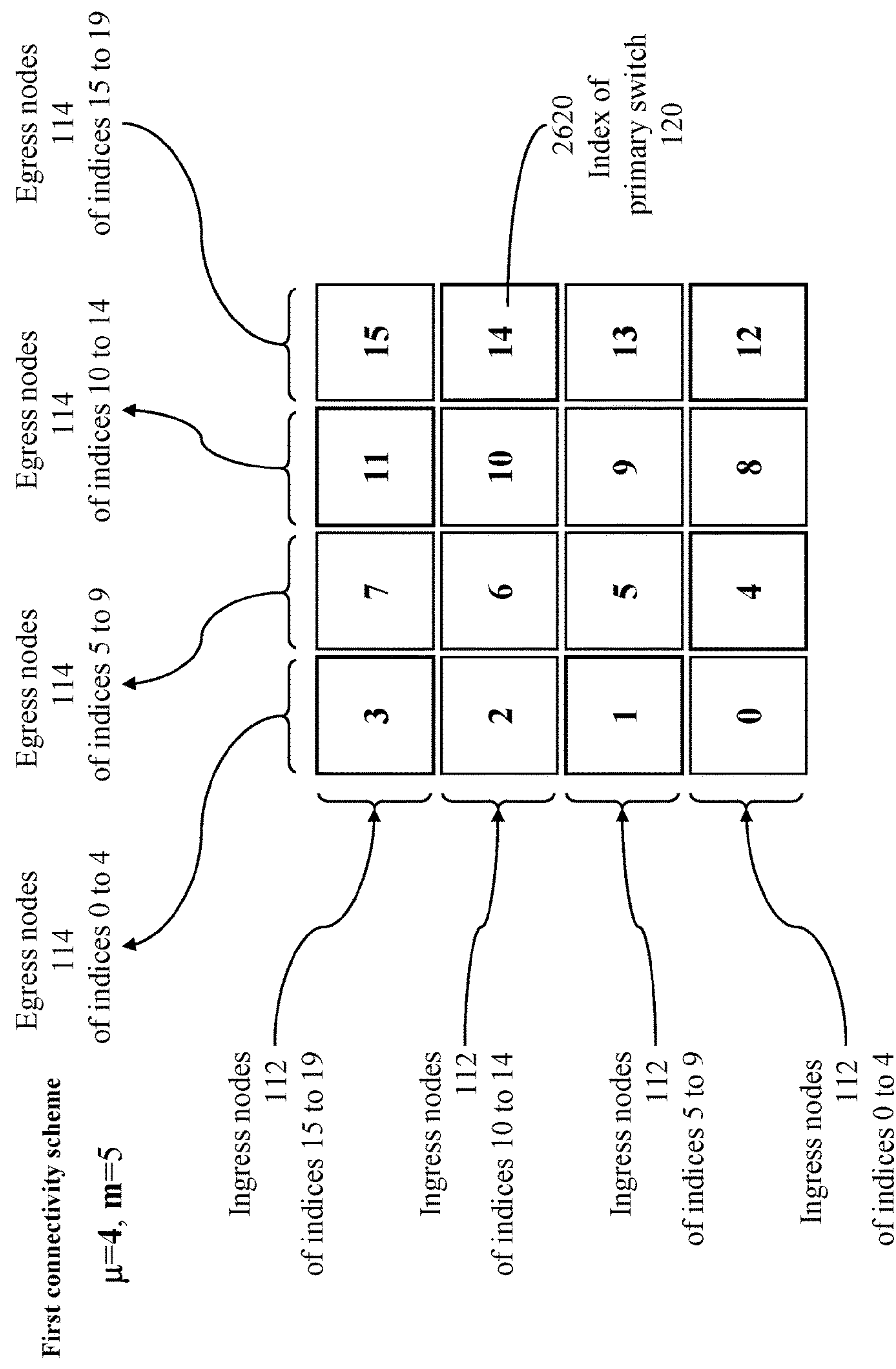
FIG. 26 illustrates an alternate representation of the exemplary connectivity of the network of FIG. 20.

FIG. 26 provides an alternate representation of the connectivity of FIG. 25 where the index 2620 of a primary switch 120 connecting an ingress node of index j to an egress node of index k, 0≤j, μ×m, 0≤k, μ×m, for μ4 and m=5 is indicated.

Figure 27:
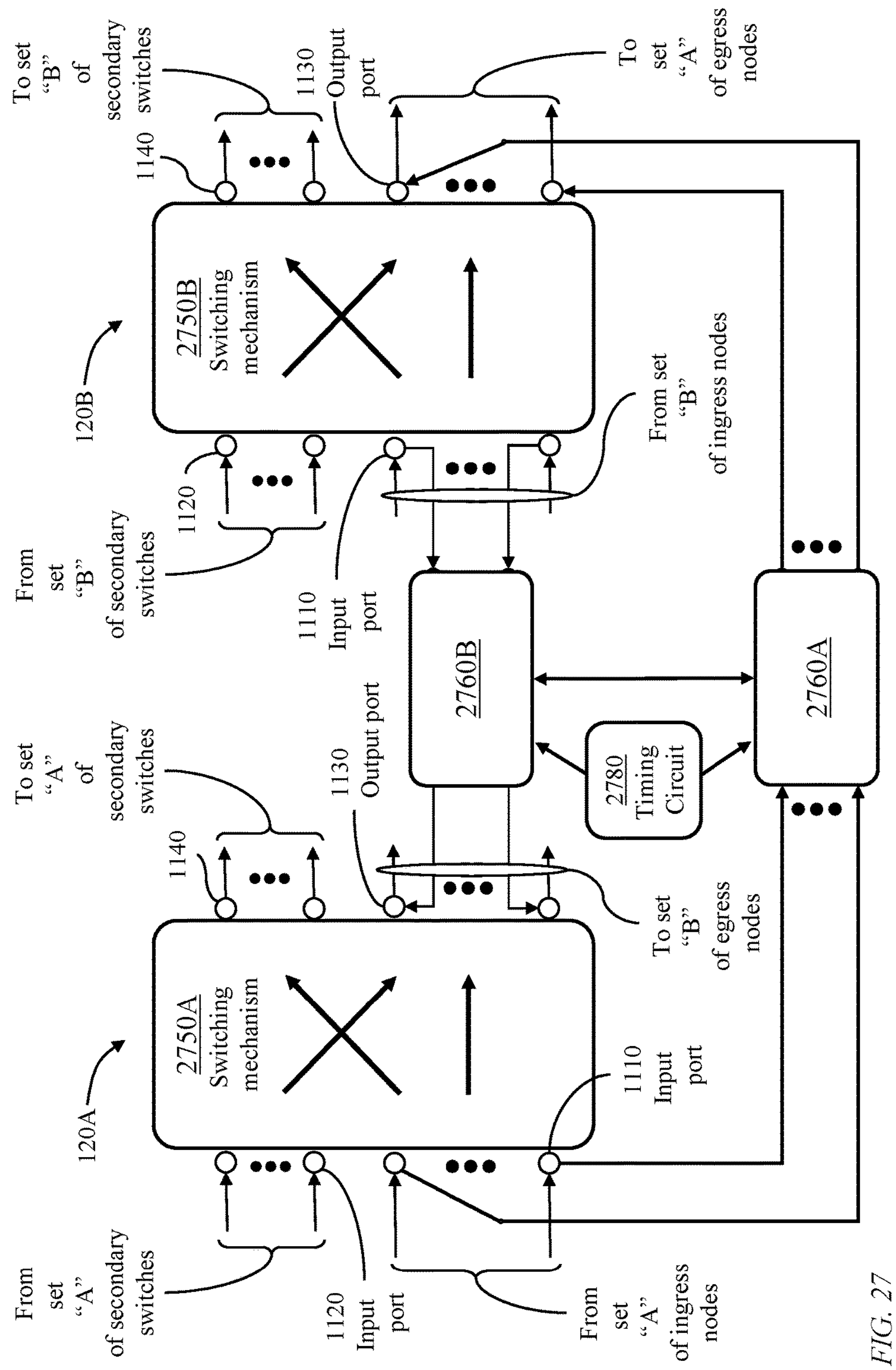
FIG. 27 illustrates a first arrangement of coupling controllers of two collocated primary switches, in accordance with an embodiment of the present invention.

FIG. 27 illustrates a first arrangement of coupling controllers of collocated primary switches 120A and 120B. Input ports 1110 of primary switch 120A which connect to m upstream channels 116 from respective m ingress nodes 112 connect to a controller 2760A. Outputs of controller 2760A connect to output ports 1130 of primary switch 120B which connect to downstream channels 118 directed to m egress nodes 114. Likewise, m input ports of primary switch 120B which connect to m upstream channels from respective m ingress nodes 112 connect to a controller 2760B. Outputs of controller 2760B connect to m output ports 1130 of primary switch 120A which connect to m downstream channels to respective m egress nodes 114. Internally, each of controller 2760A and 2760B may have a multiplexer to combine control signals receives from ingress nodes for sequential processing and a demultiplexer to distribute downstream control signals to respective egress nodes. A timing circuit 2780 provides a reference time and determines discrepancies between the reference time and timing data received from ingress nodes for the purpose of temporal alignment of the ingress nodes with respect to the reference time.

Figure 28:
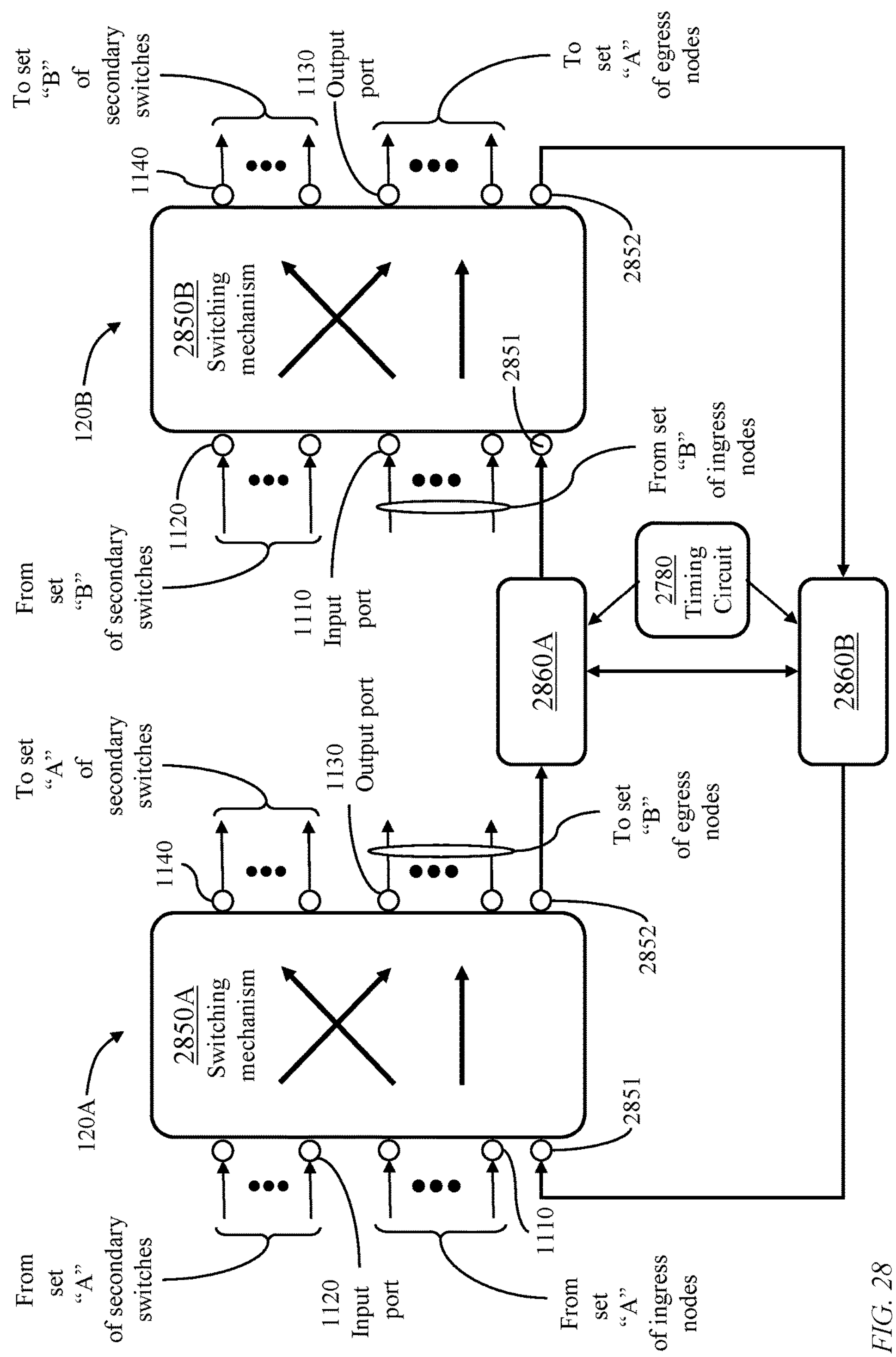
FIG. 28 illustrates a second arrangement of coupling controllers of two collocated primary switches, in accordance with an embodiment of the present invention.

FIG. 28 illustrates a second arrangement of coupling controllers of collocated primary switches 120A and 120B. Controller 2860A receives control signals from input ports of primary switch 120A through the switching mechanism 2850A and a designated control output port 2852 of primary switch 120A and distributes generated control signals to output ports of primary switch 120B through a designated control input port 2851 of primary switch 120B and the switching mechanism 2850B.

Controller 2860B receives control signals from input ports of primary switch 120B through the switching mechanism 2850B and a designated output port 2852 of primary switch 120B and distributes generated control signals to output ports of primary switch 120A through a designated input port 2851 of primary switch 120A and the switching mechanism 2750A.

A timing circuit 2780 provides a reference time and determines discrepancies between the reference time and timing data received from ingress nodes for the purpose of temporal alignment of the ingress nodes with respect to the reference time.

Any of the ingress nodes 112, the primary switches 120, the secondary switches 130, and the egress nodes 114 may be implemented as a cross-bar type space switch, any form of an instantaneous space switch, or a latent space switch. A latent space switch has the advantages of structural simplicity, scalability, and ease of control.

A preferred configuration of a latent space switch having N ingress ports and N egress ports, N>1, disclosed in U.S. Pat. No. 8,971,340, employs N memory devices and a single transposing rotator, having N inlets and N outlets. The transposing rotator is configured to cyclically connect each inlet to each outlet, starting with a transposed outlet of the each inlet, during a time frame organized into N time slots. During each time slot: an inlet of the rotator alternately connects to a respective ingress port and a respective memory device; and a peer outlet of the each inlet alternately connects to the respective memory device and a respective egress port. A path from an input port of index x of the latent space switch to an output port of index y of the latent space switch, $0 \le x < N$, $0 \le y < N$, has a systematic delay of $(y-x)_{modulo\ N}$ or $(x-y)_{modulo\ N}$, depending on the direction of rotation of the rotator, where the input ports are indexed sequentially between 0 and (N−1) and the output ports are indexed sequentially between 0 and (N−1).

Figure 29:
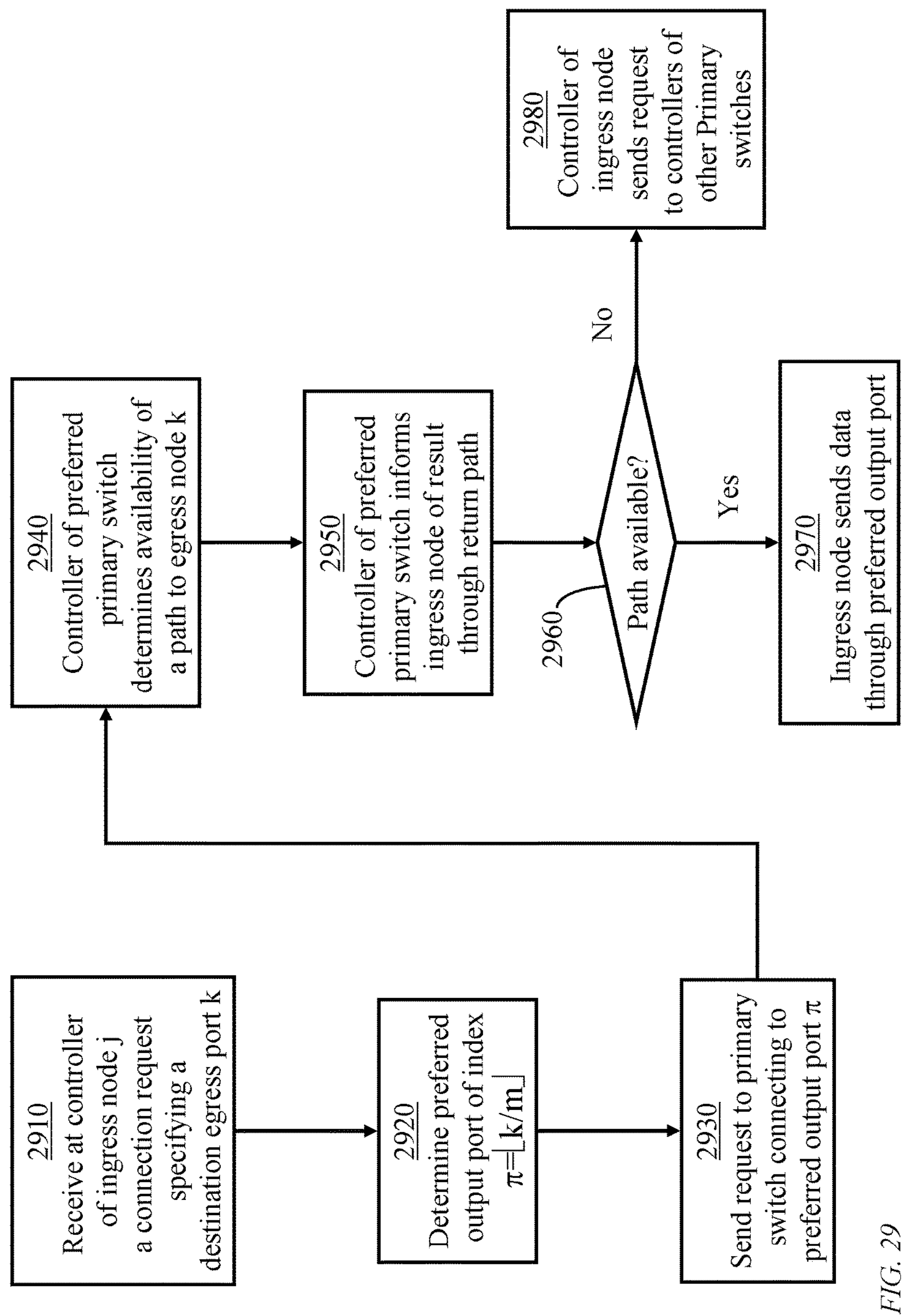
FIG. 29 is a flow chart depicting a method of routing through the network of FIG. 1, in accordance with an embodiment of the present invention.

FIG. 29 is a flow chart depicting a method of routing through a switching system based on the connectivity scheme of FIG. 20 or FIG. 21. A controller of an ingress node 112(*j*) receives (process 2910) a connection request to a destination egress node 114(*k*), $0 \le j < (\mu \times m)$, $0 \le k < (\mu \times m)$. The controller of ingress node 112(*j*) determines (process 2920) an index of a preferred output port of ingress node 112(*j*) which leads to a primary switch 120 connecting directly to egress node 114(*k*). For any of the connectivity patterns described above, the index of the preferred output port is determined as $\pi = \lfloor k/m \rfloor$. The controller of ingress node 112(*j*) sends (process 2930) the request over an upstream channel 116 from the preferred output port to a preferred primary switch 120 connecting to the preferred output port. A controller of the preferred primary switch determines (process 2940) availability of a path to egress node 114(*k*).

The controller of the preferred primary switch sends (process 2950) a message to the controller of ingress node 112(*j*) indicating availability, or otherwise, of a path through the preferred output port and preferred primary switch. The message may be sent through a primary switch 120 collocated with the preferred primary switch which connects directly to an egress node 114(*j*) coupled to ingress node 112(*j*) as described above with reference to FIG. 24.

If a path is available (process 2960), ingress node 112(*j*) may start to send (process 2970) payload data through the preferred output port of index π. If the path through the preferred output port and primary switch 120(P') is not available (process 2960), the controller of ingress node 112(*j*) may send (process 2980) the request to controllers of other primary switches. The controller of ingress node 112(*j*) may also instruct primary switch 120(P') to establish a path through any secondary switch 130 if the direct path from primary switch 120(P') to destination egress node 114(*k*) is not available.

The controller of an ingress node 112 may determine an order of preference of selecting the μ output ports for establishing a compound path to an egress node 114. Alternatively, the controller of the ingress node 112 may select the output ports sequentially to establish different connections in order to equalize the occupancies of the network links.

Figure 30:
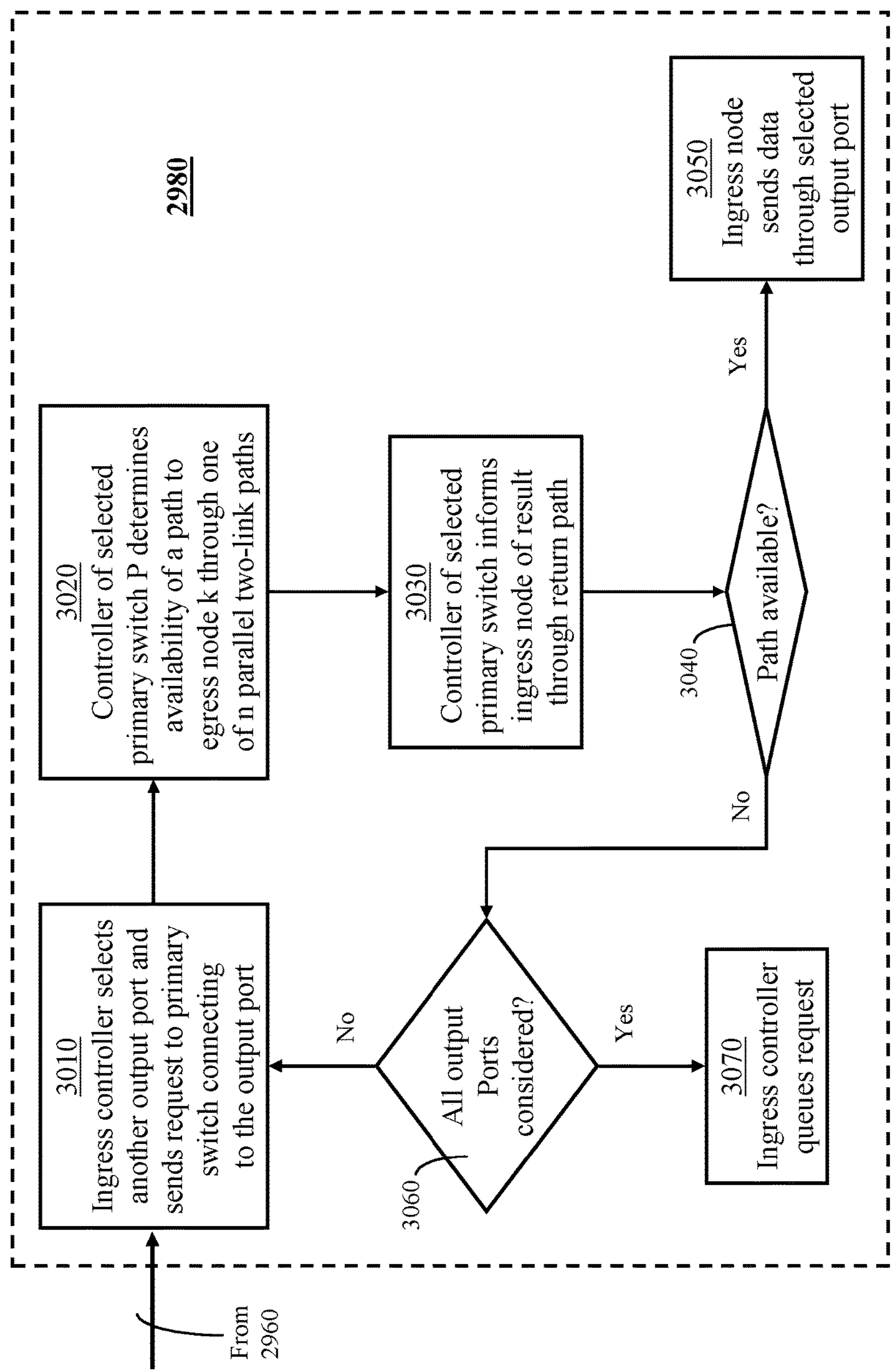
FIG. 30 details a process of establishing a path through a secondary switch.

FIG. 30 details process 2980 of establishing a path through a secondary switch 130. The controller of ingress node 112(*j*) selects (process 3010) an output port of ingress node 112(*j*), thus selecting a candidate primary switch 120. A controller of the candidate primary switch determines (process 3020) availability of a path to egress node 114(*k*) through one of n non-intersecting paths each traversing one of n secondary switches 130. A controller of candidate primary switch informs (process 3030) ingress node 112(*j*) of availability or otherwise of a path through the candidate primary switch 120.

If a path is available, (process 3040), ingress node 112(*j*) starts to send (process 3050) payload data through the candidate primary switch. If a path is not available, the controller of ingress node 112(*j*) determines (process 3060) whether all of μ output ports of ingress node 112(*j*) have been considered. If another output port is to be considered, process 3010 is revisited. Otherwise, the controller of ingress node 112(*j*) queues (process 3070) the connection request.

A three-stage Clos network having an array of m×m ingress nodes, an array of μ×μ middle switches, and an array of m×m egress nodes has a dimension of (μ×m)×(μ×m). A path from an ingress node to an egress node traverses a middle switch. The three-stage network may expand recursively where each middle-stage switch may be configured as a three-stage Clos network thus yielding a five-stage network. Configuring each middle-stage switch as a five-stage network yields a seven-stage network, and so on. A conventional five-stage Clos-type network comprises five cascaded arrays of switches where switches of the first array are ingress nodes receiving data from external data sources and switches of the fifth array are egress nodes sending data to external data sinks. Each path from an ingress node to an egress node traverses three intermediate switches.

Configurations Using Latent Space Switches

Figure 31:
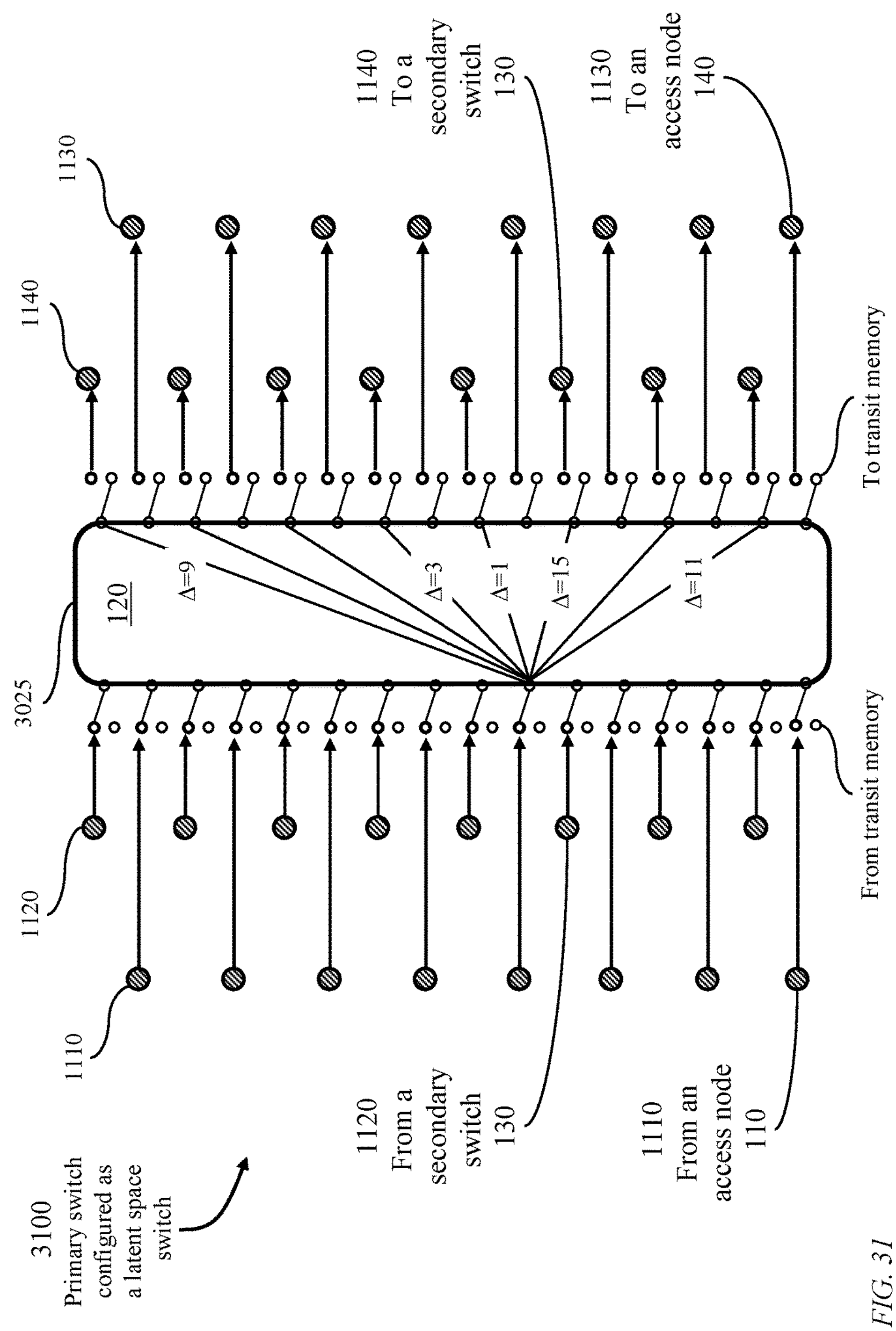
FIG. 31 illustrates a preferred connection pattern of a primary switch, implemented as a latent space switch, to ingress nodes, egress nodes, and secondary switches, in accordance with an embodiment of the present invention.

FIG. 31 illustrates a primary switch 120 implemented as a latent switch 3100 having (m+n) input ports and (m+n) output ports, with m=n=8. The m input ports 1110, referenced as primary input ports, connect to upstream channels from ingress nodes 112. The m output ports 1130, referenced as primary output ports, connect to m downstream channels to egress nodes 114. The n input ports 1120, referenced as secondary input ports, connect to internal channels 134 originating from a respective set of n secondary switches 130 and the n output ports 1140, referenced as secondary output ports, connect to inner channels 124 directed to a different set of secondary switches 130.

A primary path from an ingress node 112 to an egress node 114 traverses a primary switch. A path from any of the m primary input ports 1110 to any of the m primary output port 1130 constitutes a part of a primary path. A path from a primary input port 1110 to a secondary output port 1140 constitutes a part of a respective compound path and a path from a secondary input port 1120 to a secondary output port 1140 constitutes a part of a respective compound path.

Exemplary Switching Systems Based on the Orthogonal-Connectivity Concept

Figure 32:
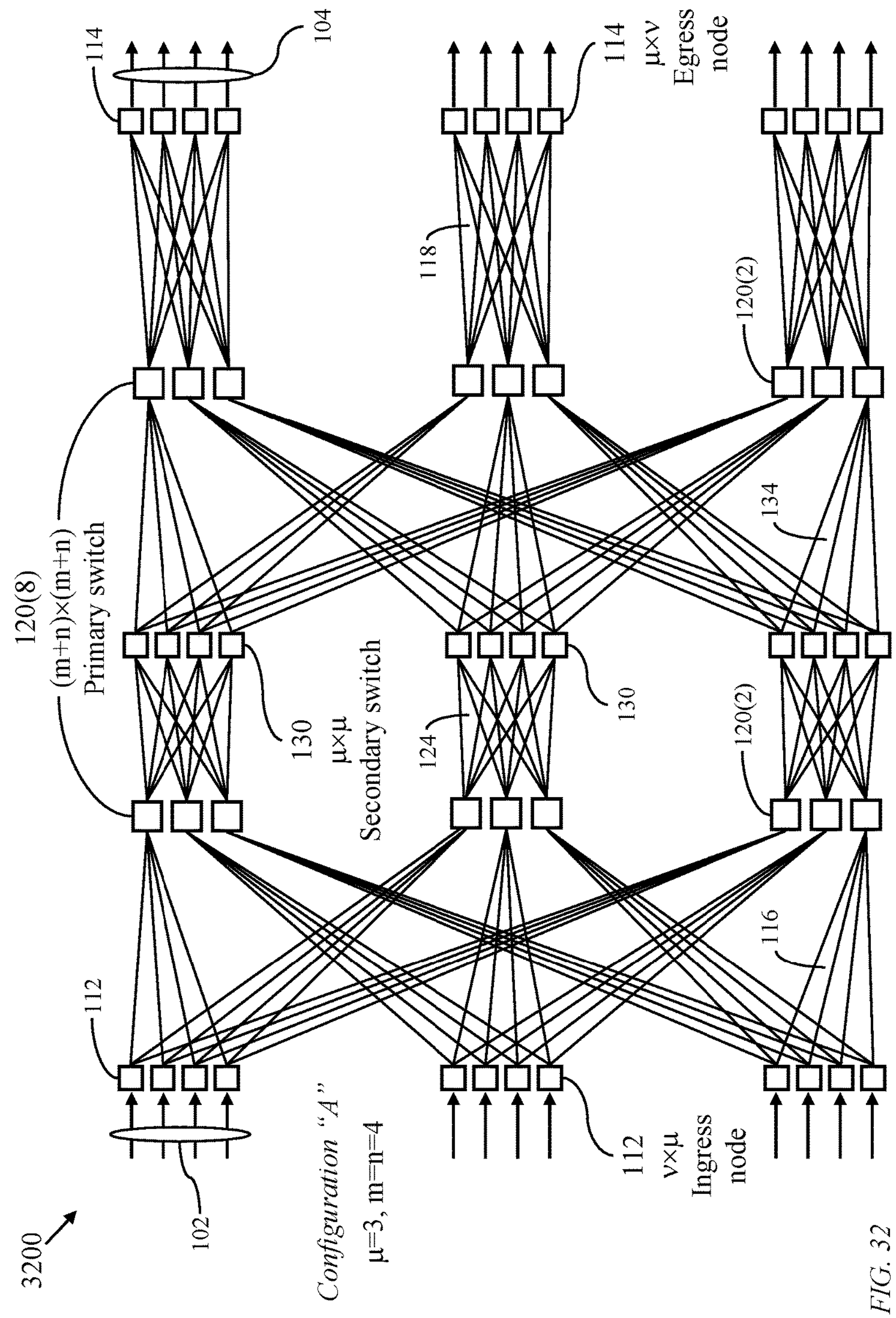
FIG. 32 illustrates a first network of a first configuration type having a set of ingress nodes, a set of egress nodes, a set of primary switches, and a set of secondary switches with an exemplary orthogonal inner-connectivity pattern, in accordance with an embodiment of the present invention.

FIG. 32 illustrates a network having a set of ingress nodes 112, a set of egress nodes 114, a set of primary switches 120, and a set of secondary switches 130. The network is configured according to the first connectivity scheme of FIG. 20. Each ingress node 112 is of dimension ν×μ, ν>1, μ>1, each egress node 114 is of dimension μ×ν, and each secondary switch is of dimension μ×μ. Each primary switch connects to m ingress nodes 112, m egress nodes 114, and n secondary switches, m>2, n>0. Thus, each primary switch is of dimension (m+n)×(m+n). The total number of ingress nodes 112 or egress nodes 114 is μ×m. The total number of primary switches 120 is $\mu^2$. The total number of secondary switches 110 is μ×n. With μ=3 and m=n=4, the total number of ingress nodes or egress nodes is 12, the total number of primary switches is 9, and the total number of secondary switches is 12.

Each ingress node 112 is coupled to a respective ingress controller which stores processor-executable instructions causing a respective processor to perform functions described below. An ingress controller is preferably shared by an ingress node 112 and a paired egress node 114. Each primary switch 120 is coupled to a respective primary controller which stores processor-executable instructions causing a respective processor to perform functions described below. Each secondary switch 130 is coupled to a respective secondary controller which stores processor-executable instructions causing a respective processor to perform functions described below.

Each ingress node 112 connects to μ upstream channels to a respective first set of μ primary switches 120, and each egress node connects to μ downstream channels from a respective second set of μ primary switches. A set of primary switches 120 to which any ingress node 112 connects and a set of primary switches 120 to which any egress node connects are orthogonal, having one primary switch 120 in common.

Each secondary switch 130 connects at input to a respective third set of μ primary switches and connects at output to a respective fourth set of μ primary switches which is orthogonal to the respective third set.

With such an orthogonal inner-connectivity pattern, each pair of an ingress node and an egress node has:

(1) a primary path traversing a respective primary switch; and (2) μ×n compound paths, each compound path traversing a respective first primary switch, a respective secondary switch, and a respective second primary switch. The (μ×n) compound paths include μ non-intersecting compound paths.

FIG. 33 illustrates a pattern of orthogonal connectivity of ingress nodes and egress nodes to primary switches in the network of FIG. 32. FIG. 34 illustrates a pattern of orthogonal connectivity of secondary switches to primary switches in the network of FIG. 32.

The set of ingress nodes contains μ×m ingress nodes, the set of egress nodes contains μ×m egress nodes, the set of secondary switches contains μ×n secondary switches, and the set of primary switches contains $\mu^2$ primary switches. The ingress nodes 112 are indexed as 0 to (μ×m−1), the egress nodes 114 are indexed as 0 to (μ×m−1), the secondary switches 130 are indexed as 0 to (μ×n−1), and the primary switches are indexed as 0 to ($\mu^2$−1).

The connectivity pattern of the network of FIG. 32 is hereinafter referenced as a first connectivity pattern and is parameterized as described below.

An ingress node of index j, 0≤j<(μ×m), connects to μ upstream channels 116 to μ primary switches 120 of indices determined as:

$$\{P\}_\mu=\{\lfloor j/m\rfloor\times(\mu+1)+\alpha\times\mu\}|_{\text{modulo }\mu^2},\ 0\le\alpha<\mu.$$

The integer α is an index of an output port of a respective ingress node.

A primary switch of index p, 0≤p<$\mu^2$, connects to m downstream channels 118 to m egress nodes of indices determined as:

$$\{k\}_m=\{\lfloor p/\mu\rfloor\times m+\lambda\},\ 0\le\lambda<m.$$

A primary switch of index p, 0≤p<$\mu^2$, connects to n inner channels 124 directed to n secondary switch of indices determined as:

$$\{S\}_n=\{\lfloor p/\mu\rfloor\times n+\lambda\},\ 0\le\lambda<n.$$

A secondary switch of index s, 0≤s<(μ×n), connects to μ internal channel 134 to μ primary switches of indices:

$$\{P'\}_\mu=\{\lfloor s/n\rfloor\times(\mu+1)+\alpha\times\mu\}|_{\text{modulo }\mu^2},\ 0\le\alpha<\mu.$$

FIG. 35 illustrates connectivity of ingress nodes and egress nodes to primary switches in the network of FIG. 32. As indicated in FIG. 35, a primary switch 120 of index 0 connects ingress nodes 112 of indices 0 to (m−1) to egress nodes 114 of indices 0 to (m−1); m=4. A primary switch 120 of index 1 connects ingress nodes 112 of indices m to (2×m−1) to egress nodes 114 of indices 0 to (m−1), . . . , and a primary switch 120 of index 5 connects ingress nodes 112 of indices 2×m to (3×m−1) to egress nodes 114 of indices m to (2×m−1).

Figure 36:
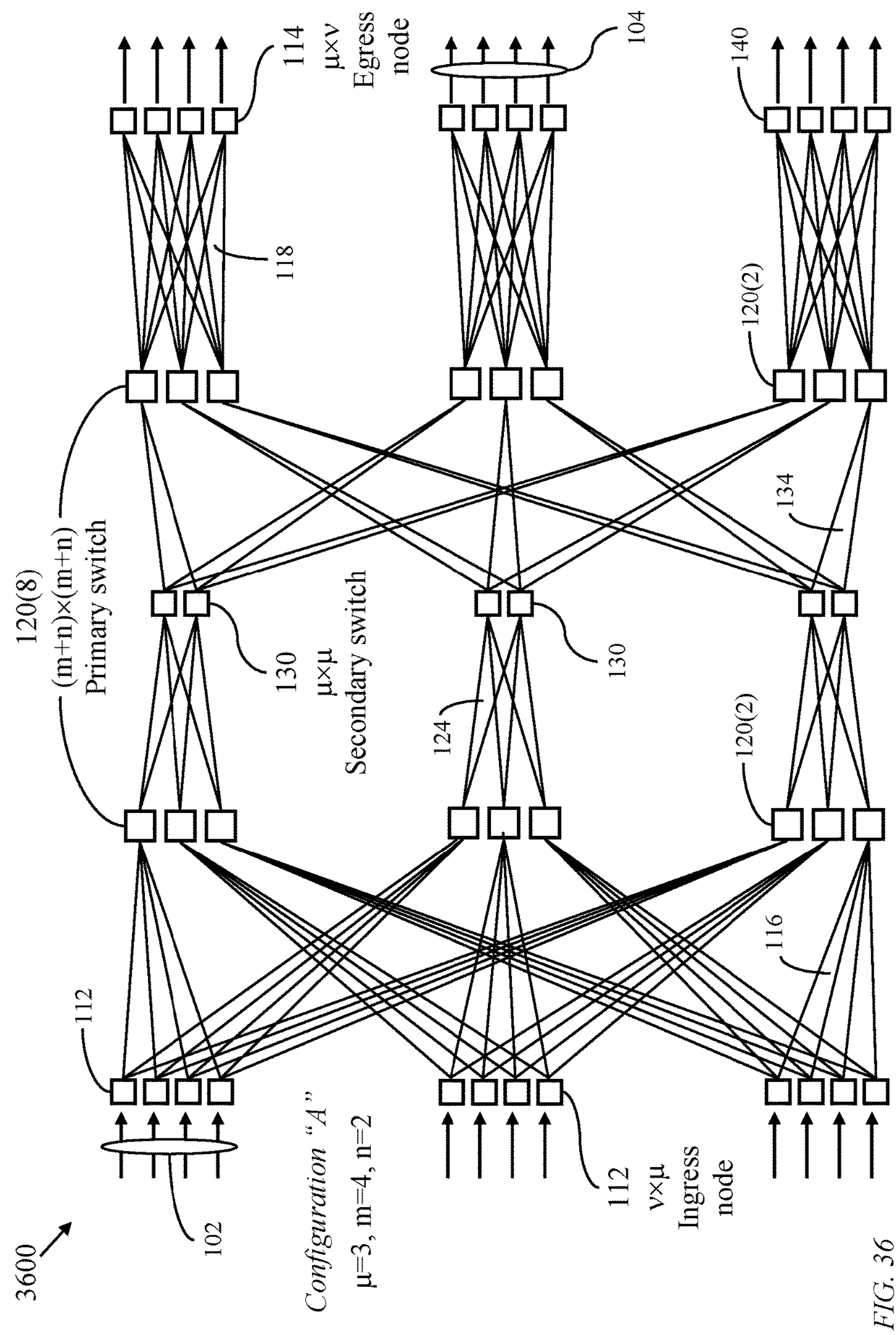
FIG. 36 illustrates a network similar to the network of FIG. 32 with a reduced number of secondary switches, in accordance with an embodiment of the present invention.

FIG. 36 illustrates a network 3600 similar to the network of FIG. 32 with n<m (n=2 and m=4). With $\mu$=3 and m=4, and n=2, the total number of ingress nodes or egress nodes is 12, the total number of primary switches is 9, and the total number of secondary switches is 6.

Figure 37:
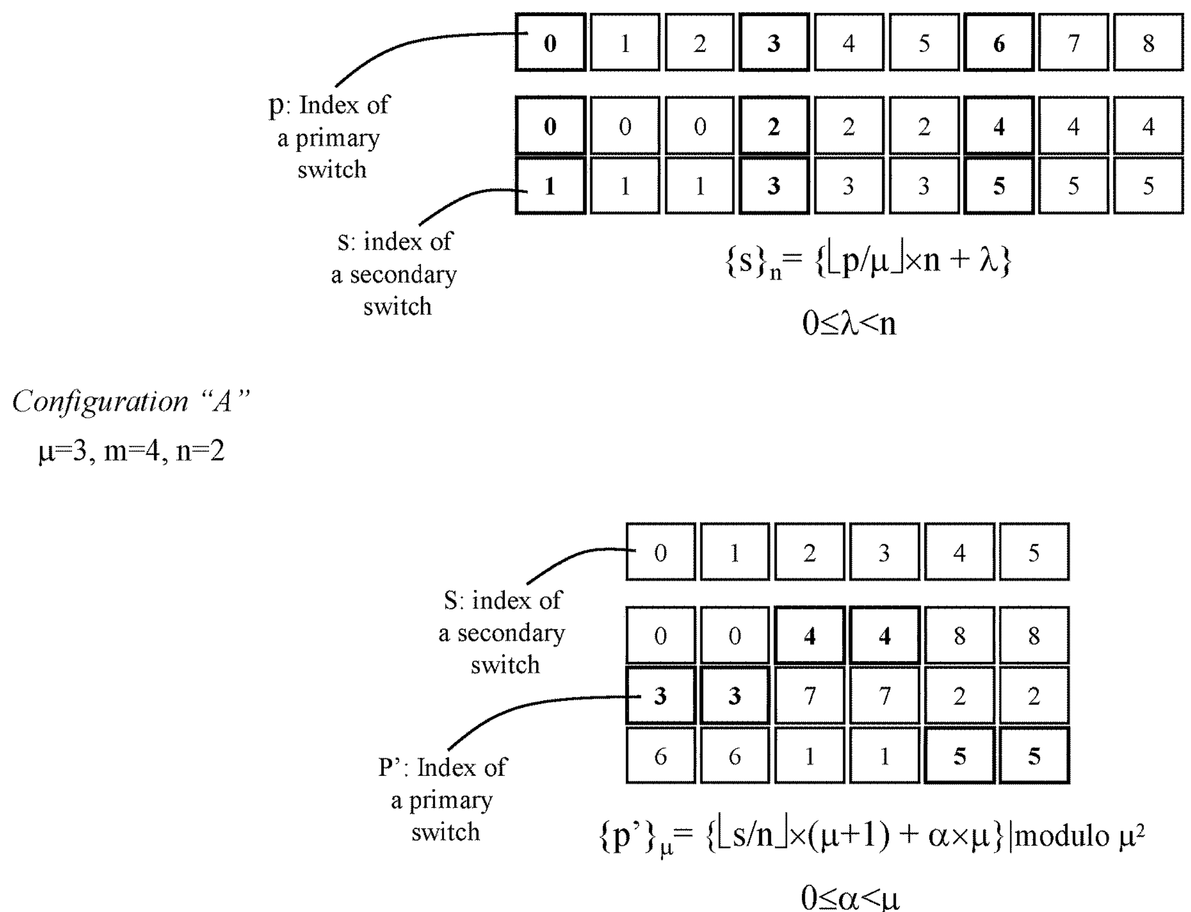
FIG. 37 illustrates orthogonal connectivity of secondary switches to primary switches in the network of FIG. 36, in accordance with an embodiment of the present invention.

FIG. 37 illustrates orthogonal connectivity of secondary switches to primary switches in the network of FIG. 36. The connectivity of ingress nodes to primary switches and the connectivity of primary switches to egress nodes are the same as in the configuration of FIG. 32. The connectivity pattern of primary switches to secondary switches differs from that of FIG. 34 because n≠m.

Figure 38:
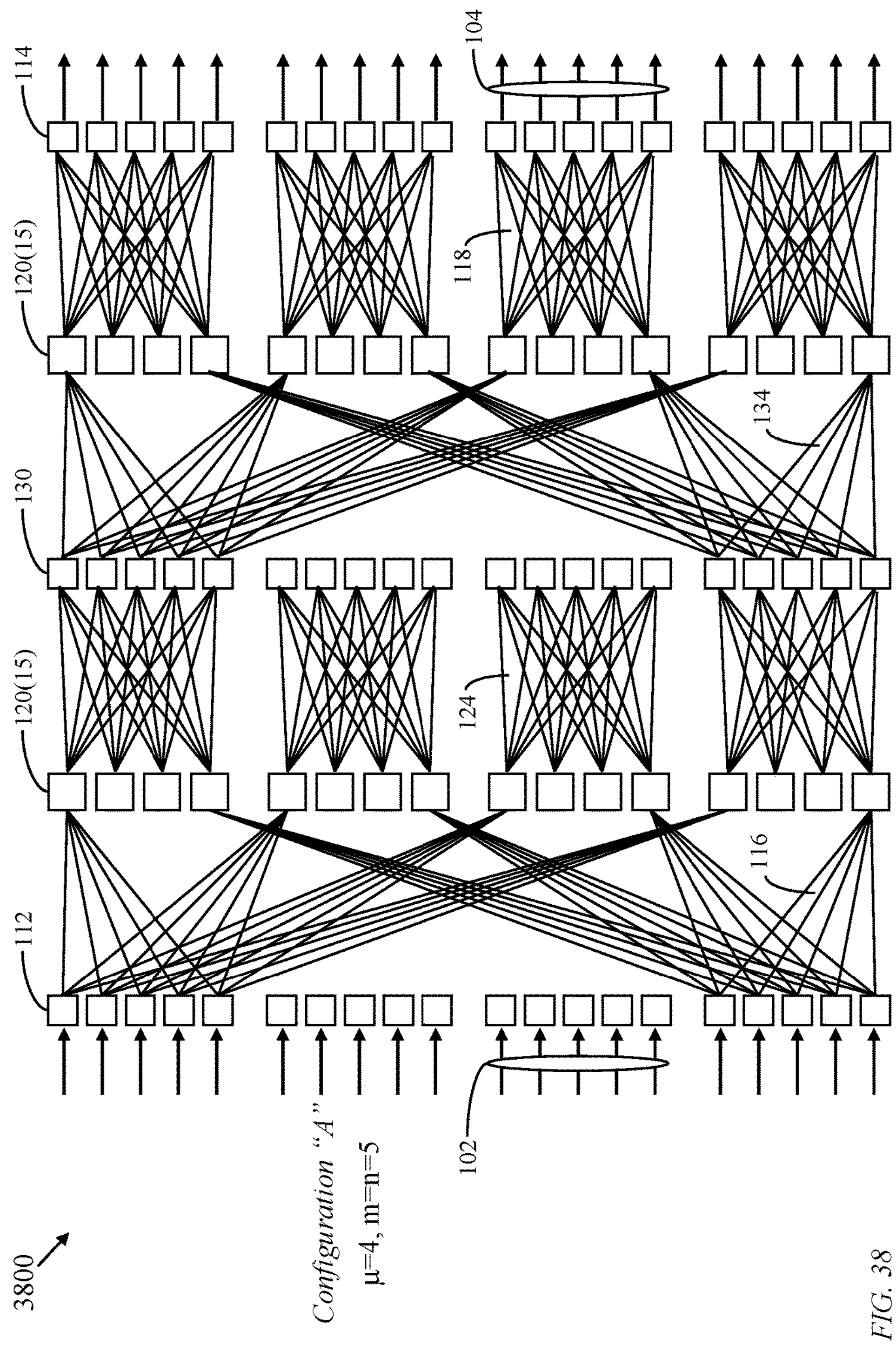
FIG. 38 illustrates a second network of the first configuration type having a set of ingress nodes, a set of egress nodes, a set of primary switches, and a set of secondary switches with an orthogonal inner-connectivity pattern, in accordance with an embodiment of the present invention.
Figure 39:
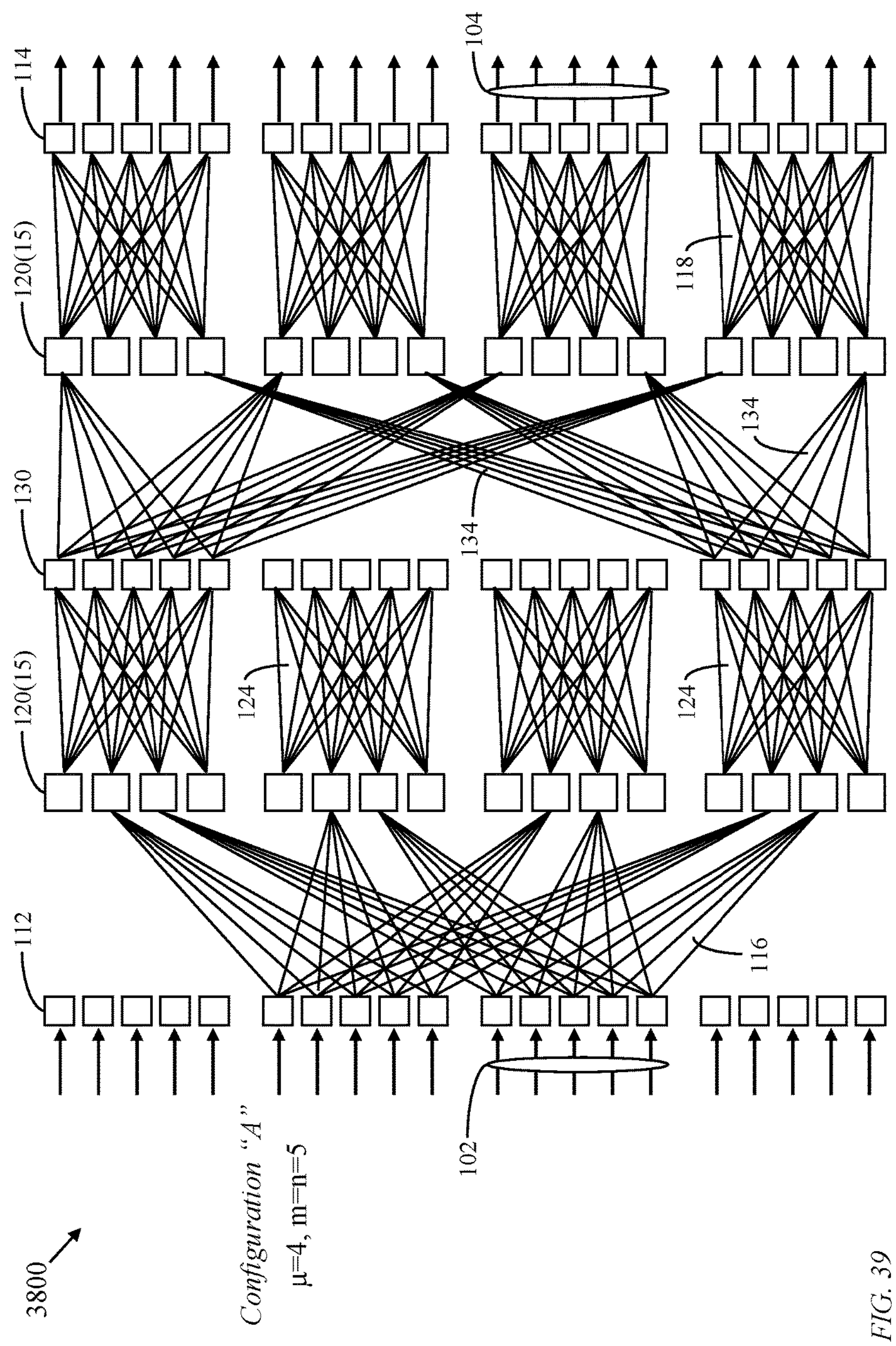
FIG. 39 illustrates further details of the second network of FIG. 38.

FIG. 38 and FIG. 39 illustrate a second network 3800 of the first configuration type (configured according to the first connectivity scheme of FIG. 20) having a set of ingress nodes, a set of egress nodes, a set of primary switches, and a set of secondary switches with an orthogonal inner-connectivity pattern where $\mu$=4 and m=n=5. Each ingress node 112 has $\mu$ upstream channels, one to each of $\mu$ primary switches 120. Each primary switch 120 has m downstream channels 118, one to each of m egress nodes 114, and m inner channels 124, one to each of m secondary switches 130. Each secondary switch 130 has $\mu$ internal channels 134, one to each of $\mu$ primary switches 120. The total number of ingress nodes 112 or egress nodes 114 is $\mu$×m=20, and the total number of ingress channels 102 or egress channels 104 is $\nu$×$\mu$×m. With $\nu$=60, $\mu$=64, and m=32, for example, the network supports 2048 access nodes with 122880 ingress channels 102 and 122880 egress channels, an access node being a combined ingress node 112 and an associated egress node 114. With ingress channels of a capacity of 10 Gigabits-per-second (Gb/s) each, the capacity of the network exceeds 1200 Terabits-per-second (Tb/s). The ingress nodes, egress nodes, primary switches, and secondary switches may be collocated (forming a data center, for example) or spread of a wide area (forming a distributed network of 2048 access nodes).

Table-3 depicts inner orthogonal connectivity of the network of FIG. 38 and FIG. 39. The table identifies:

- primary switches 120 to which each ingress node 112 connects;
- primary switches 120 connecting to each egress node 114;
- primary switches 120 connecting to output ports of a secondary switch 130 of index s; and
- primary switches 120 connecting to input ports of a secondary switch 130 of index s; $0 \le s < (\mu \times n)$.

TABLE 3

Orthogonal connectivity, configuration of FIG. 38 and FIG. 39 ($\mu$ = 4, m = n = 5)

| Index "j" of ingress or egress node | Indices of first set of primary switches connecting to ingress node | | | | Indices of second set of primary switches connecting to egress node | | | | Index s | Indices of third set of primary switches receiving from secondary switch of index s, $0 \le s < \mu \times n$ | | | | Indices of fourth set of primary switches transmitting to secondary switch of index s, $0 \le s < \mu \times n$ | | | |
|---|---|---|---|---|---|---|---|---|---|---|---|---|---|---|---|---|---|
| 0 | 0 | 4 | 8 | 12 | 0 | 1 | 2 | 3 | 0 | 0 | 4 | 8 | 12 | 0 | 1 | 2 | 3 |
| 1 | | | | | | | | | 1 | | | | | | | | |
| 2 | | | | | | | | | 2 | | | | | | | | |
| 3 | | | | | | | | | 3 | | | | | | | | |
| 4 | | | | | | | | | 4 | | | | | | | | |
| 5 | 1 | 5 | 9 | 13 | 4 | 5 | 6 | 7 | 5 | 1 | 5 | 9 | 13 | 4 | 5 | 6 | 7 |
| 6 | | | | | | | | | 6 | | | | | | | | |
| 7 | | | | | | | | | 7 | | | | | | | | |
| 8 | | | | | | | | | 8 | | | | | | | | |
| 9 | | | | | | | | | 9 | | | | | | | | |
| 10 | 2 | 6 | 10 | 14 | 8 | 9 | 10 | 11 | 10 | 2 | 6 | 10 | 14 | 8 | 9 | 10 | 11 |
| 11 | | | | | | | | | 11 | | | | | | | | |
| 12 | | | | | | | | | 12 | | | | | | | | |
| 13 | | | | | | | | | 13 | | | | | | | | |
| 14 | | | | | | | | | 14 | | | | | | | | |
| 15 | 3 | 7 | 11 | 15 | 12 | 13 | 14 | 15 | 15 | 3 | 7 | 11 | 15 | 12 | 13 | 14 | 15 |
| 16 | | | | | | | | | 16 | | | | | | | | |
| 17 | | | | | | | | | 17 | | | | | | | | |
| 18 | | | | | | | | | 18 | | | | | | | | |
| 19 | | | | | | | | | 19 | | | | | | | | |

As indicated, a set of primary switches to which an ingress node connects is orthogonal to a set of primary switches connecting to any egress node. For example, an ingress node 112 of index 7 has upstream channels to primary switches 120 of indices 1, 5, 9, and 13. The set of primary switches {1, 5, 9, 13} intersects the set of primary switches of indices {0, 1, 2, 3} which connects to egress node 114 of index 0 in only one primary switch, which is the primary switch of index 1. The set of primary switches of indices {1, 5, 9, 13} intersects each of the sets of primary switches of indices {4, 5, 6, 7}, (8, 9, 10, 11}, and {12, 13, 14, 15} in one prime switch.

Likewise, a set of primary switches connecting to input ports of any secondary switch is orthogonal to a set of primary switches connecting to output ports of any secondary switch. For example, the secondary switch of index 11 has channels from the set of primary switches of indices {8, 9, 10, 11) which is orthogonal to a set of primary switches connecting to output ports of any secondary switches; the set of primary switches of indices {8, 9, 10, 11) is orthogonal to each of the sets of primary switches of indices {0, 4, 8, 12}, 11, 5, 9, 131, {2, 6, 10, 14}, and {3, 7, 11, 15}.

The first set of primary switches connecting to any of the 20 ingress nodes is orthogonal to each second set of primary switches and to each fourth set of primary switches. Likewise, the third set of primary switches connecting to channels from any of the 20 secondary switches is orthogonal to each second set of primary switches and to each fourth set of primary switches.

FIG. 40 illustrates orthogonal connectivity of ingress nodes and egress nodes to primary switches in the network of FIG. 38 and FIG. 39 based on the first connectivity pattern described above.

FIG. 41 illustrates orthogonal connectivity of secondary switches to primary switches in the network of FIG. 38 and FIG. 39.

Figure 42:
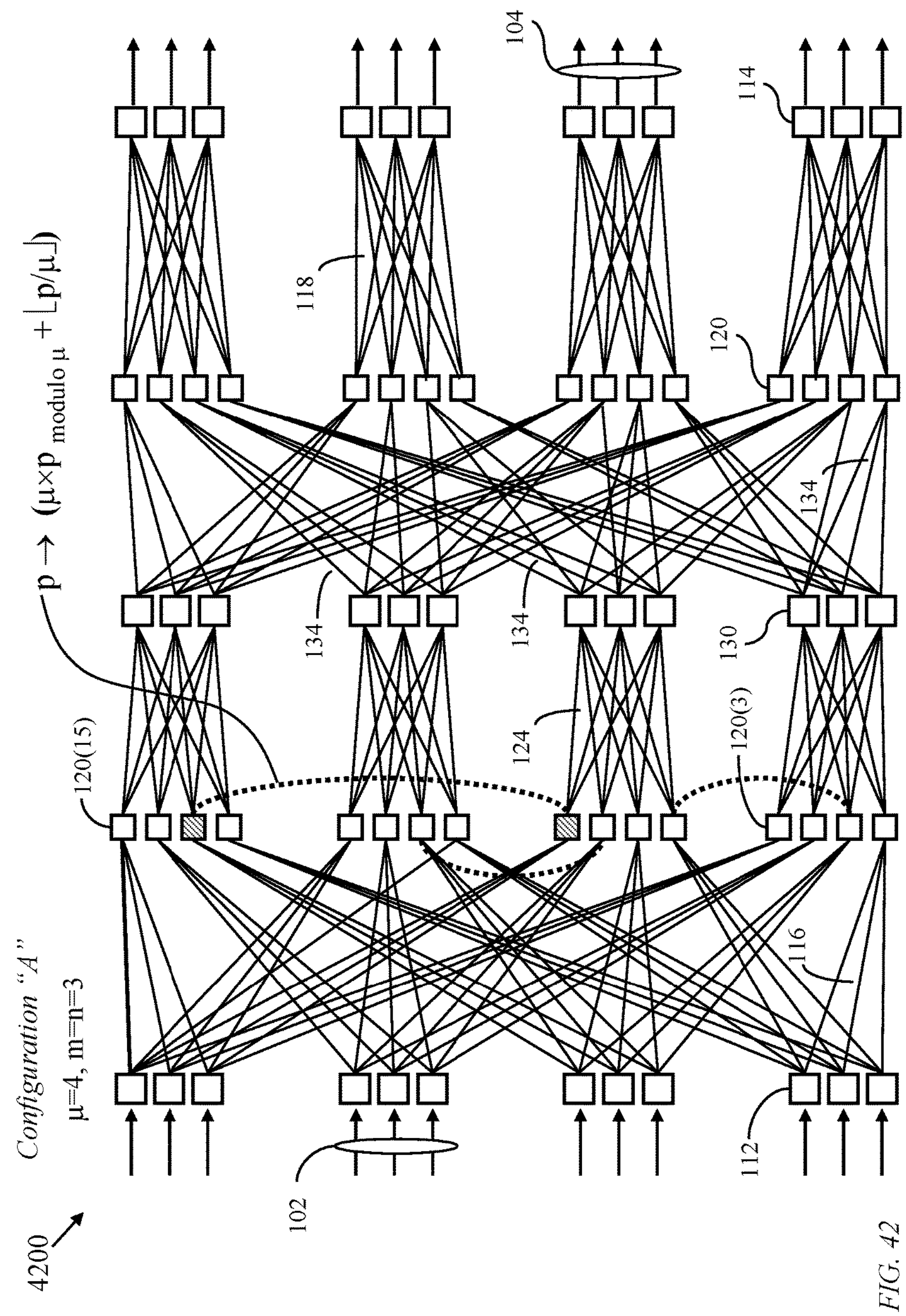
FIG. 42 illustrates a third network of the first configuration type having a set of ingress nodes, a set of egress nodes, a set of primary switches, and a set of secondary switches with an orthogonal inner-connectivity pattern, in accordance with an embodiment of the present invention.
Figure 50:
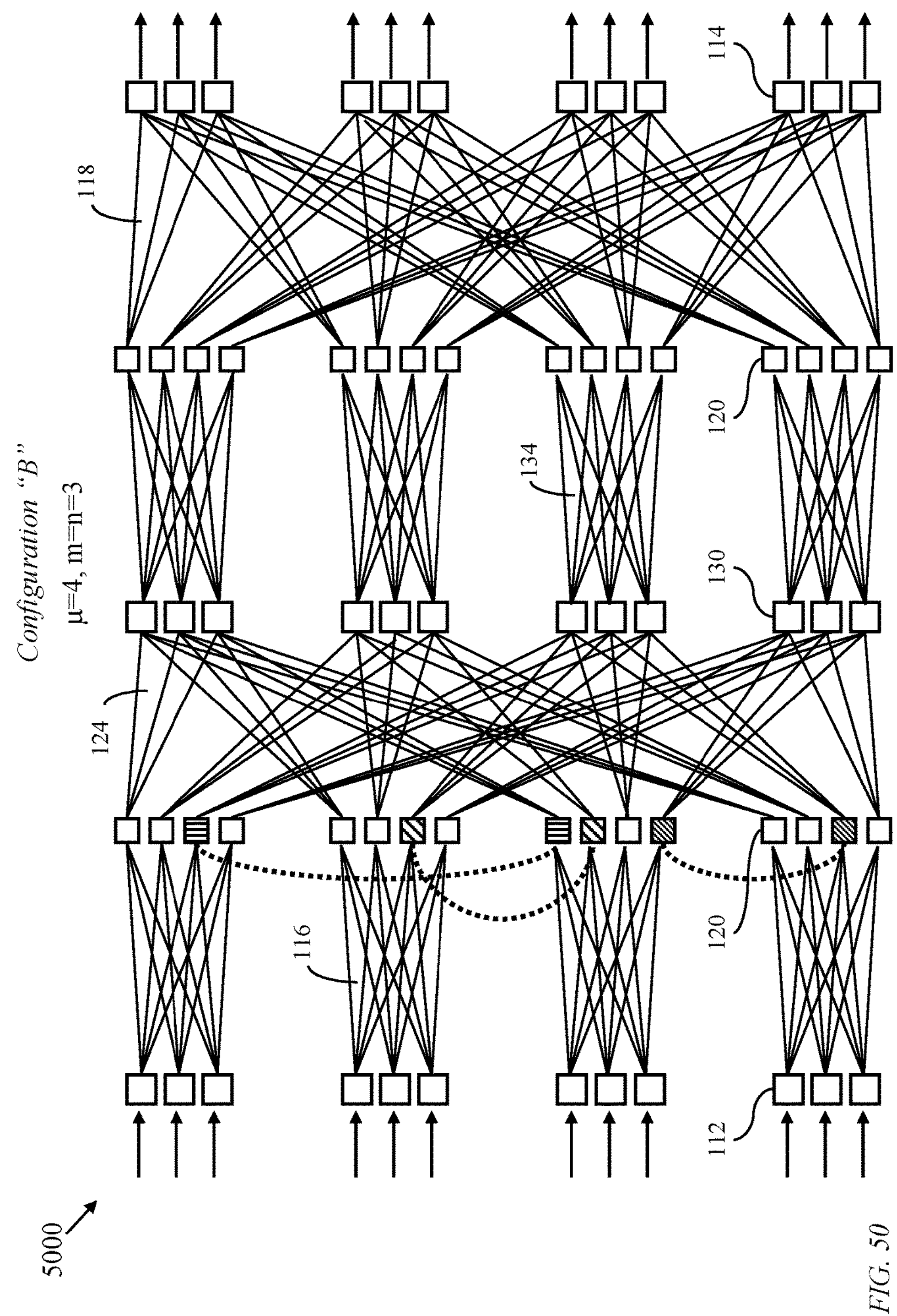
FIG. 50 illustrates a fifth network 5000 of the second configuration type having a set of ingress nodes, a set of egress nodes, a set of primary switches, and a set of secondary switches with an alternative orthogonal inner-connectivity pattern, in accordance with an embodiment of the present invention.

FIG. 42 illustrates a third network of the first configuration type (configured according to the first connectivity scheme of FIG. 20) having a set of ingress nodes, a set of egress nodes, a set of primary switches, and a set of secondary switches with an orthogonal inner-connectivity pattern where $\mu=4$ and m=3. Selected primary switches 120 may be collocated to facilitate exchange of control data as described with reference to FIG. 26, FIG. 27, and FIG. 28. Collocated primary switches are indicated in FIG. 42 and FIG. 50.

FIG. 43 illustrates orthogonal connectivity of ingress nodes and egress nodes to primary switches in the network of FIG. 42 based on the first connectivity pattern described above.

FIG. 44 illustrates orthogonal connectivity of secondary switches to primary switches in the network of FIG. 42 based on the first connectivity pattern described above.

Figure 45:
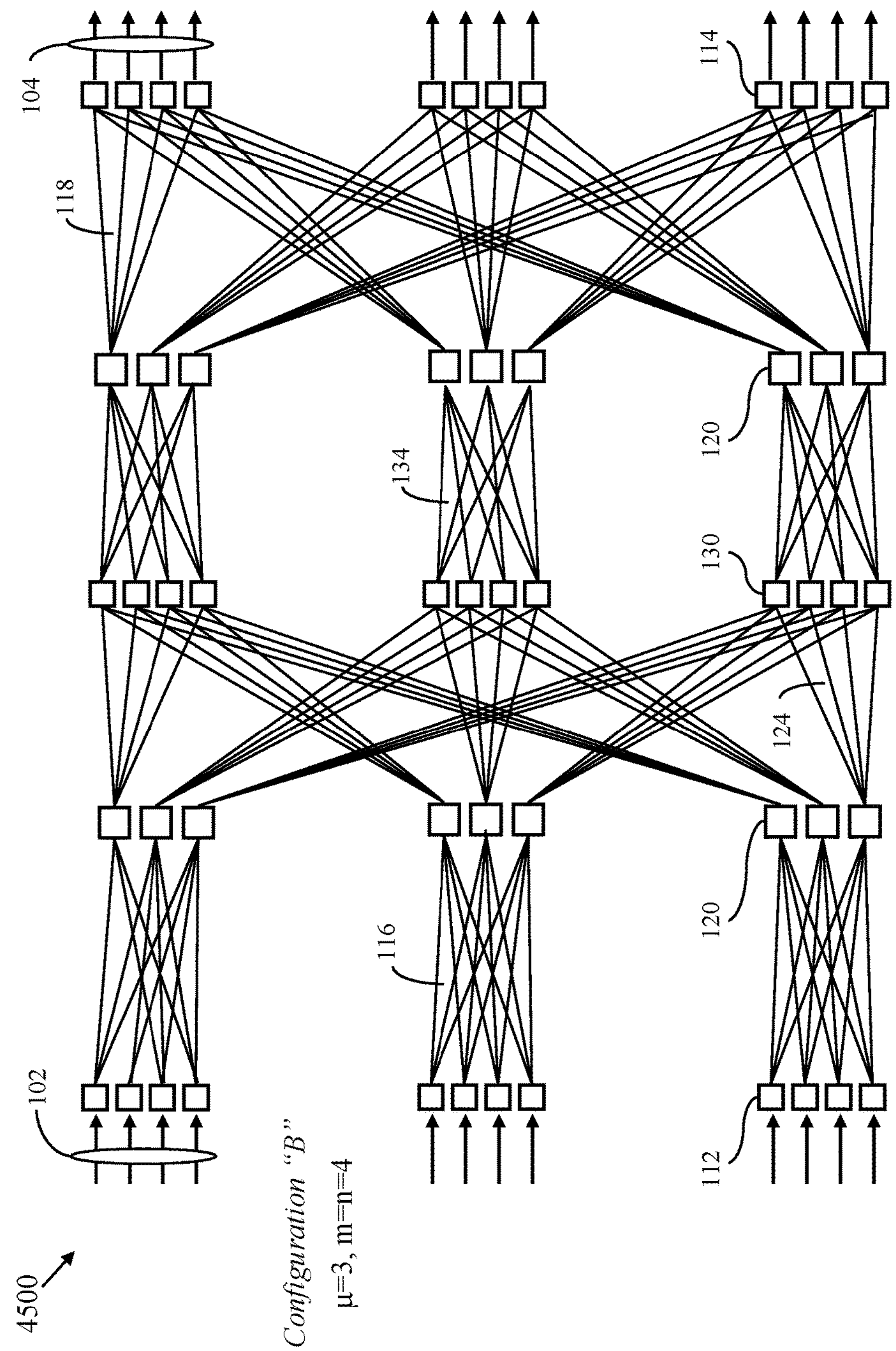
FIG. 45 illustrates a fourth network of a second configuration type having a set of ingress nodes, a set of egress nodes, a set of primary switches, and a set of secondary switches with an alternative orthogonal inner-connectivity pattern, in accordance with an embodiment of the present invention.

FIG. 45 illustrates a fourth network of a second configuration type (configured according to the second connectivity scheme of FIG. 21) having a set of ingress nodes, a set of egress nodes, a set of primary switches, and a set of secondary switches with an alternative orthogonal inner-connectivity pattern, with $\mu=3$ and m=n=4.

Figure 46:
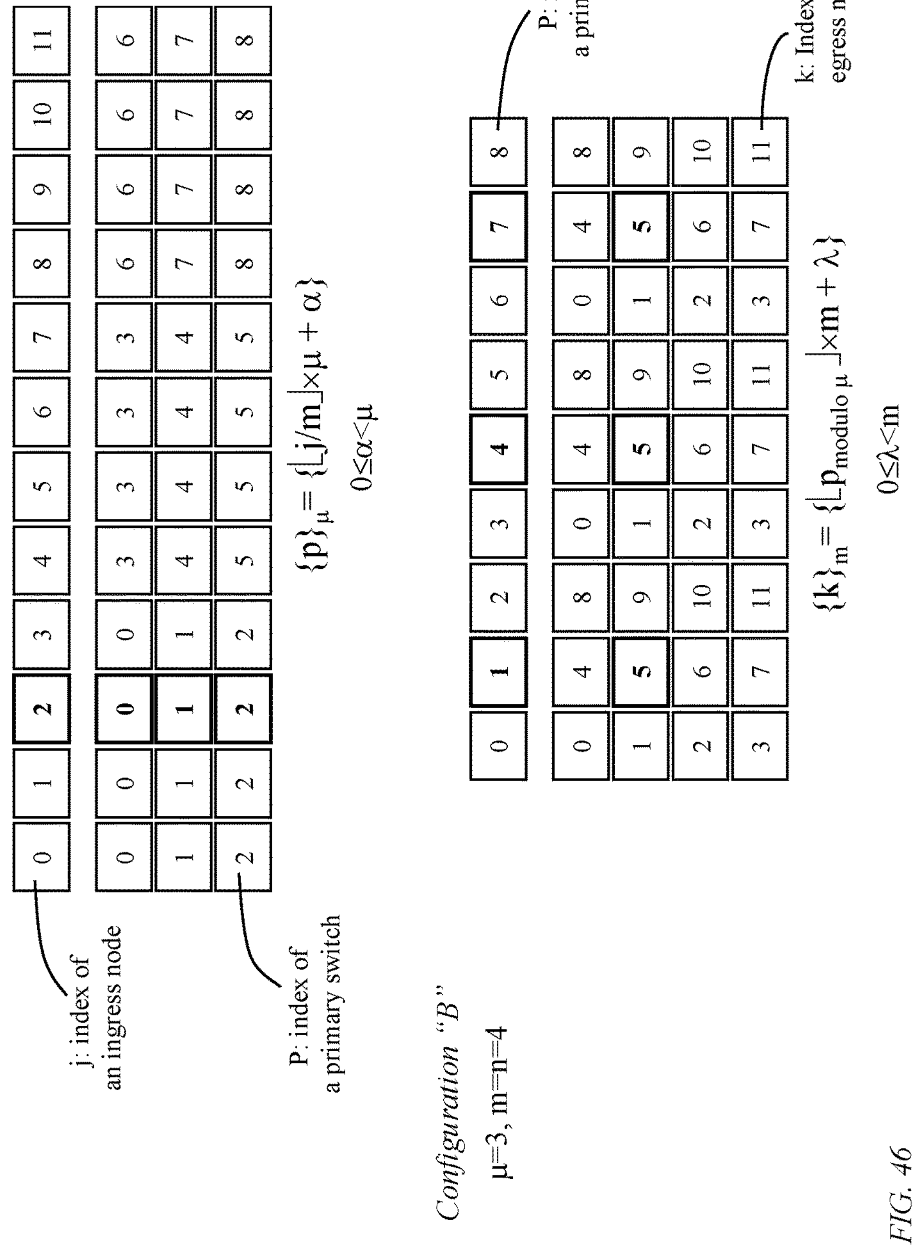
FIG. 46 illustrates orthogonal connectivity of ingress nodes and egress nodes to primary switches in the network of FIG. 45, in accordance with an embodiment of the present invention.

FIG. 46 illustrates a pattern of orthogonal connectivity of ingress nodes and egress nodes to primary switches in the network of FIG. 45.

Figure 47:
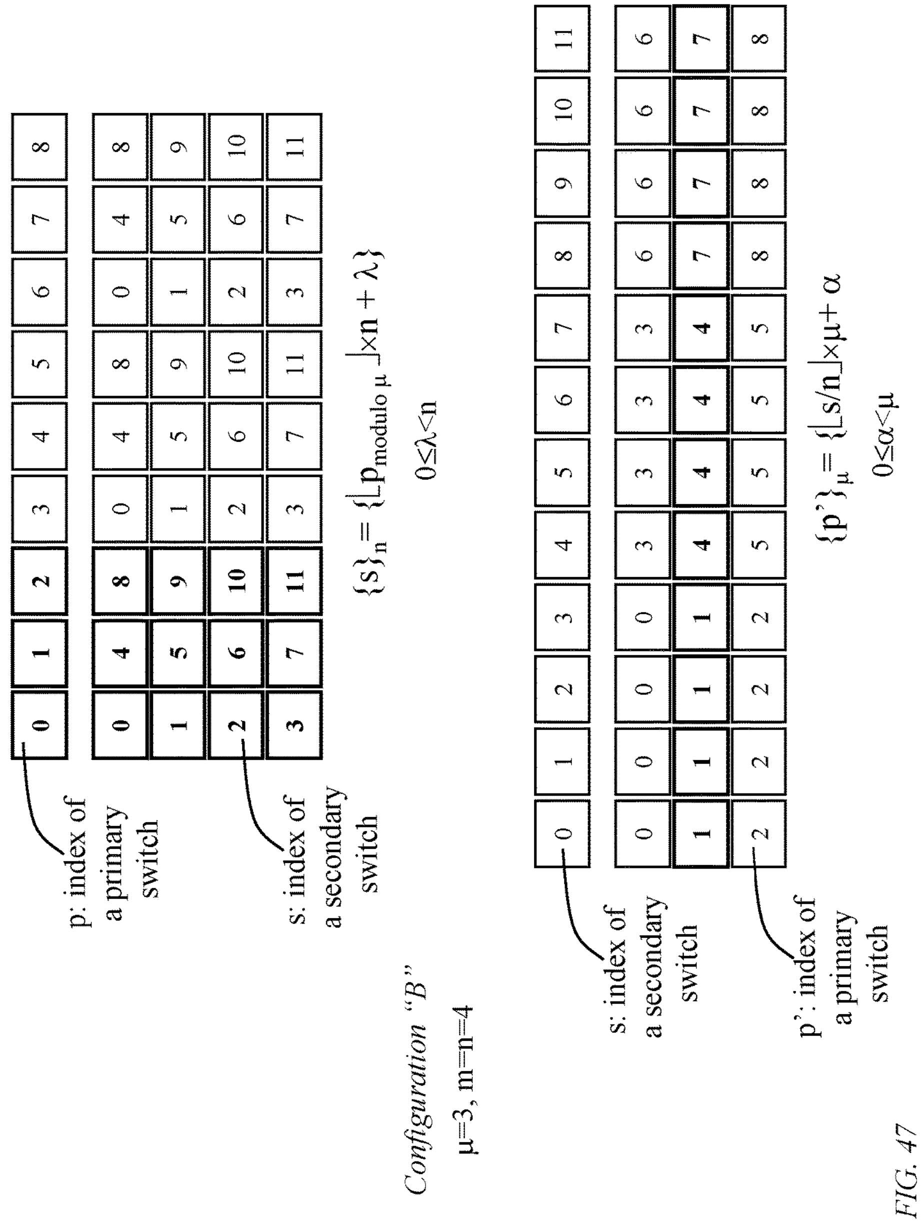
FIG. 47 illustrates orthogonal connectivity of secondary switches to primary switches in the network of FIG. 45, in accordance with an embodiment of the present invention.

FIG. 47 illustrates a pattern of orthogonal connectivity of secondary switches to primary switches in the network of FIG. 45.

The connectivity pattern of the network of FIG. 45 is parameterized as described below.

Each ingress node 112 connects to $\mu$ primary switches. An ingress node of index j, $0\leq j<(\mu\times m)$, connects to $\mu$ upstream channels 116 to $\mu$ primary switches of indices determined as:

$$\{P\}_\mu=\{\lfloor j/m\rfloor\times\mu+\alpha\},\ 0\leq\alpha<\mu.$$

The integer $\alpha$ is an index of an output port of a respective ingress node 112.

Each primary switch 120 connects to m egress nodes 114 through downstream channels 118. A primary switch of index p, $0\leq p<\mu^2$, connects to m downstream channels 118 to m egress nodes of indices determined as:

$$\{k\}_m=\{m\times p_{modulo\ \mu}+\lambda\},\ 0\leq\lambda<m.$$

Each primary switch 120 connects to n secondary switches 130 through inner channels 124. A primary switch of index p, $0\leq p<\mu^2$, connects to n inner channels 124 directed to n secondary switches of indices s determined as:

$$\{s\}_n=\{n\times p_{modulo\ \mu}+\lambda\},\ 0\leq\lambda<n.$$

Each secondary switch 130 connects to $\mu$ primary switches through internal channels 134. A secondary switch of index s, $0\leq s<(\mu\times n)$ connects to $\mu$ internal channels 134 to $\mu$ primary switches of indices:

$$\{p'\}_\mu=\{\lfloor s/n\rfloor\times\mu+\alpha\},\ 0\leq\alpha<\mu.$$

Figure 48:
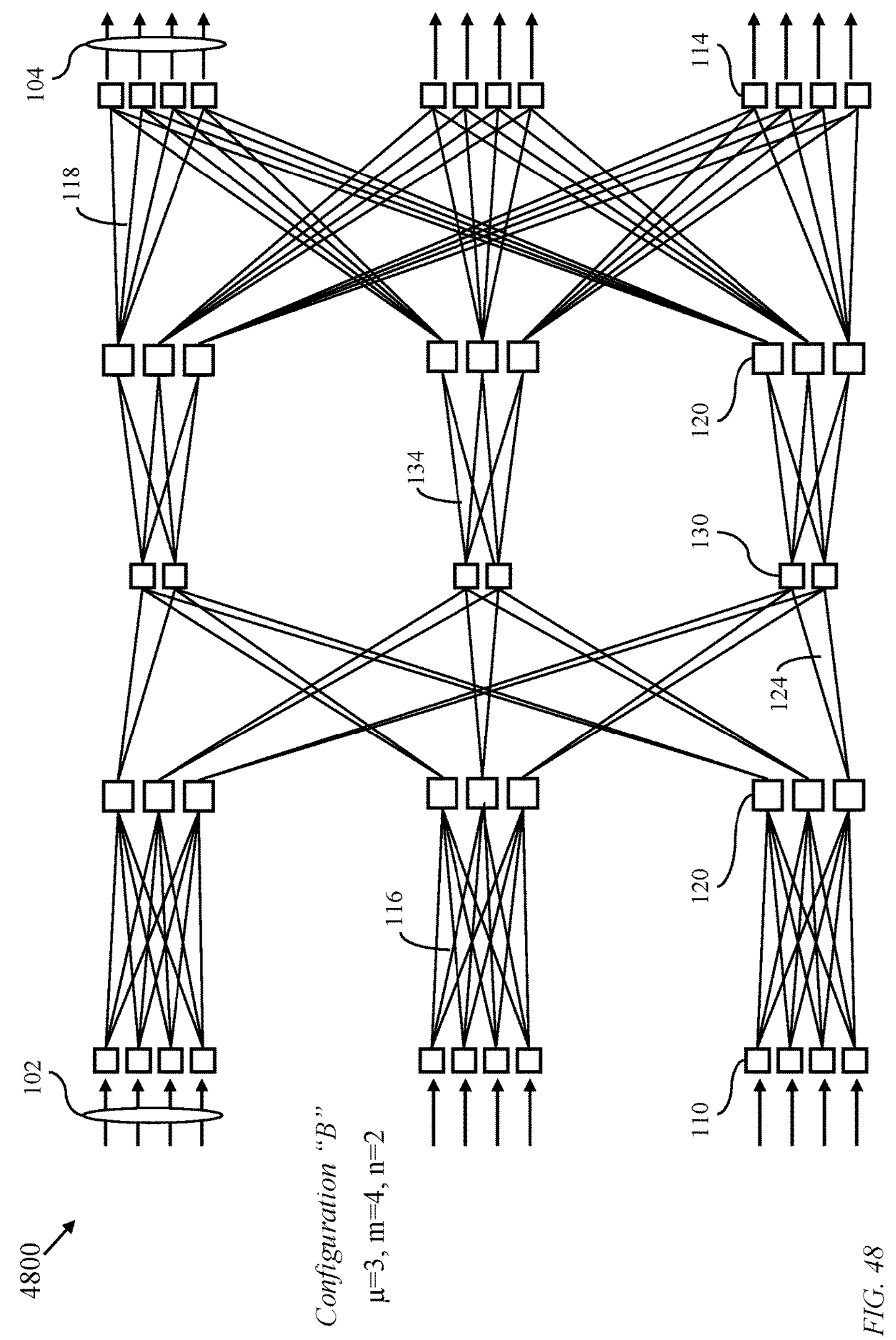
FIG. 48 illustrates a network similar to the network of FIG. 45 with a reduced number of secondary switches, in accordance with an embodiment of the present invention.

FIG. 48 illustrates a network similar to the network of FIG. 45 with a reduced number of secondary switches where m=4 and n=2.

Figure 49:
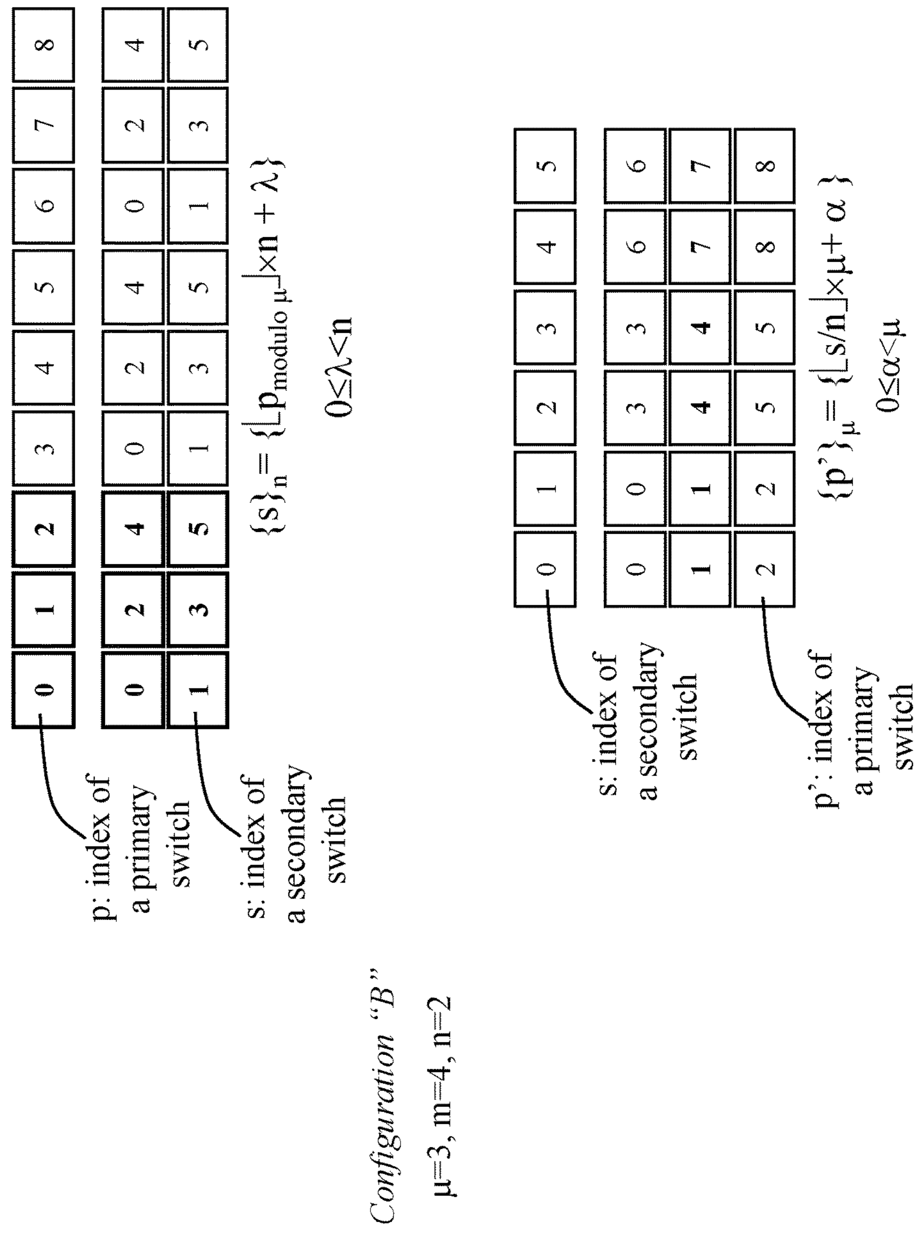
FIG. 49 illustrates orthogonal connectivity of secondary switches to primary switches in the network of FIG. 48, in accordance with an embodiment of the present invention.

FIG. 49 illustrates orthogonal connectivity of secondary switches to primary switches in the network of FIG. 48.

FIG. 50 illustrates a fifth network of the second configuration type (configured according to the second connectivity scheme of FIG. 20) having a set of ingress nodes, a set of egress nodes, a set of primary switches, and a set of secondary switches with an alternative orthogonal inner-connectivity pattern where $\mu=4$ and m=n=3

FIG. 51 illustrates orthogonal connectivity of ingress nodes and egress nodes to primary switches in the network of FIG. 50 determined according to the parameterized second connectivity pattern above, FIG. 52 illustrates orthogonal connectivity of secondary switches to primary switches in the network of FIG. 50 determined according to the parameterized second connectivity pattern described above.

The ingress nodes 112 and egress nodes 114 constitute access nodes connecting to external data sources and sinks. The access nodes may be distributed over a wide area. Likewise, the primary switches 120 and the secondary switches 130 may be geographically distributed. In each of the network configurations of FIG. 32, FIG. 36, FIG. 38, FIG. 39, FIG. 42, FIG. 45, FIG. 48, and FIG. 50 a set of n secondary switches of indices $\{\lambda\times n$ to $(\lambda\times n+n-1)\}$ may be collocated with a set of $\mu$ primary switches of indices $\{\lambda\times\mu$ to $(\lambda\times\mu+\mu-1)\}$, $0\leq\lambda<\mu$.

The output ports of an ingress node 112 are indexed as $\alpha=0, 1, \ldots, (\mu-1)$ as described above. For either connectivity scheme, a primary path from any ingress node 112 to an egress node 114 of index k, $0\leq k<(\mu\times m)$ originates from an output port of index $\pi=\lfloor k/m\rfloor$ of a respective ingress node.

Figure 53:
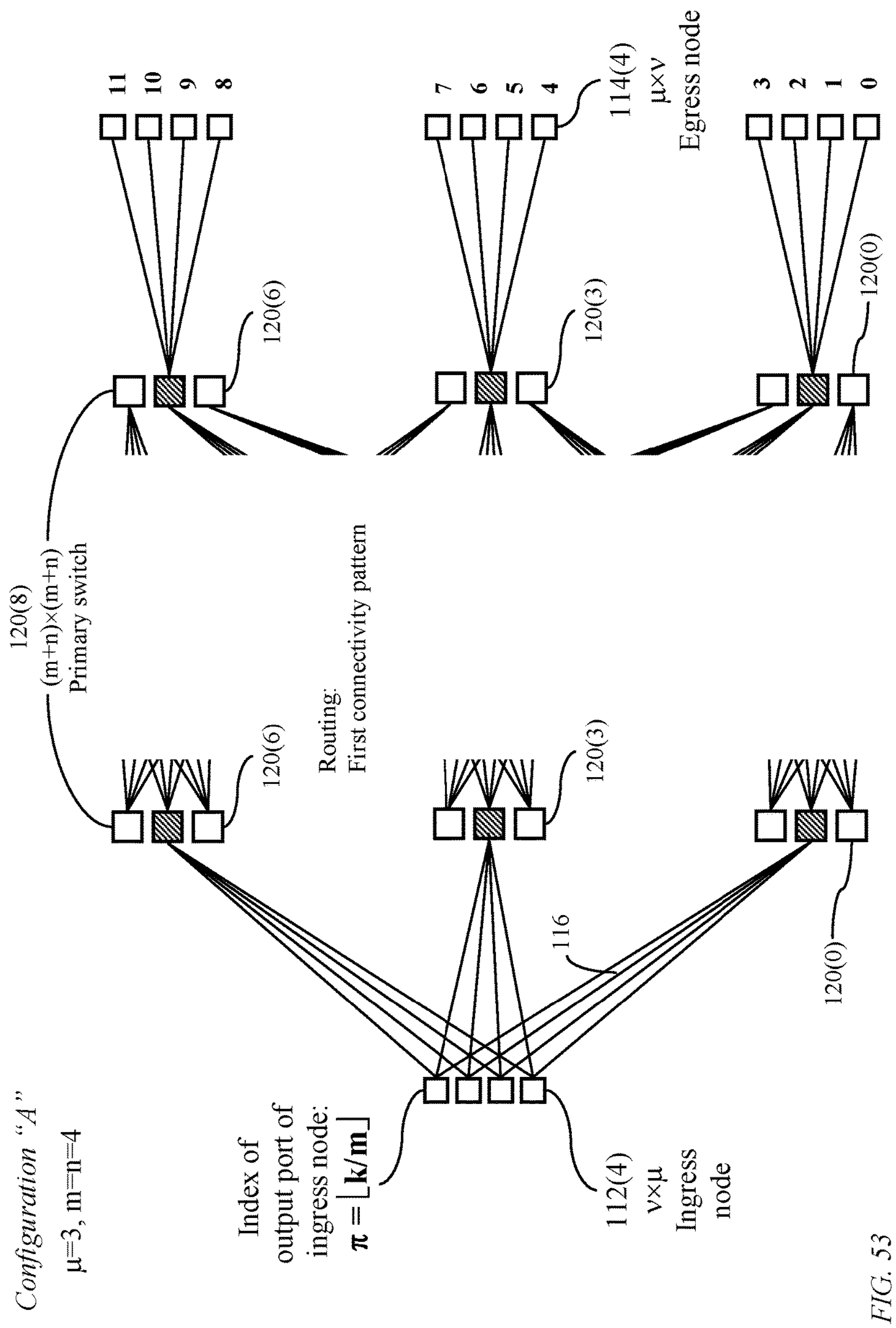
FIG. 53 illustrates selection of an output port of an ingress node for a primary path to a specified egress node in the network of FIG. 32.

FIG. 53 illustrates selection of an output port of an ingress node for a primary path to a specified egress node in the network of FIG. 32.

Figure 54:
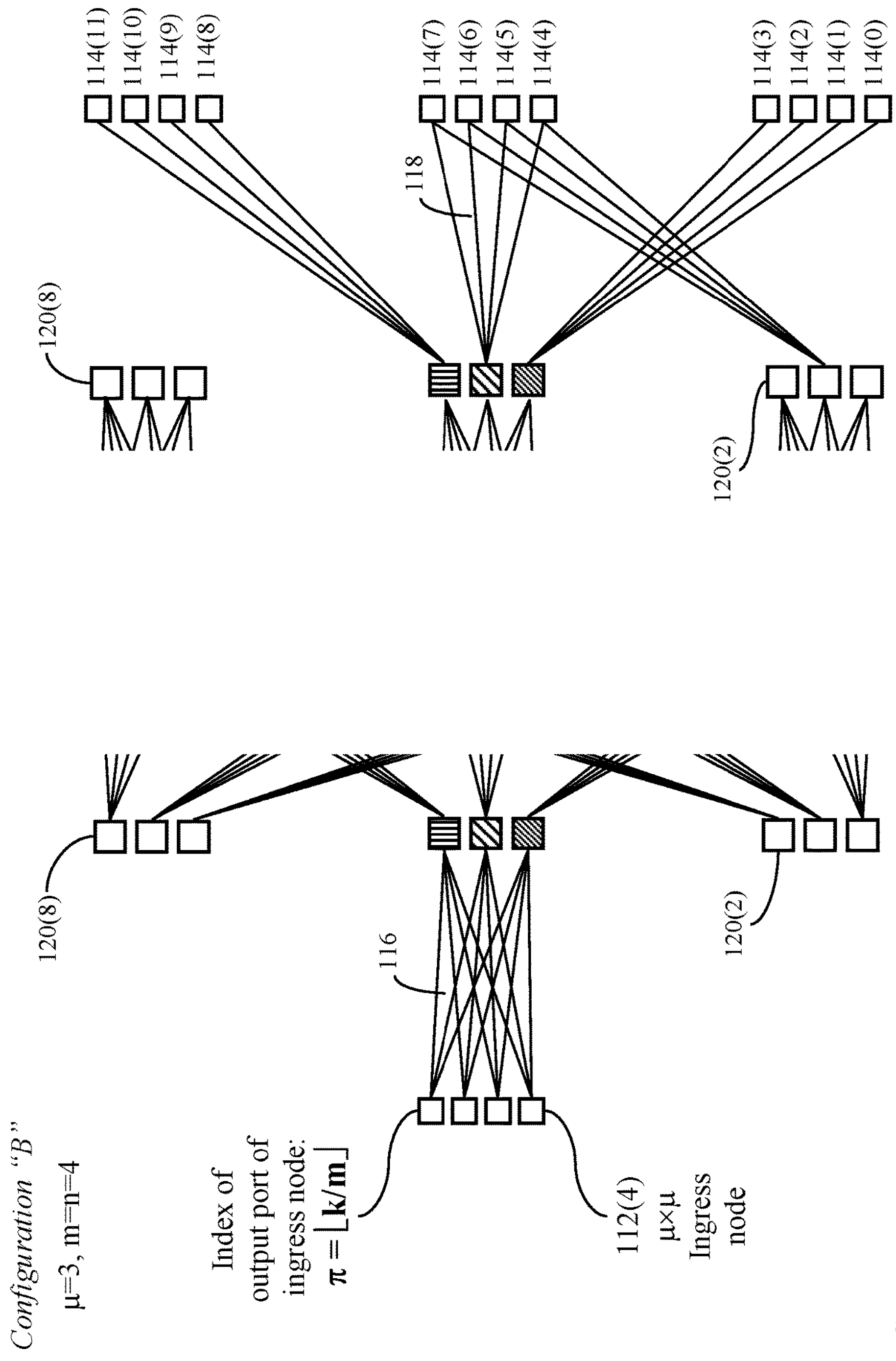
FIG. 54 illustrates selection of an output port of an ingress node for a primary path to a specified egress node in the network of FIG. 45.

FIG. 54 illustrates selection of an output port of an ingress node for a primary path to a specified egress node in the network of FIG. 45.

Figure 55:
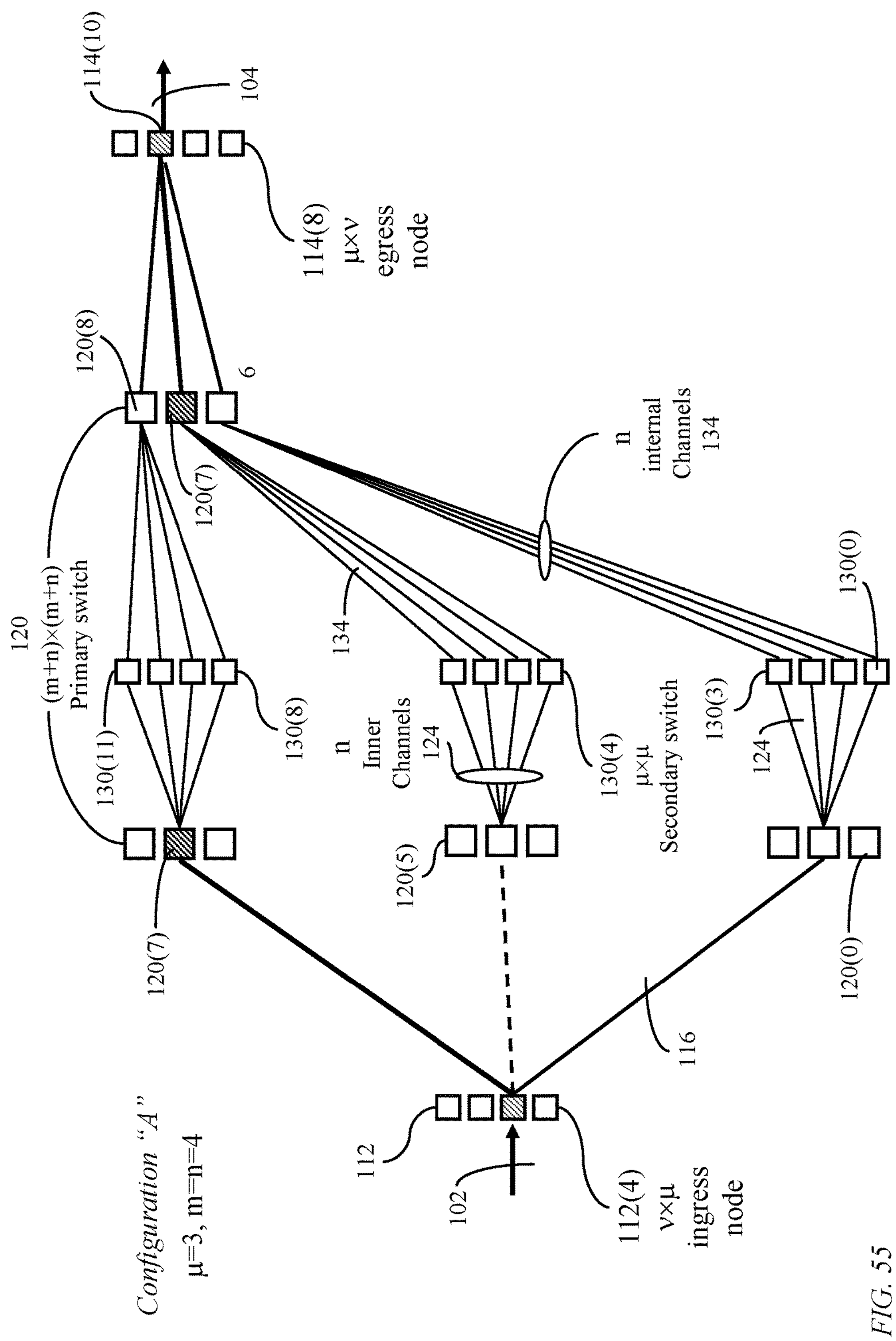
FIG. 55 illustrates a primary path and multiple compound paths from an ingress node to an egress node in the network of FIG. 32.

FIG. 55 illustrates a primary path and multiple compound paths from an ingress node to an egress node in the network of FIG. 32. Ingress node 112 of index 4 (j=4) connects to three upstream channels 116, one to each of primary switches 120 of indices 1, 4, and 7. Egress node 114 of index 10 (k=10) connects to three downstream channels, each from one of primary switches 120 of indices 6, 7, and 8. A primary path from ingress node 112(4) to egress node 114(10) traverses common primary switch 120(7).

The index of the output port of ingress node 112(4) which connects to primary switch 120(7) is determined as $\lfloor k/m\rfloor=2$. The output port of index 0 of ingress node 112(4) connects to an upstream channel 116 to primary switch 120(1). The input port of index 0 of egress node 114(10) connects to a downstream channel from primary switch 120(6). Primary switch 120(1) has four paths to primary switch 120(6) each traversing one of secondary switches 130(0), 130(1), 130(2), and 130(3).

The output port of index 1 of ingress node 112(4) connects to an upstream channel 116 to primary switch 120(4). The input port of index 1 of egress node 114(10) connects to a downstream channel from primary switch 120(7). Primary switch 120(4) has four paths to primary switch 120(7) each traversing one of secondary switches 130(4), 130(5), 130(6), and 130(7).

The output port of index 2 of ingress node 112(4) connects to an upstream channel 116 to primary switch 120(7). The input port of index 2 of egress node 114(10) connects to a downstream channel from primary switch 120(8). Primary switch 120(7) has four paths to primary switch 120(8) each traversing one of secondary switches 130(8), 130(9), 130(10), and 130(11).

Thus, there are μ×n compound paths from ingress node 112(4) to egress node 114(10), of which only μ compound paths are non-intersecting. The compound paths from output port of index 1 of ingress node 112(4) also intersect the primary path in the downstream channel from primary switch 120(7) to egress node 114(10).

Figure 56:
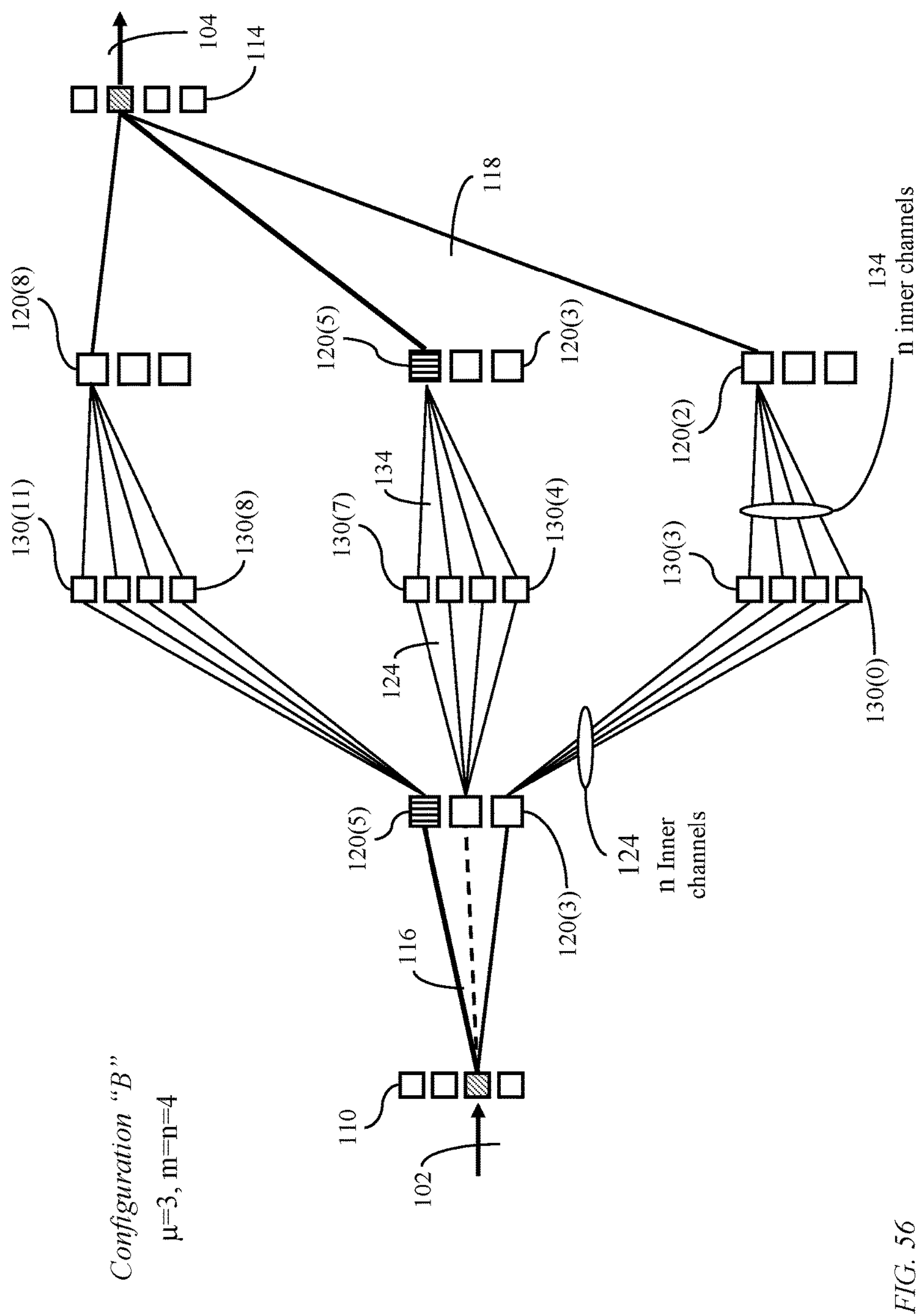
FIG. 56 illustrates a primary path and multiple compound paths from an ingress node to an egress node in the network of FIG. 45.

FIG. 56 illustrates a primary path and multiple compound paths from an ingress node to an egress node in the network of FIG. 45. Ingress node 112 of index 4 (j=4) connects to three upstream channels 116, one to each of primary switches 120 of indices 3, 4, and 5. Egress node 114 of index 10 (k=10) connects to three downstream channels, each from one of primary switches 120 of indices 2, 5, and 8. A primary path from ingress node 112(4) to egress node 114(10) traverses common primary switch 120(5). The index of the output port of ingress node 112(4) which connects to primary switch 120(5) is determined as $\lfloor k/m \rfloor = 2$.

The output port of index 0 of ingress node 112(4) connects to an upstream channel 116 to primary switch 120(3). The input port of index 0 of egress node 114(10) connects to a downstream channel from primary switch 120(2). Primary switch 120(3) has four paths through channels 124 and 134 to primary switch 120(2) each traversing one of secondary switches 130(0), 130(1), 130(2), and 130(3).

The output port of index 1 of ingress node 112(4) connects to an upstream channel 116 to primary switch 120(4). The input port of index 1 of egress node 114(10) connects to a downstream channel from primary switch 120(5). Primary switch 120(4) has four paths through channels 124 and 134 to primary switch 120(5) each traversing one of secondary switches 130(4), 130(5), 130(6), and 130(7).

The output port of index 2 of ingress node 112(4) connects to an upstream channel 116 to primary switch 120(5). The input port of index 2 of egress node 114(10) connects to a downstream channel from primary switch 120(8). Primary switch 120(5) has four paths through channels 124 and 134 to primary switch 120(8) each traversing one of secondary switches 130(8), 130(9), 130(10), and 130(11).

Thus, there are μ×n compound paths from ingress node 112(4) to egress node 114(10), of which only μ compound paths are non-intersecting. The secondary intersecting paths from output port of index 1 of ingress node 112(4) also intersect the primary path in the downstream channel from primary switch 120(4) to egress node 114(10).

FIG. 32, FIG. 38, and FIG. 42 illustrate networks of a first connectivity scheme (FIG. 20) while FIG. 45 and FIG. 50 illustrate networks of a second connectivity scheme (FIG. 21). In both connectivity patterns, a primary switch 120 has asymmetrical connectivity to ingress nodes 112 and egress nodes 114 where any pair of an ingress node 112 and egress node 114 connects to orthogonal sets of primary switches. FIG. 26 depicts sets of ingress nodes 112 and sets of egress nodes 114 connecting to respective primary switches 120 in the network of FIG. 38 and FIG. 39. Each of primary switches 120 of indices 0, 5, 10, and 15 connects to a respective set of ingress nodes and a respective set of egress nodes of same indices.

Primary switch 120(0) connects ingress nodes 112(0) to 112(4) to egress nodes 114(0) to 114(4). Primary switch 120(5) connects ingress nodes 112(5) to 112(9) to egress nodes 114(5) to 114(9). Thus, a controller of primary switch 120(0) may send control data to a subtending ingress node 112 through its paired egress node. Likewise, a controller of any of primary switches 120(5), 120(10), and 120(15) may send control data to a subtending ingress node through its paired egress node.

Primary switch 120(1) connects ingress nodes 112(5) to 112(9) to egress nodes 114(0) to 114(4), as illustrated in FIG. 39, while primary switch 120(4) connects ingress nodes 112(0) to 112(4) to egress nodes 114(5) to 114(9) as illustrated in FIG. 38. Thus if primary switches 120(1) and 120(4) are collocated, a controller of primary switch 120(1) may communicate control data relevant to requests from ingress nodes 112(5) to 112(9) through egress nodes 114(5) to 114(9) which connect to outputs of collocated primary switch 120(4). Likewise, a controller of primary switch 120(4) may communicate control data relevant to ingress nodes 112(0) to 112(4) through egress nodes 114(0) to 114(4) which connect to outputs of collocated primary switch 120(1). Primary switches 120(2) and 120(8) may be collocated, primary switches 120(6) and 120(9) may be collocated, primary switches 3 and 12 may be collocated, primary switches 120(7) and 120(13) may be collocated, and primary switches 120(11) and 120(14) may be collocated to facilitate distribution of control signals.

TABLE 4

| Network connectivity | | | | |
|---|---|---|---|---|
| | To | | | |
| From | μ × m Ingress nodes | $\mu^2$ Primary switches | μ × m Egress nodes | μ × n Secondary switches |
| Ingress node | — | → μ channels | — | — |
| Primary switch | m channels ← | — | → m channels | ↔ n channels |
| Egress node | — | μ channels ← | — | — |
| Secondary switch | — | μ channels↔ | — | — |

Table-4 summarizes the connectivity of a network configured according to either of the two connectivity schemes (FIG. 20, FIG. 21). Each primary switch 120 connects to:

(1) m upstream channels 116, each originating from an output port of a respective ingress node 112 and connecting to a respective primary input port of the primary switch;

(2) m downstream channels 118, each originating from a respective primary output port and directed to an input port of a respective egress node 114;

(3) n inner channels 124, each originating from a respective secondary output port of the primary switch and directed to an input port of a respective secondary switch 130; and (4) n internal channels 134, each originating from an output port of a respective secondary switch 130 and connecting to a respective secondary input port of the primary switch Thus:

(a) each ingress node 112 connects to μ upstream channels, each directed to an input port of a respective primary switch;

(b) each egress node 114 connects to μ downstream channels, each originating from a primary output port of a respective primary switch 120;

(c) each secondary switch 130 connects to n inner channels, each originating from a secondary output port of a respective primary switch 120; and (d) each secondary switch 130 connects to n internal channels 134 each directed to a secondary input port of a respective primary switch.

Table-5 details specific connectivity of each of the ingress nodes, egress nodes, and secondary switches to primary switches according to the two connectivity schemes illustrated in FIG. 20 and FIG. 21. FIGS. 32, 36, 38, 39, 42, 53, and 55 relate to the first connectivity scheme while FIGS. 45, 48, 50, 54, and 56 relate to the second connectivity scheme.

TABLE 5

Exemplary connectivity patterns

| | Primary switches Indices of primary switches 120 | |
|---|---|---|
| connecting to: | First Connectivity Scheme (FIGS. 32, 36, 38, 39, 42, 53, and 55) | Second Connectivity Scheme (FIGS. 45, 48, 50, 54, and 56) |
| ingress node of index j, $0 \le j < (\mu \times m)$ | First set: $\{\lfloor j/m \rfloor \times (\mu+1) + \alpha \times \mu\}\|_{modulo\ \mu^2}$, $0 \le \alpha < \mu$ (FIG. 20, 2015) | First set: $\{\lfloor j/m \rfloor \times \mu + \alpha\}$, $0 \le \alpha < \mu$; (FIG. 21, 2015) |
| egress node of index k, $0 \le k < (\mu \times m)$, | Second set: $\{\lfloor k/m \rfloor \times \mu + \alpha\}$, $0 \le \alpha < \mu$; | Second set: $\{\lfloor k/m \rfloor \times (\mu+1) + \alpha \times \mu\}\|_{modulo\ \mu^2}$, $0 \le \alpha < \mu$ |
| secondary switch of index s, $0 \le s < \mu \times n$ | Third set: $\{\lfloor s/n \rfloor \times (\mu+1) + \alpha \times \mu\}\|_{modulo\ \mu^2}$, $0 \le \alpha < \mu$. (FIG. 20, 2035) Fourth set: $\{\lfloor s/n \rfloor \times \mu + \alpha\}$, $0 \le \alpha < \mu$. | Third set: $\{\lfloor s/n \rfloor \times \mu + \alpha\}$, $0 \le \alpha < \mu$. (FIG. 21, 2115) Fourth set: $\{\lfloor s/n \rfloor \times (\mu+1) + \alpha \times \mu\}\|_{modulo\ \mu^2}$, $0 \le \alpha < \mu$. |

Table-5 identifies:

(i) a first set of primary switches to which upstream channels from an ingress node 112 connect;

(ii) a second set of primary switches connecting to downstream channels to an egress node 114;

(iii) a third set of primary switches to which channels originating from a secondary switch 130 connect; and (iv) a fourth set of primary switches connecting to channels directed to a secondary switch 130.

TABLE 6

Connectivity of a primary switch 120 of index p, $0 \le p < \mu^2$

| Ports of primary switch | First Connectivity Pattern (FIGS. 32, 36, 38, 39, 42, 53, and 55) | Second Connectivity Pattern (FIGS. 45, 48, 50, 54, and 56) |
|---|---|---|
| m primary input ports ← | m ingress nodes of indices $(m \times p_{modulo\ \mu} + \lambda\}$, $0 \le \lambda < m$ (FIG. 22, 2210) | m ingress nodes of indices $\{\lfloor p/\mu \rfloor \times m + \lambda\}$, $0 \le \lambda < m$ (FIG. 23, 2310) |
| m primary output ports→ | m egress nodes of indices $\{\lfloor p/\mu \rfloor \times m + \lambda\}$, $0 \le \lambda < m$ (FIG. 22, 2220) | m egress nodes of indices $\{m \times p_{modulo\ \mu} + \lambda\}$, $0 \le \lambda < m$ (FIG. 23, 2310) |
| n secondary input ports← | n secondary switches of indices $(n \times p_{modulo\ \mu} + \lambda\}$, $0 \le \lambda < n$ (FIG. 22, 2230) | n secondary switches of indices $\{\lfloor p/\mu \rfloor \times n + \lambda\}$, $0 \le \lambda < n$ (FIG. 23, 2330) |
| n secondary output ports→ | n secondary switches of indices $\{\lfloor p/\mu \rfloor \times n + \lambda\}$, $0 \le \lambda < n$ (FIG. 22, 2240) | n secondary switches of indices $(n \times p_{modulo\ \mu} + \lambda\}$, $0 \le \lambda < n$ (FIG. 23, 2340) |

The first set of primary switches from any ingress node 112 is orthogonal to a second set of primary switches connecting to downstream channels to any egress node 114 and is orthogonal to a fourth set of primary switches connecting to channels directed to any secondary switch 130.

Likewise, the third set of primary switches from any secondary switch 130 is orthogonal to a second set of primary switches connecting to downstream channels to any egress node 114 and is orthogonal to a fourth set of primary switches connecting to channels directed to any secondary switch 130.

Table-6 details connectivity of a primary switch 120 of index p, $0 \le p < \mu^2$, to ingress nodes 112, egress nodes 114, and secondary switches according to the two connectivity schemes illustrated in FIG. 20 and FIG. 21.

Table-6 identifies ingress nodes 112 connecting to the m primary input ports of the primary switch, egress nodes 114 connecting to the m primary output ports of the primary switch, secondary switches connecting to n secondary input ports of the primary switch, and secondary switches connecting to n secondary output ports of the primary switch.

As illustrated in FIG. 55, there are n internal paths from a first primary switch 120 to a second primary switch 120. If the primary switches 120 are configured as latent space switches, the n paths through the first primary switch encounter different systematic delays and, likewise, the n paths through the second primary switch encounter different systematic delays. Preferably, the n path through the first primary switch may be considered according to their systematic delays and an available path of least delay is selected. The compound paths from an ingress node 112 connecting to a primary input port 1110(6) traverse secondary output ports 1140 of indices 1, 3, 5, 7, 9, 11, 13, and 15. For the case of a systematic delay of $(y-x)_{modulo\ N}$, the systematic delay Δ from an input port of index x to an output port of index y, $0 \le x < 16$, $0 \le y < 16$, is $\Delta = (y-x)_{modulo\ 16}$. Thus, the systematic delays to secondary output ports 1140 of indices 7, 9, 11, 13 15, 1, 3, and 5 are 1, 3, 5, 7, 9, 11, 13, and 15 time slots, respectively. The selection of a compound path through the primary switch 120 would then start with a path from primary input port 1110(6) to secondary output port 1140(7) followed by secondary output port 1140(9) if the path does not have sufficient free capacity.

Likewise, the preferred compound path from an ingress node 112 connecting to a primary input port 1110(0) start with secondary output port 1140(1) followed by secondary output port 1140(3), the preferred compound path from an ingress node 112 connecting to a primary input port 1110(2) traverses secondary output port 1140(3) followed by secondary output port 1140(5), . . . , and the preferred compound path from an ingress node 112 connecting to a primary input port 1110(14) traverses secondary output port 1140(15), followed by secondary output port 1140(1).

Universal Controller

It may be desirable to provide central-control capability in addition to distributed control. The network may then include a universal controller. To simplify access to the universal controller, the universal controller is positioned to have a one-hop path from each access node and a one-hop path to each access node. This is realized by coupling the universal controller to: μ channels directed to a set of μ primary switches; and μ channels originating from an orthogonal set of μ primary switches.

The set of μ primary switches comprises primary switches of indices:

$$\{\eta\times(\mu+1)+\alpha\times p\}|\text{modulo } \mu^2,$$

and the orthogonal set of μ primary switches comprises primary switches of indices:

$$\{\eta\times\mu+\alpha\};$$

where $0 \le \alpha < \mu$, and η is any integer in the range $0 \le \eta < \mu$.

Figure 57:
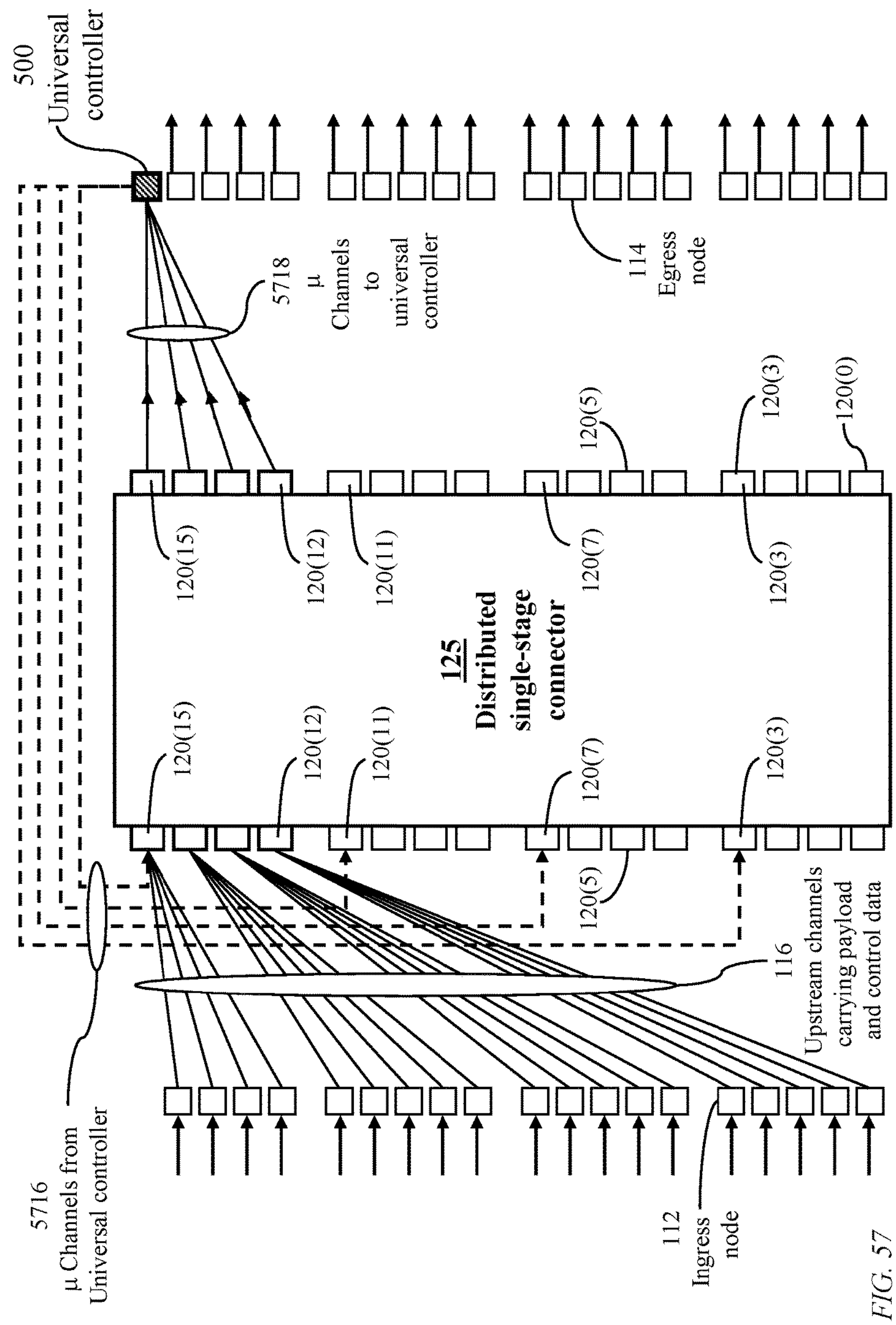
FIG. 57 illustrates upstream paths from access nodes to a universal controller, in accordance with an embodiment of the present invention.

In the configuration of FIG. 57, μ=4, m=5, and η is set to equal (μ−1). Thus, the universal controller 500 connects to an input port of each primary switch of a set of μ primary switches of indices $\{3\times5+4\times\alpha\}|\text{modulo } 16$, $0 \le \alpha < 4$, i.e., indices 15, 3, 7, 11. The universal controller 500 connects to an output port of each primary switch of a set of μ primary switches of indices 3×4+α, $0 \le \alpha < 4$, i.e., indices 12, 13, 14, and 15.

FIG. 57 illustrates upstream paths from access nodes 110 (i.e., from ingress nodes 112) to a universal controller of a network 3800 (FIG. 38) where one of the access nodes 110 is replaced with universal controller 500 of FIG. 5. The connectivity of the primary switches 120 to the secondary switches 130 is masked in FIG. 57 because control data propagates through the distributed single-stage connector 125 which comprises solely the primary switches 120.

Each access node 110 has p, upstream channels 116 to a respective first set of μ primary switches and μ downstream channels from a second set of μ primary switches that is orthogonal to the first set of μ primary switches. The two sets have only one primary switch in common. Each primary switch 120 has m input ports connecting to upstream channels from access nodes and m output ports connecting to downstream channels to access nodes. In the exemplary configuration of FIG. 57, μ=4 and m=5, thus the maximum number of access nodes is μ×m indexed as 0, 1, . . . , (μ×m−1), i.e., 0, 1, . . . , 19. The universal controller 500 may replace any of the μ×m access nodes.

Each access node 110 has μ upstream channels each connecting to an input port of one of μ primary switches 120. One of the μ upstream channels from each access node 110 leads to a primary switch 120 directly connected to the universal controller 500. If the universal controller 500 replaces an access node 110 of index k, $0 \le k < \mu\times m$, a primary switch of index $\mu\times\lfloor k/m\rfloor+\lfloor j/m\rfloor$ connects an access node of index j, $0 \le j < \mu\times m$, to the universal controller 500. In the configuration of FIG. 57, μ=4, m=5, and k=19, and $\mu\times\lfloor k/m\rfloor=12$. Thus, access nodes of indices 0 to 4 connect to the universal controller through the primary switch 120 of index 12, access nodes 5 to 9 connect to the universal controller through the primary switch 120 of index 13, access nodes 10 to 14 connect to the universal controller through the primary switch 120 of index 14, and access nodes 15 to 18 connect to the universal controller through the primary switch 120 of index 15.

In the exemplary configuration of FIG. 57, the universal controller 500 replaces the access node of index (μ×m−1), i.e., the access node of index 19. The universal controller 500 has the same connectivity to the distributed single-stage connector 125 as the access node 110 it replaces. Thus, universal controller 500 has μ channels 5716 to a respective third set of μ primary switches and μ downstream channels 5718 from a fourth set of μ primary switches that is orthogonal to the third set of μ primary switches; the third set comprises access nodes 110 of indices 3, 7, 11, and 15 while the fourth set comprises access nodes of indices 12, 13, 14, and 15. Each of access nodes of indices 0 to (μ×m−2) has μ upstream channels 116 to a respective primary switch 120 each carrying payload data and control data directed to a respective primary controller 1160 (FIG. 11). An upstream channel 116 directed to any of primary switches 120 of indices $(\mu\times m-m)$ to $(\mu\times m-1)$ also carries control data directed to the universal controller 500.

Figure 58:
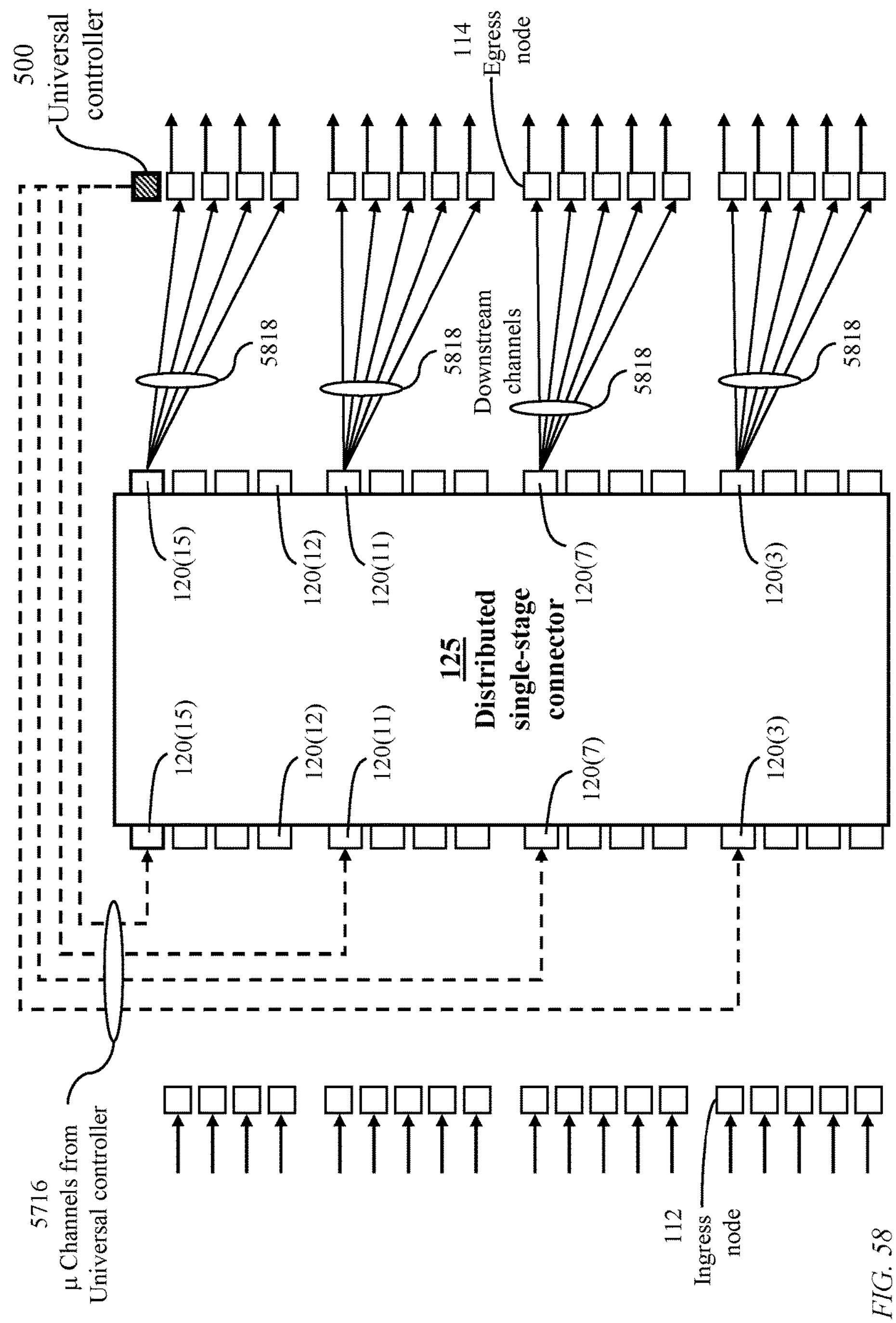
FIG. 58 illustrates downstream paths from the universal controller of FIG. 57 to the access nodes, in accordance with an embodiment of the present invention.

FIG. 58 illustrates downstream paths from the universal controller 500 of FIG. 57 to the access nodes 110. As in FIG. 57, the connectivity of the primary switches 120 to the secondary switches 130 is masked because control data propagates through the distributed single-stage connector 125 which comprises solely the primary switches 120. The universal controller 500 has μ channels 5716 to a set of μ primary switches of indices $j\times\mu$, $0\le j<\mu$. Control data from the universal controller to the access nodes 110 of indices 0 to $(\mu\times m-2)$ is transferred over downstream channels 118. An access node 110 of index k, (i.e., an egress node of index k), $0\le k<(\mu\times m-1)$ receives control data from the universal controller 500 through a primary switch 120 of index $\{\mu\times\lfloor k/m\rfloor+\mu-1\}$. Thus, with μ=4 and m=5, access nodes of indices 0 to 4 receive universal control data from primary switch 120 of index 3, access nodes of indices 5 to 9 receive universal control data from primary switch 120 of index 7, access nodes of indices 10 to 14 receive universal control data from primary switch 120 of index 11, and access nodes of indices 15 to 18 receive universal control data from primary switch 120 of index 15.

FIG. 57 and FIG. 58 illustrates a universal controller 500 replacing an access node of index $(\mu\times m-1)$ of a contiguous network configured according to the first connectivity scheme of FIG. 20. However, the universal controller may replace any access node in a contiguous network configured according to either of the two connectivity schemes of FIG. 20 and FIG. 21.

Figure 59:
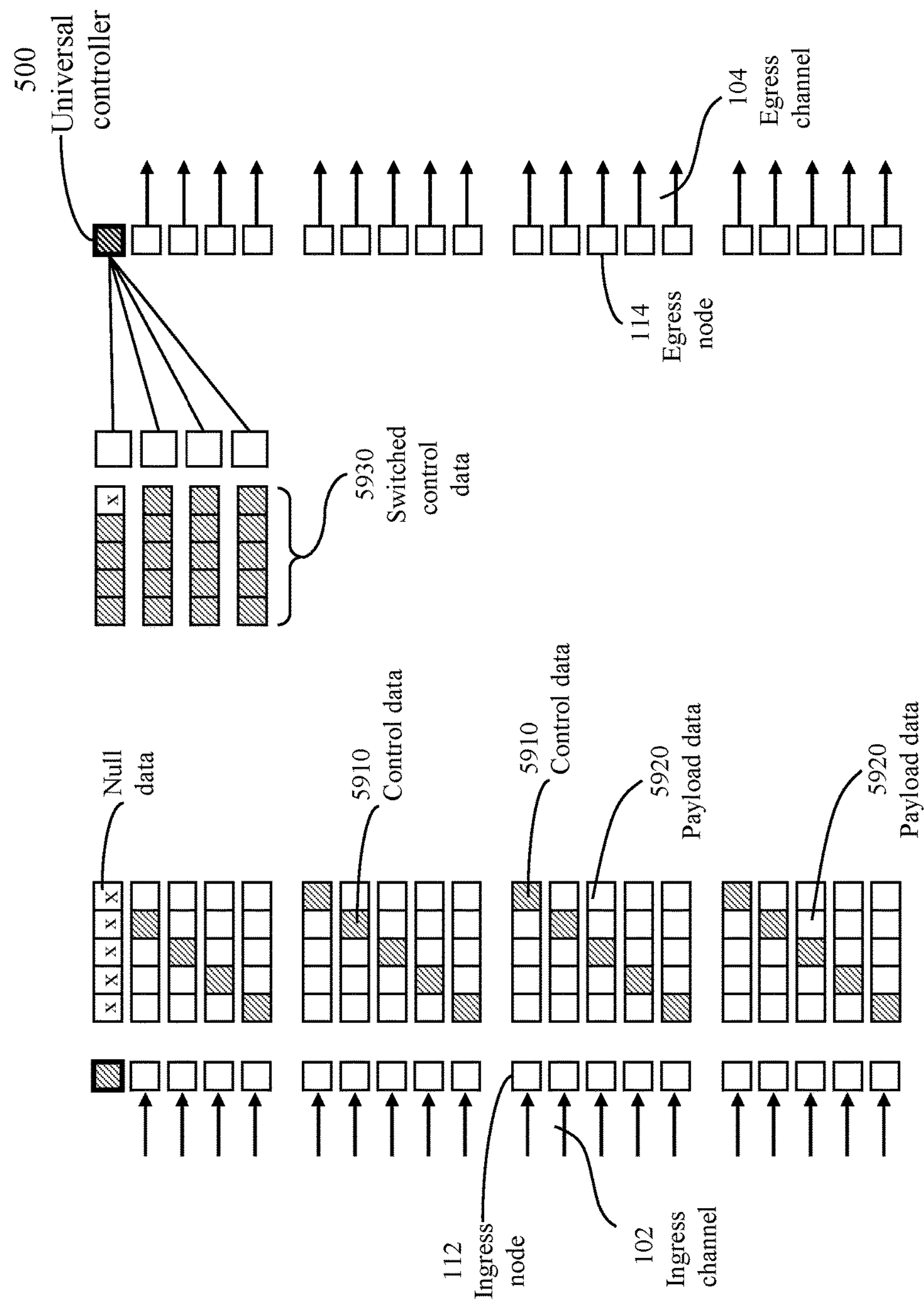
FIG. 59 illustrates control time-slot allocations in the upstream paths of FIG. 57, in accordance with an embodiment of the present invention.

FIG. 59 illustrates upstream control time-slot allocations in the upstream paths of FIG. 57. For each upstream channel 116 leading to a primary switch 120 connecting directly to the universal controller 500, a universal-control time slot 5910 in a repetitive predefined time frame is reserved to carry an upstream universal-control message. The duration of the predefined time frame is arbitrary but is preferably a positive integer multiple of m time slots. The universal-control time slots associated with upstream channels 116 connecting to a same primary switch 120 are preferably selected to be non-coincident if the primary switch 120 is a bufferless switch as illustrated in FIG. 59. For example, the m universal-control time slots 5910(0) to 5910(4) associated with access nodes 110 of indices 0 to 4 are non-coincident so that respective upstream global-control messages arrive at the primary switch 120 of index 12 during successive time slots and may be successively forwarded to a channel 5718 leading to a port of the access controller. The non-coincidence of upstream global-control time slots is crucial if the primary switches 120 comprise bufferless input ports. Likewise, the m universal-control time slots 5910(5) to 5910(9) associated with access nodes 110 of indices 5 to 9 are non-coincident, the m universal-control time slots 5910(10) to 5910(14) associated with access nodes 110 of indices 10 to 14 are non-coincident, and the m universal-control time slots 5910(15) to 5910(18) associated with access nodes 110 of indices 15 to 18 are non-coincident. Thus, a channel 5718 directed to the universal controller carries a set 5930 of sequential universal-control data segments. The upstream universal-control data 5910 and upstream payload data 5920 are temporally interleaved as indicated in FIG. 59.

Figure 60:
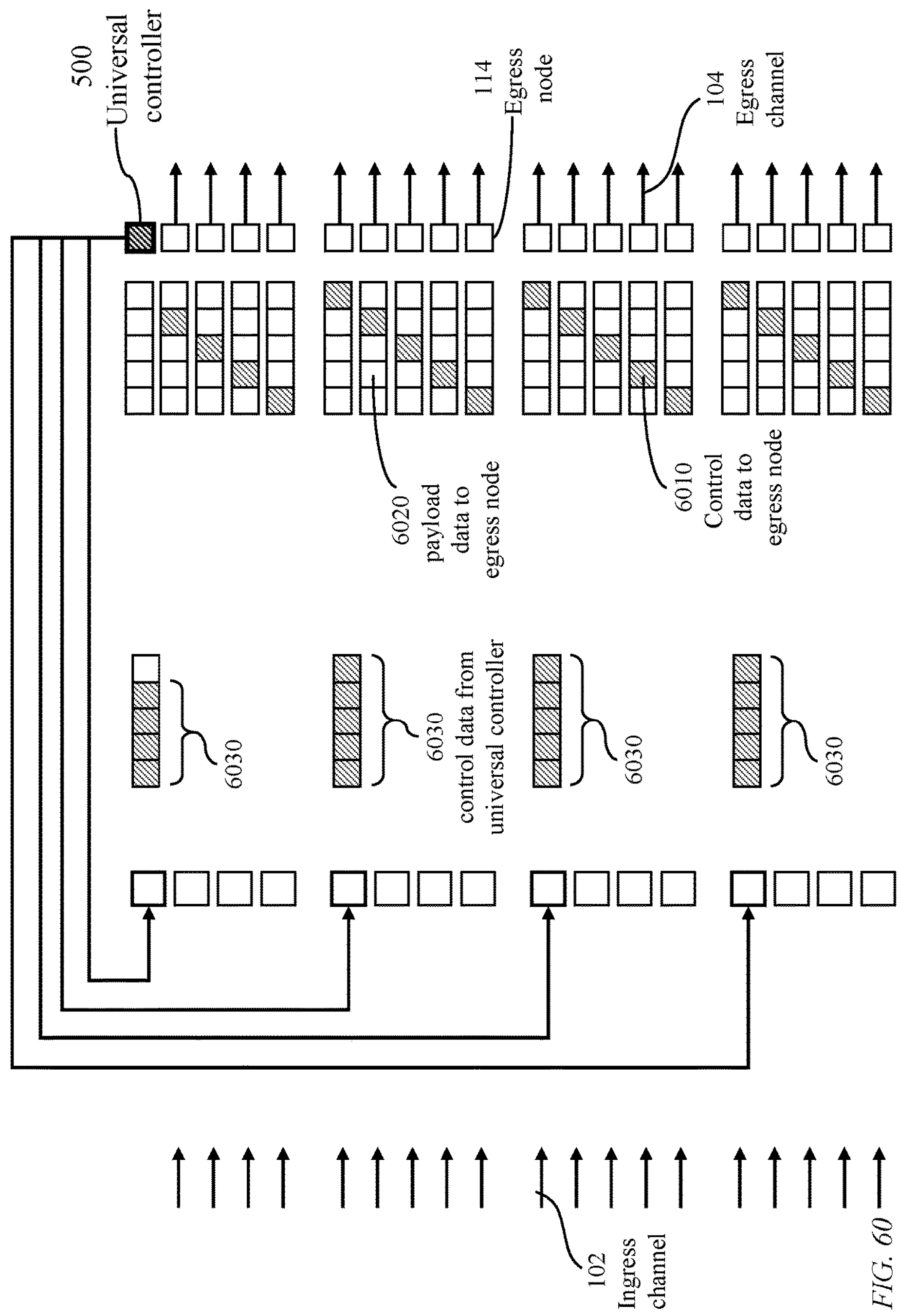
FIG. 60 illustrates control time-slot allocations in the downstream paths of FIG. 58, in accordance with an embodiment of the present invention.

FIG. 60 illustrates downstream control time-slot allocations in the μ channels 5716 of FIG. 59 and $(\mu\times m-1)$ downstream channels 118. Each access node 110 is coupled to μ downstream channels 118 each originating from an output port of one of μ primary switches 120. One of the μ downstream channels 118 to each access node 110 emanates from a primary switch 120 directly connected to the universal controller 500. If the universal controller 500 replaces an access node 110 of index k, $0\le k<\mu\times m$, a primary switch of index $\lfloor k/m\rfloor+\mu\times\lfloor j/m\rfloor$ connects the universal controller 500 to an access node of index j, $0\le j<\mu\times m$. In the configuration of FIG. 58, μ=4, m=5, and k=19, and $\lfloor k/m\rfloor=3$. Thus, the universal controller sends downstream universal-control messages to:

access nodes of indices 0 to 4 through the primary switch 120 of index 3;

access nodes 5 to 9 through the primary switch 120 of index 3+4×1;

access nodes 10 to 14 through the primary switch 120 of index 3+4×2; and access nodes 15 to 18 through the primary switch 120 of index 3+4×3.

Each of channels 5716 originating from the universal controller 500 carries a set 6030 of downstream universal control time slots. For each downstream channel emanating from a primary switch connecting to the universal controller 500, a downstream universal-control time slot 6010 in the repetitive predefined time frame is reserved to carry a downstream global-control message.

The universal-control time slots associated with downstream channels 118 emanating from a same primary switch 120 are preferably selected to be non-coincident as illustrated in FIG. 60. For example, the m downstream global-control time slots 6010(0) to 6010(4) associated with access nodes 110 of indices 0 to 4 are non-coincident so that respective downstream universal-control messages may be successively transmitted from a port of the primary switch of 3. Likewise, the m downstream universal-control time slots 6010(5) to 6010(9) associated with access nodes 110 of indices 5 to 9 are non-coincident, the m downstream universal-control time slots 6010(10) to 6010(14) associated with access nodes 110 of indices 10 to 14 are non-coincident, and the m downstream universal-control time slots 6010(15) to 6010(18) associated with access nodes 110 of indices 15 to 18 are non-coincident. The downstream universal-control data 6010 and downstream payload data 6020 are temporally interleaved as indicated in FIG. 60.

Coupling Servers to the Distributed Single-Stage Connector

Figure 61:
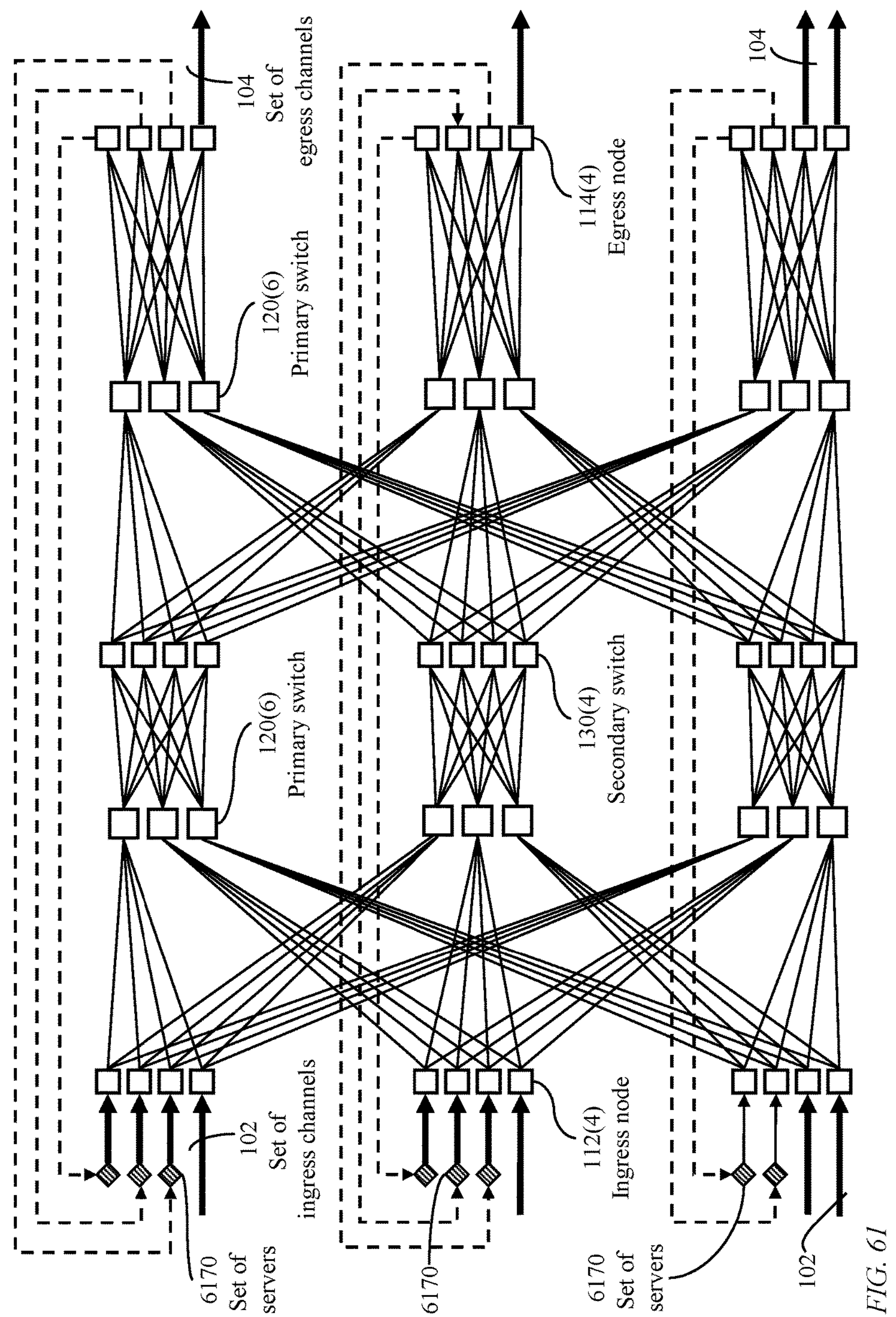
FIG. 61 illustrates a first arrangement of coupling external dual channels and local servers to access nodes in the network of FIG. 32, in accordance with an embodiment of the present invention.

FIG. 61 illustrates a first arrangement of coupling external dual channels 102/104 and servers 6170 to access nodes in the network of FIG. 32. As illustrated in FIG. 9 and FIG. 10, each access node 110 has ν access ports, ν≥1, each of which may connect to a dual access channel 102/104 or a server. The access nodes 110 coupled to a primary switch 120 may connect to dual access channels 102/104 or servers 6170. Each access node 110 has a one-hop path traversing a respective primary switch 120 to each other access node 110 and a one-hop path to each secondary switch 130 through a respective primary switch 120. Each secondary switch 130 has a one-hop path traversing a respective primary switch 120 to each other secondary switch 130 and a one-hop path to each access node 110 through a respective primary switch 120.

As illustrated in FIG. 9 and FIG. 10, each access node 110 has μ dual ports each connecting to a respective primary switch 120. As illustrated in FIG. 11, each primary switch has m dual ports each connecting to an access node 110 and n dual ports, each connecting to a secondary switch 130; m>2, n>0. Thus, each access node 110 has (μ×m−2) compound paths each traversing an intermediate access node 110 and μ×n compound paths each traversing a respective secondary switch 130 to each other access node 110.

Figure 62:
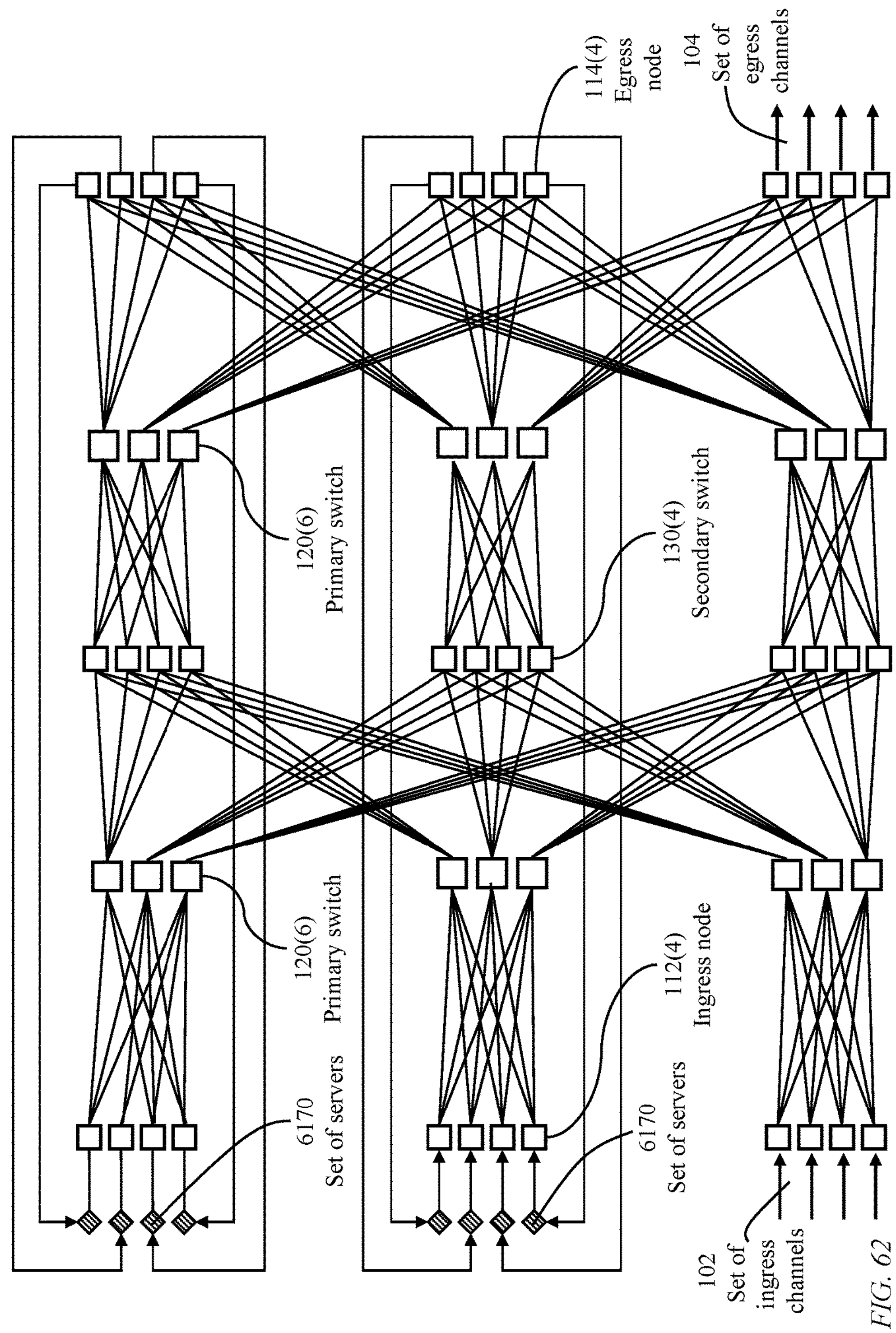
FIG. 62 illustrates a second arrangement of coupling external dual channels and local servers to access nodes in the network of FIG. 45, in accordance with an embodiment of the present invention.

FIG. 62 illustrates a second arrangement of coupling external dual channels 102/104 and local servers 6170 to access nodes in the network of FIG. 45. In this arrangement, all access nodes 110 coupled to a primary switch 120 may connect to either dual access channels 102/104 or servers 6170.

The arrangements of FIG. 61 and FIG. 62 coupling a mixture of dual access channels 102/104 and servers 6170 apply to any of the configurations of FIG. 36, 38, 42, 48, or 50.

Coupling Servers to the Auxiliary Connector

Figure 63:
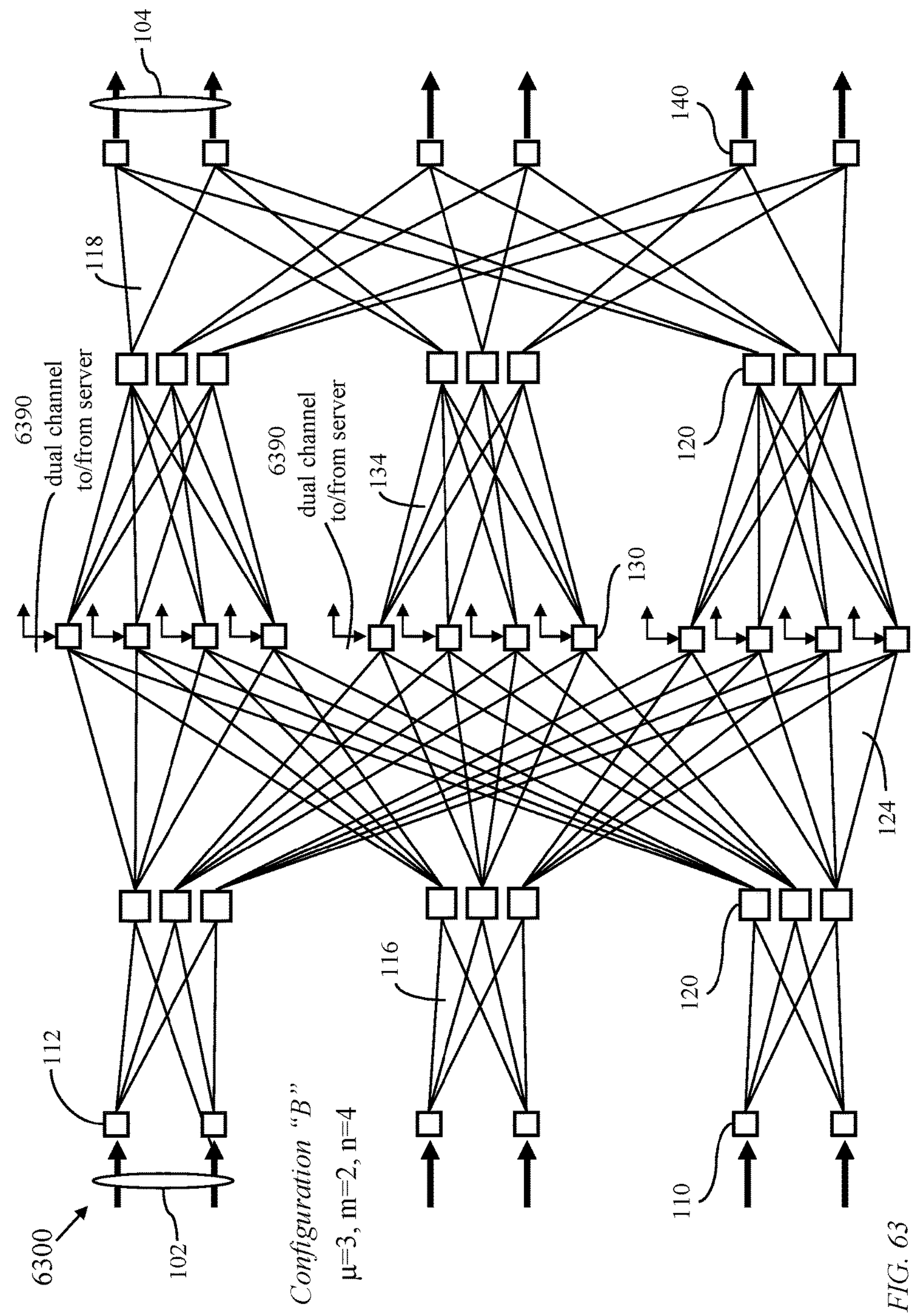
FIG. 63 illustrates an implementation of the network of FIG. 2 according to the second connectivity scheme of FIG.

FIG. 63 illustrates an implementation of the network of FIG. 2 according to the second connectivity scheme of FIG. 21, with μ=3, m=2, and n=4. Each secondary switch 130 is coupled to a respective set of servers. As illustrated in FIG. 13, a secondary switch of the network of FIG. 2 has μ dual ports coupled to dual channels to/from μ primary switches 120 and χ servers 1370, χ>1.

The χ servers 1310 connecting to the same secondary switch 130 may communicate through the switching mechanism 1350 of the secondary switch. As described above, each secondary switch 130 has a one-hop path to each other secondary switch 130. Thus, each server coupled to a particular secondary switch 130 has a one-hop path to each server coupled to any other secondary switch 130. A secondary switch 130 may also connect to another secondary switch through any of (μ×n−2) compound paths each traversing an intermediate secondary switch 130 or any of μ×m paths each traversing an access node 110.

FIG. 64 illustrates an implementation of the network of FIG. 2 similar to the implementation of FIG. 63 but based on the first connectivity scheme of FIG. 20.

Constituent Networks

FIG. 65 illustrates a first constituent network 6500 of the cloud-communications network of FIG. 5 which covers a first cluster of access nodes 110-A(0) to 110-A(4). Each access node of the cluster of access nodes has a one-hop path 6510 and multiple compound paths 6520 to each other access node 110 of constituent network. Since each access node has a one-hop path to each other access node, and the flow rate of control data is significantly lower than the flow rate of payload data, it is preferable that control data sent from a first access node 110 and directed to a second access node 110 be communicated through the single-hop path connecting the first access node to the second access node. The one-hop path from the first access node 110 to a second access node 110 carries distributed-control data together with payload data directed to the second access node. A compound path from the first access node 110 to the second access node 110 preferably carries only payload data directed to the second node.

FIG. 66 illustrates flow of distributed-control data 6610 and payload data 6620 in the constituent network of FIG. 65. It is noted that the term "payload data" as used herein refers to information data together with any associated headers while the term "control data" refers to data relevant to routing and management of a flow. One of the access nodes of the constituent network may provide a dual path to a universal controller 6630 dedicated to the constituent network.

FIG. 67 illustrates the constituent network of FIG. 65 having control paths to the universal controller 500 of the parent network.

FIG. 68 illustrates effective connectivity 6800 of the second constituent network of the cloud-communications network of FIG. 5 which covers a second cluster of access nodes 110-B(0) to 110-B(3). Each access node of the second cluster of access nodes has a one-hop path 6810 and multiple compound paths 6820 to each other access node of constituent network. The one-hop path 6810 comprises a control path and a data path.

FIG. 69 illustrates effective connectivity of an access node 110-B(2) of the second constituent network "B" to the access nodes of the first constituent network "A". As illustrated, access node 110-B(2) of constituent network 6800 has a one-hop path 6910 and multiple compound path 6920 to each access node of constituent network 6500. The one-hop path 6910 comprises a control path and a data path.

It should be understood that the described embodiments are intended to be illustrative and not restrictive. Various changes and modifications of the embodiments shown in the drawings and described in the specification may be made within the scope of the following claims without departing from the scope of the invention in its broader aspect.

The invention claimed is:

1. A network comprising:

a plurality of $\mu^2$ primary switches indexed sequentially from 0 to $(\mu^2-1)$, $\mu>2$, each pair of primary switches of different indices {p and q}, $0\le p<\mu^2$, $q=\{\mu\times p_{modulo\ \mu}+\lfloor p/\mu\rfloor\}$, $q\ne p$, sharing a respective common primary controller;

a plurality of access nodes, each access node coupled to:

a hardware access controller;

a set of access channels;

upstream channels to a respective first set of μ primary switches; and downstream channels from a respective second set of μ primary switches orthogonal to said first set of primary switches;

and a plurality of secondary switches, each secondary switch coupled to:

a respective set of servers of a server farm;

a hardware secondary controller configured to schedule data transfer from said each secondary switch to any access node and to any other secondary switch;

channels to a respective third set of μ primary switches; and channels originating from a respective fourth set of μ primary switches orthogonal to said first set of μ primary switches and said third set of μ primary switches;

said hardware access controller configured to schedule data transfer from said each access node to any access node and to any secondary switch.

2. The network of claim 1 wherein said hardware access controller comprises a memory device storing a respective routing table providing identifiers of:

a one-hop path from said each access node to each other access node traversing a respective primary switch; and a one-hop path from said each access node to each secondary switch traversing a respective primary switch.

3. The network of claim 2 wherein said respective routing table further provides identifiers of at least one compound path from said each access node to said each other access node traversing a first primary switch, a secondary switch, and a second primary switch.

4. The network of claim 2 wherein said respective routing table further provides identifiers of at least one compound path from said each access node to said each other access node traversing a first primary switch, an intermediate access node, and a second primary switch.

5. The network of claim 1 wherein said hardware secondary controller comprises a memory device storing a respective routing table providing identifiers of:

- a one-hop path from said each secondary switch to each other secondary switch traversing a respective primary switch; and
- a one-hop path from said each secondary switch to each access node traversing a respective primary switch.

6. The network of claim 5 wherein said respective routing table further provides identifiers of at least one compound path from said each secondary switch to said each other secondary switch traversing a first primary switch, an intermediate secondary switch, and a second primary switch.

7. The network of claim 5 wherein said respective routing table further provides identifiers of at least one compound path from said each secondary switch to said each access node traversing a first primary switch, an intermediate access node, and a second primary switch.

8. The network of claim 1 wherein said each primary switch comprises:

- m primary input ports, $m>2$, each coupled to an upstream channel from a respective access node of a set of m access nodes of indices: $m \times p_{modulo\ \mu}+\lambda$, $0 \le \lambda < m$;
- m primary output ports each coupled to a downstream channel to a respective access node of a set of m access nodes of indices: $\lfloor p/\mu \rfloor \times m+\lambda$, $0 \le \lambda < m$;
- n secondary input ports each coupled to a channel from a respective secondary switch of a set of n secondary switches of indices: $n \times p_{modulo\ \mu}+\lambda$, $0 \le \lambda < n$; and
- n secondary output ports each coupled to a channel directed to a respective secondary switch of a set of n secondary switches of indices: $\lfloor p/\mu \rfloor \times n+\lambda$, $0 \le \lambda < n$;
- said plurality of access nodes comprising $\mu \times m$ access nodes indexed sequentially as 0 to $(\mu \times m-1)$; and
- said plurality of secondary switches comprising $\mu \times n$ secondary switches indexed sequentially as 0 to $(\mu \times n-1)$.

9. The network of claim 1 wherein said each primary switch comprises:

- m primary input ports, $m>2$, each coupled to an upstream channel from a respective access node of a set of m access nodes of indices: $\lfloor p/\mu \rfloor \times m+\lambda$, $0 \le \lambda < m$;
- m primary output ports each coupled to a downstream channel to a respective access node of a set of m access nodes of indices: $m \times p_{modulo\ \mu}+\lambda$, $0 \le \lambda < m$;
- n secondary input ports each coupled to a channel from a respective secondary switch of a set of n secondary switches of indices: $\lfloor p/\mu \rfloor \times n+\lambda$, $0 \le \lambda < n$; and
- n secondary output ports each coupled to a channel directed to a respective secondary switch of a set of n secondary switches of indices: $n \times p_{modulo\ \mu}+\lambda$, $0 \le \lambda < n$;
- said plurality of access nodes comprising $\mu \times m$ access nodes indexed sequentially as 0 to $(\mu \times m-1)$; and
- said plurality of secondary switches comprising $\mu \times n$ secondary switches indexed sequentially as 0 to $(\mu \times n-1)$.

10. A network comprising:

- a plurality of $\mu^2$ primary switches indexed sequentially from 0 to $(\mu^2-1)$, each primary switch comprising m primary dual ports; $\mu>2$, $m>2$;
- a plurality of $(\mu \times m-1)$ access nodes indexed sequentially from 1 to $(\mu \times m-1)$ wherein an access node of index j, $1 \le j < (\mu \times m)$, connects to:
  - upstream channels directed to a first set of $\mu$ primary switches of indices:

$$\{\lfloor j/m \rfloor \times (\mu+1)+\alpha \times \mu\}|_{modulo\ \mu^2},\ 0 \le \alpha < \mu;\ \text{and}$$

- downstream channels from a second set of $\mu$ primary switches of indices: $\{\lfloor j/m \rfloor \times \mu+\alpha\}$, $0 \le \alpha < \mu$;

and

- a plurality of secondary switches, each secondary switch connecting to channels directed to a respective third set of $\mu$ primary switches orthogonal to said second set of $\mu$ primary switches and channels originating from a respective fourth set of $\mu$ primary switches orthogonal to said third set of $\mu$ primary switches;
- wherein at least one access node is coupled to a respective set of access channels, and at least one access node is coupled to a respective set of servers of a plurality of servers;
- each access node comprising a hardware access controller configured to schedule data transfer from said each access node to any access node;
- thereby said network provides respective single-hop paths for:
  - each pair of access nodes;
  - each pair of secondary switches; and
  - each pair of a secondary switch and an access node.

11. The network of claim 10 further comprising a universal controller coupled to:

- $\mu$ channels each directed to one of $\mu$ primary switches of indices:

$$\{\alpha \times \mu\},\ 0 \le \alpha < \mu;\ \text{and}$$

- $\mu$ channels each originating from one of $\mu$ primary switches of indices:

$$\{\alpha\},\ 0 \le \alpha < \mu.$$

12. The network of claim 10 wherein said hardware access controller comprises a memory device storing a respective routing table providing identifiers of:

- a one-hop path from said each access node to each other access node traversing a respective primary switch; and
- at least one compound path from said each access node to said each other access node traversing a first primary switch, a secondary switch, and a second primary switch.

13. The network of claim 10 wherein at least one secondary switch of said plurality of secondary switches is coupled to a respective set of servers of said plurality of servers.

14. The network of claim 13 further comprising:

- a plurality of hardware secondary controllers each coupled to a respective secondary switch storing a second routing table identifying:
  - a path from said respective secondary switch to each other secondary switch traversing one primary switch; and
  - at least one path to said each other secondary switch traversing a first primary switch, an access node, and a second primary switch.

15. The network of claim 13 further comprising:

a plurality of hardware secondary controllers each coupled to a respective secondary switch and storing a second routing table identifying:

a path from said respective secondary switch to each other secondary switch traversing one primary switch; and at least one compound path to said each other secondary switch traversing a first primary switch, a secondary switch, and a second primary switch.

16. The network of claim 10 wherein, for a secondary switch of index s, $0 \le s < \mu \times n$:

said third set of primary switches comprises μ primary switches of indices:

$$\{\lfloor s/n \rfloor \times (\mu+1) + \alpha \times \mu\}|_{\text{modulo } \mu^2},\ 0 \le \alpha < \mu;$$

said fourth set of primary switches comprises μ primary switches of indices:

$$\{\lfloor s/n \rfloor \times \mu + \alpha\},\ 0 \le \alpha < \mu;$$

with each primary switch of said plurality of primary switches connecting to n secondary switches, n>0.

17. A network comprising:

a plurality of $\mu^2$ primary switches indexed sequentially between 0 and $(\mu^2-1)$, each primary switch comprising m primary dual ports; μ>2, m>2;

a plurality of $(\mu \times m-1)$ access nodes indexed sequentially from 1 to $(\mu \times m-1)$, wherein an access node of index j, $1 \le j < \mu \times m$, connects to:

upstream channels directed to a first set of μ primary switches of indices: $\{\lfloor j/m \rfloor \times \mu + \alpha\}$, $0 \le \alpha < \mu$; and downstream channels from a second set of μ primary switches of indices: $\{\lfloor j/m \rfloor \times (\mu+1) + \alpha \times \mu\}|_{\text{modulo } \mu^2}$, $0 \le \alpha < \mu$;

and a plurality of secondary switches, each secondary switch connecting to channels directed to a respective third set of μ primary switches orthogonal to said second set of μ primary switches and channels originating from a respective fourth set of μ primary switches orthogonal to said third set of μ primary switches;

wherein at least one access node is coupled to a respective set of access channels, and at least one access node is coupled to a respective set of servers of a plurality of servers;

each access node comprising a hardware access controller configured to schedule data transfer from said each access node to any access node;

thereby:

said network provides respective single-hop paths for each pair of access nodes, each pair of secondary switches, and each pair of a secondary switch and an access node.

18. The network of claim 17 wherein for a secondary switch of index s, $0 \le s < \mu \times n$:

said third set of μ primary switches comprises primary switches of indices:

$$\{\lfloor s/n \rfloor \times \mu + \alpha\},\ 0 \le \alpha < \mu;$$

and said fourth set of μ primary switches comprises primary switches of indices:

$$\{\lfloor s/n \rfloor \times (\mu+1) + \alpha \times \mu\}|_{\text{modulo } \mu^2},\ 0 \le \alpha < \mu;$$

with each primary switch of said plurality of primary switches connecting to n secondary switches, n>0.

19. The network of claim 17 wherein at least one secondary switch of said plurality of secondary switches is coupled to at least one server of said plurality of servers.

20. The network of claim 17 wherein said hardware access controller comprises a memory device storing a respective routing table providing identifiers of:

a one-hop path from said each access node to each other access node traversing a respective primary switch; and at least one compound path from said each access node to said each other access node traversing a first primary switch, a secondary switch, and a second primary switch.

21. The network of claim 17 further comprising:

a plurality of hardware secondary controllers each coupled to a respective secondary switch and storing a respective routing table identifying:

a path from said respective secondary switch to each other secondary switch traversing a respective primary switch; and at least one compound path from said respective secondary switch to said each other secondary switch traversing a first primary switch, a secondary switch, and a second primary switch.

* * * * *